(12) United States Patent
Umetani et al.

(10) Patent No.: US 9,743,232 B2
(45) Date of Patent: Aug. 22, 2017

(54) INFORMATION COMMUNICATION DEVICE AND METHOD FOR POWER ASSISTED BICYCLE

(71) Applicant: Panasonic Intellectual Property Corporation of America, Torrance, CA (US)

(72) Inventors: Hideo Umetani, Osaka (JP); Yuji Unagami, Osaka (JP); Motoji Ohmori, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/668,609

(22) Filed: Mar. 25, 2015

(65) Prior Publication Data
US 2015/0281891 A1    Oct. 1, 2015

(30) Foreign Application Priority Data

Mar. 28, 2014    (JP) .................................. 2014-070555

(51) Int. Cl.
B60L 11/18    (2006.01)
H04W 4/02    (2009.01)

(52) U.S. Cl.
CPC .......... H04W 4/021 (2013.01); H04W 4/025 (2013.01); H04W 4/028 (2013.01)

(58) Field of Classification Search
CPC .......... H04M 1/7253; B06L 11/18; B06L 7/26
USPC ....................................... 455/4.12; 180/206.2
See application file for complete search history.

(56) References Cited

U.S. PATENT DOCUMENTS

| | | | | |
|---|---|---|---|---|
| 6,247,548 B1* | 6/2001 | Hayashi | .............. | B60L 11/1801 180/206.2 |
| 6,799,085 B1* | 9/2004 | Crisp, III | .............. | B67D 1/0057 222/146.6 |
| 7,204,259 B2* | 4/2007 | Crisp, III | .............. | B67D 1/0057 134/113 |
| 7,418,969 B1* | 9/2008 | Crisp, III | .............. | B67D 1/0057 134/56 D |
| 9,308,964 B2* | 4/2016 | Saida | .................... | B60L 11/007 |

(Continued)

FOREIGN PATENT DOCUMENTS

JP    2007-060622    3/2007

*Primary Examiner* — William D Cumming
(74) *Attorney, Agent, or Firm* — Greenblum & Bernstein, P.L.C.

(57) ABSTRACT

Included is identifying a location of a user; determining that transmission of notification information to the user is appropriate in a case where information included in management information held in the information collection database satisfies a predetermined condition, and a current location of the user identified in the identifying is a predetermined location; specifying, out of one or more presentation devices, a presentation device at which the notification information is to be displayed; generating the notification information of a content according to the identified location of the user, in a case where determination has been made in the determining that transmission of the notification information is appropriate; and performing communication to transmit the notification information that has been generated in the generating to the presentation device that has been specified in the specifying.

7 Claims, 49 Drawing Sheets

(56) References Cited

U.S. PATENT DOCUMENTS

| | | | |
|---|---|---|---|
| 2005/0022848 A1* | 2/2005 | Crisp, III | B67D 1/0057 134/57 D |
| 2005/0033646 A1* | 2/2005 | Crisp, III | B67D 1/0057 705/16 |
| 2005/0033647 A1* | 2/2005 | Crisp, III | B67D 1/0057 705/16 |
| 2007/0224937 A1* | 9/2007 | Jung | H04M 1/7253 455/41.2 |

* cited by examiner

FIG. 6

```
·USER A
  —DEVICE A1 (BICYCLE)
    SEPTEMBER 1, 2012
              11:55  STOPPED
                     BATTERY LEVEL 50%
                     CALORIE CONSUMPTION 0 kcal
                     ...
              12:00  POWER ON
                     BATTERY LEVEL 50%
                     CALORIE CONSUMPTION 0 kcal
                     ...
              12:05  TRAVELING
                     BATTERY LEVEL 49%
                     CALORIE CONSUMPTION 10 kcal
                     ...
              12:10  ...
  —DEVICE A2 (AIR CONDITIONER)
    SEPTEMBER 1, 2012
              11:55  POWER OFF
                     AMOUNT OF TIME USED TODAY 1:30
                     ECO-NAVI RATE
                     ...
              12:00  OFF
                     AMOUNT OF TIME USED TODAY 1:30
                     ...
  —DEVICE A3 ...
·USER B
  —DEVICE B1 ...
  —DEVICE B2 ...
```

FIG. 7

| | | |
|---|---|---|
| DEVICE A (BICYCLE) | — | DISPLAY DEVICE 1 (SMARTPHONE) |
| DEVICE B (AIR CONDITIONER) | — | DISPLAY DEVICE 2 (TV) |
| DEVICE C | — | DISPLAY DEVICE 3 |
| DEVICE D | — | DISPLAY DEVICE 2 |
| DEVICE E | — | DISPLAY DEVICE 4 |
| DEVICE F | — | DISPLAY DEVICE 5 |
| ⋮ | | ⋮ |

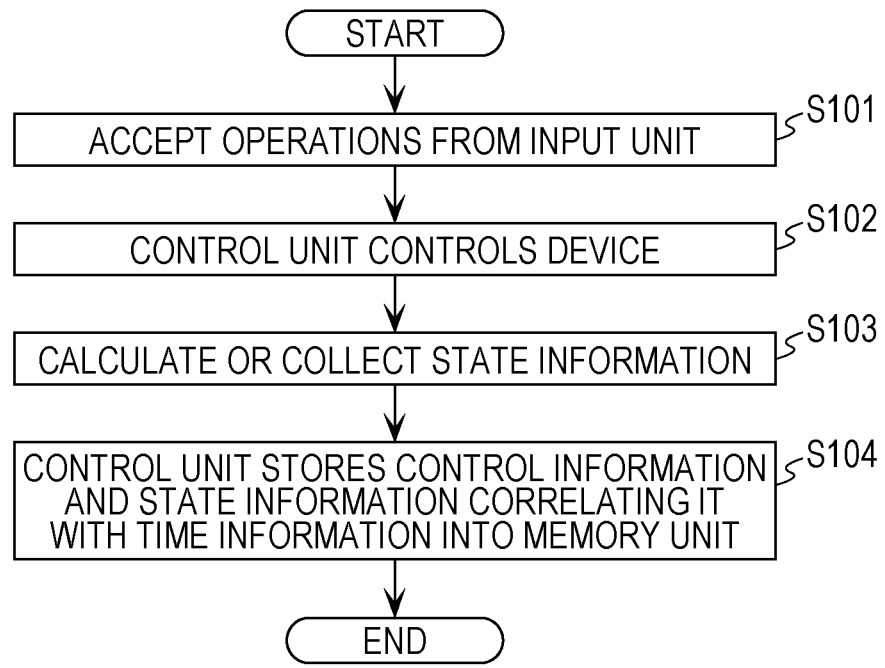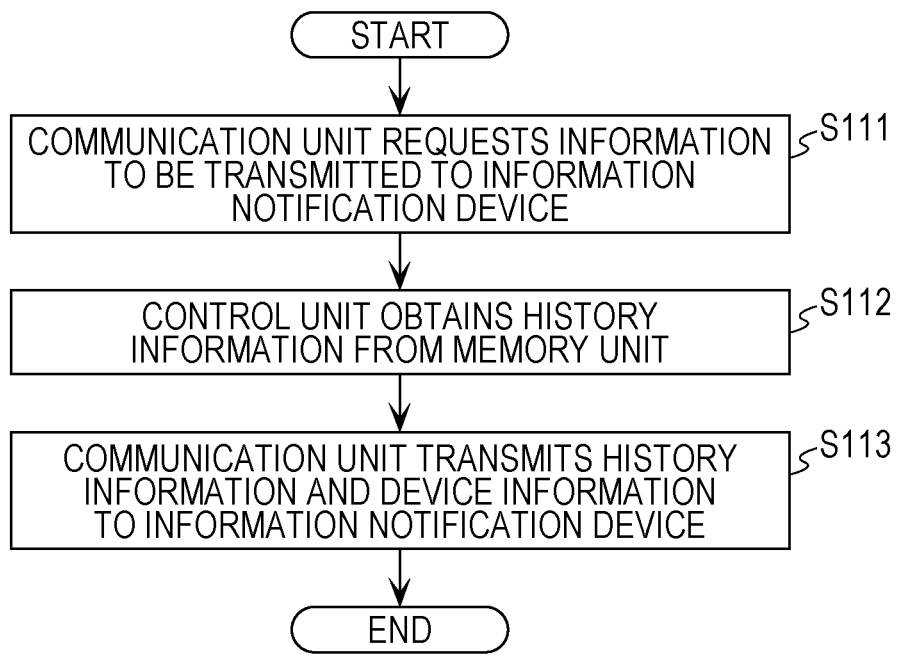

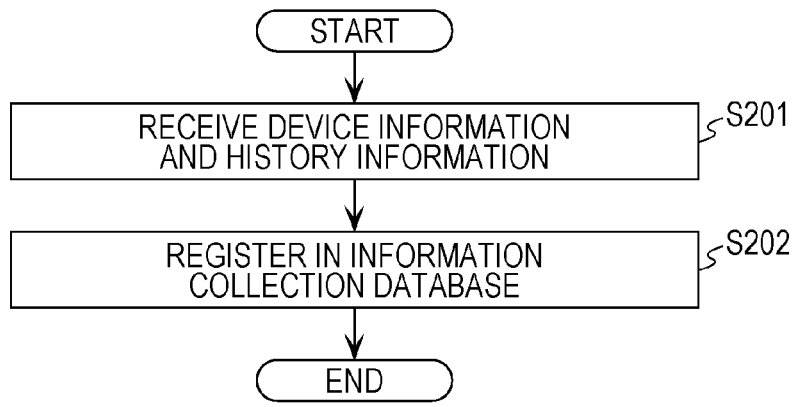
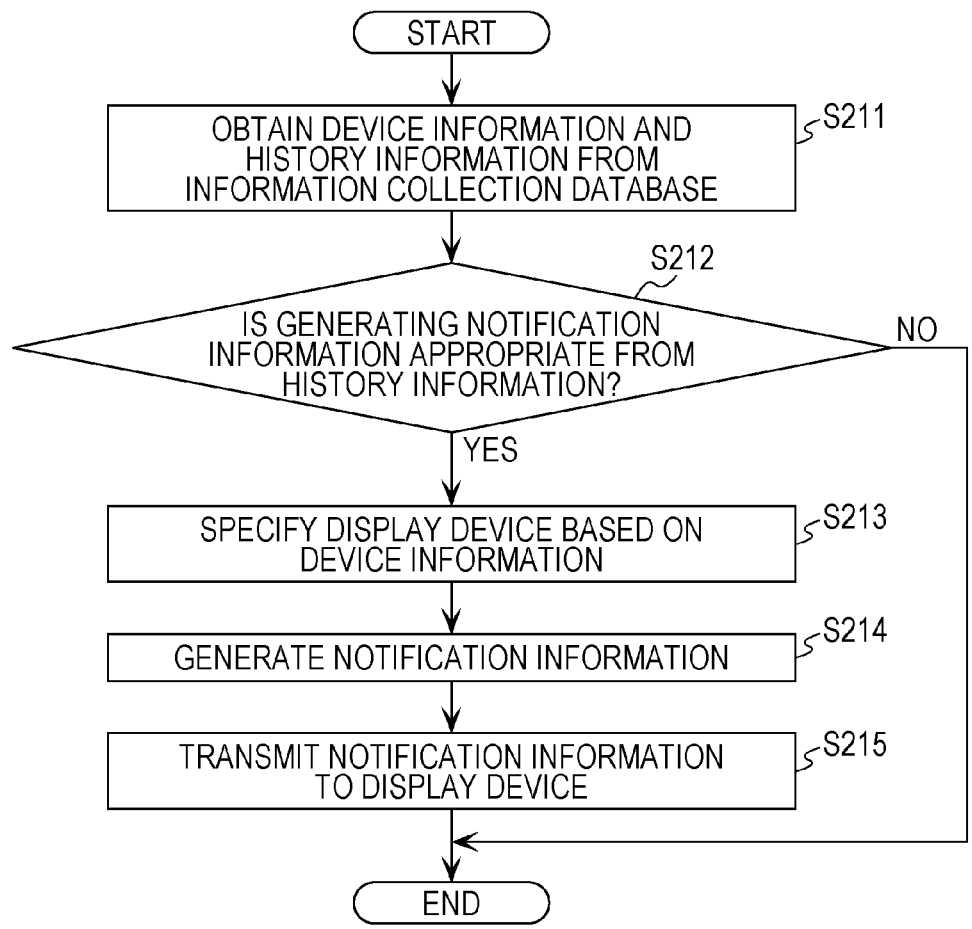

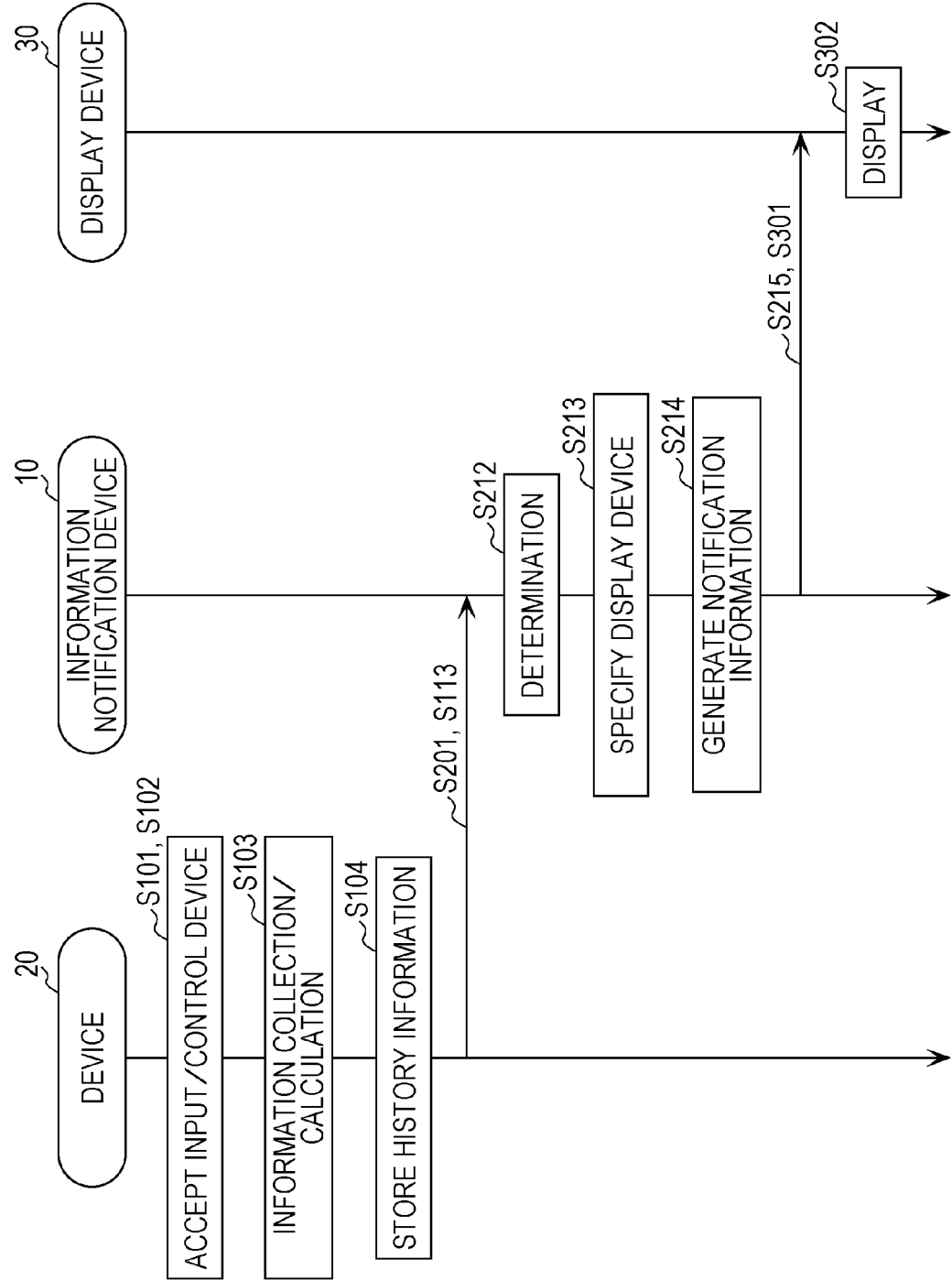

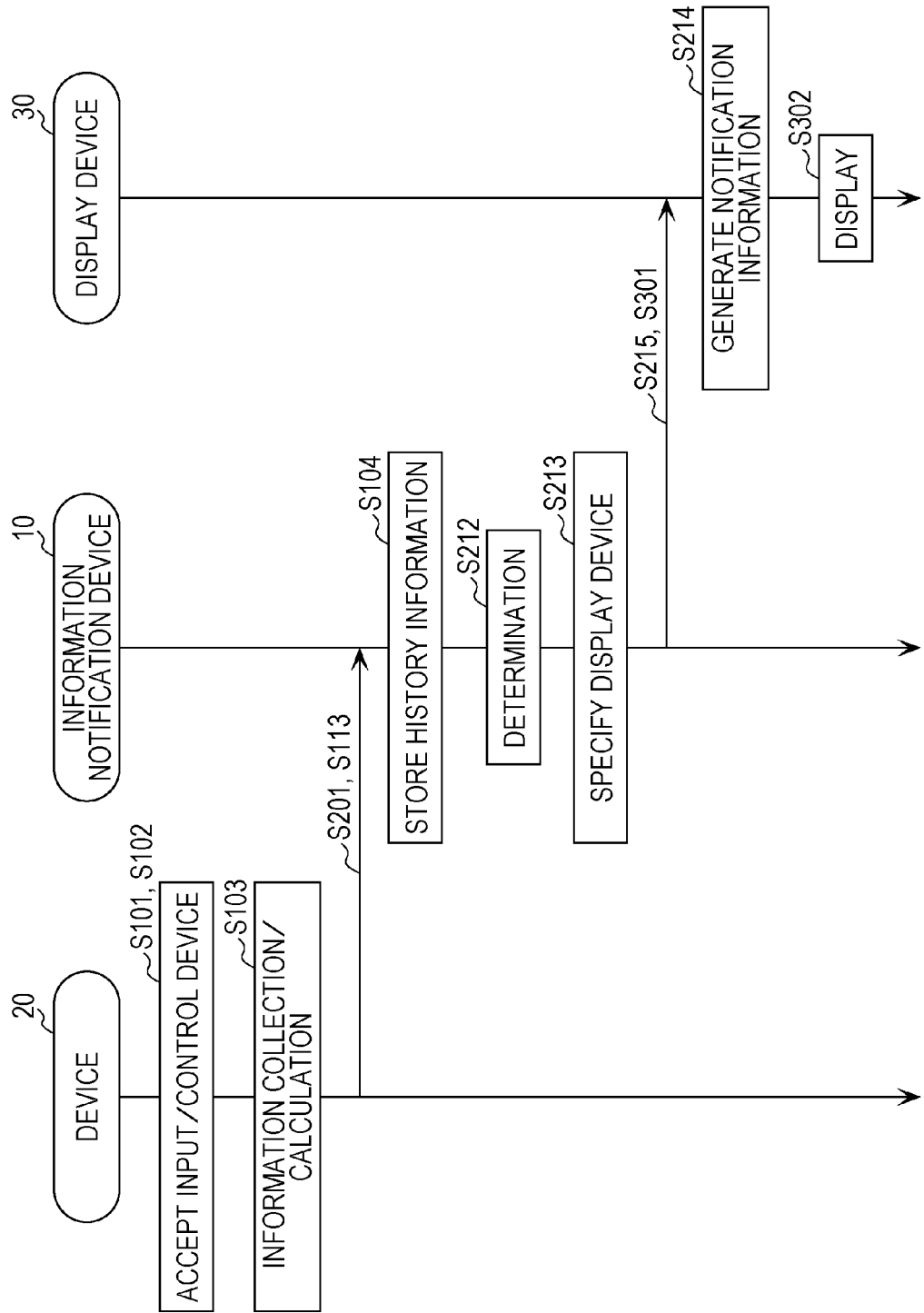

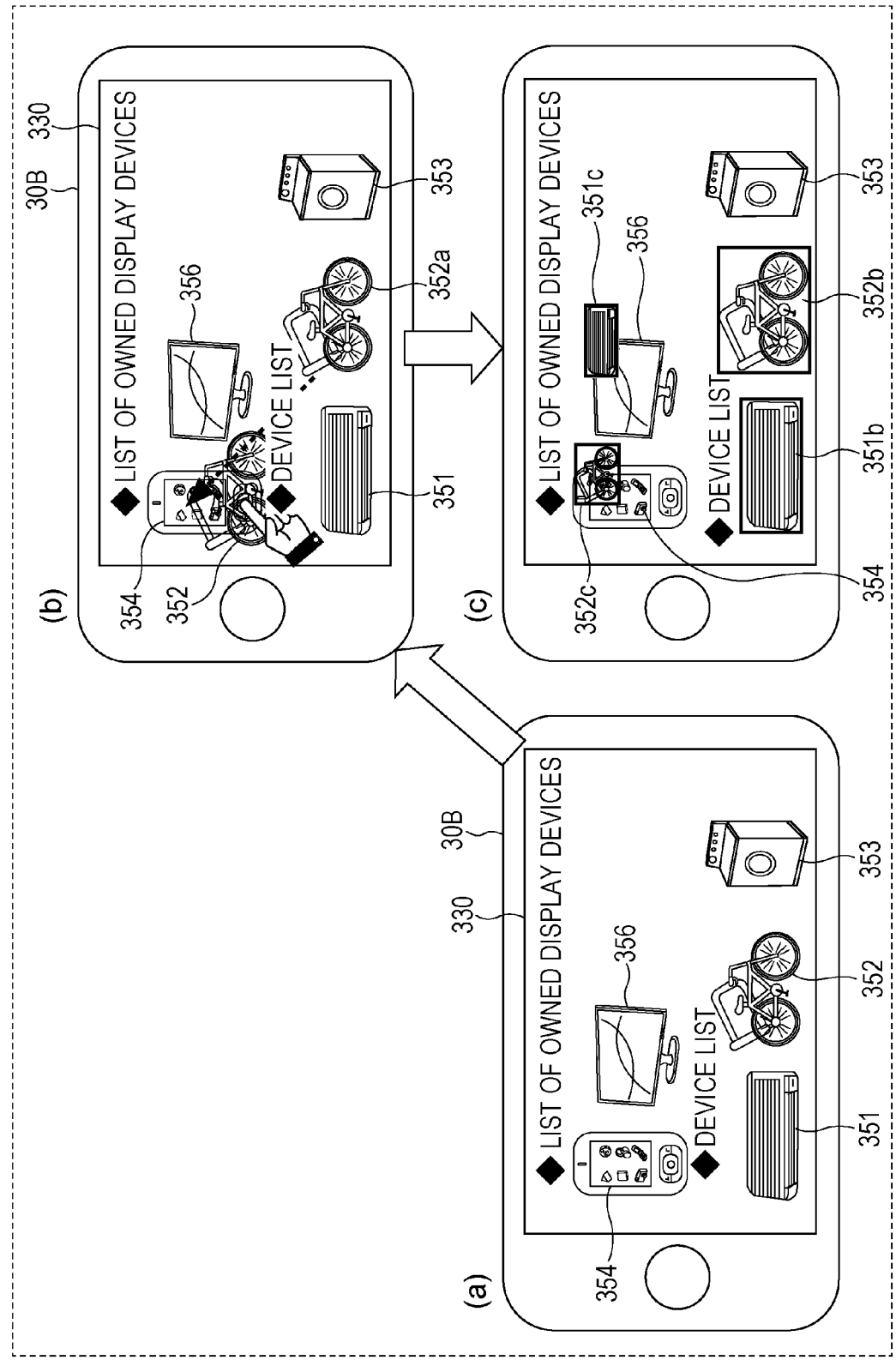

INFORMATION COMMUNICATION DEVICE AND METHOD FOR POWER ASSISTED BICYCLE

BACKGROUND

1. Technical Field

The present disclosure relates to an information communication device and information communication method.

2. Description of the Related Art

In recent years, there have been proposed systems that collect information relating to a device via a network. The term "information relating to a device" means, for example, information relating to a model No. of a device, operating history of a device and operating state of the device, and information indicating remaining battery level of a battery, and so forth.

Device manufacturers are studying implementation of the above-described system for a new service (e.g., Japanese Unexamined Patent Application Publication No. 2007-060622). Japanese Unexamined Patent Application Publication No. 2007-060622 proposes, as a new service, a service where the user sets a timer for a home appliance, in which in a case where setting of the time has been completed, but the user has forgotten to turn the timer on, the system detects this state and notifies the user.

SUMMARY

In one general aspect, the techniques disclosed here feature an information notification method including: holding management information in an information collection database; identifying a location of a user; determining that transmission of notification information to the user is appropriate in a case where information included in management information held in the information collection database satisfies a predetermined condition, and a current location of the user identified in the identifying is a predetermined location; specifying, out of one or more presentation devices, a presentation device at which the notification information is to be displayed; generating the notification information of a content according to the identified location of the user, in a case where determination has been made in the determining that transmission of the notification information is appropriate; and performing communication to transmit the notification information that has been generated in the generating to the presentation device that has been specified in the specifying.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a diagram illustrating an example of history information stored in an information collection database;

FIG. 7 is a diagram illustrating an example of transmission destination information held in a display device specification unit;

FIG. 8A is a flowchart illustrating the flow of control in the device according to the first embodiment;

FIG. 8B is a flowchart illustrating the flow of control in the device according to the first embodiment;

FIG. 9A is a flowchart illustrating the flow of control in the information notification device according to the first embodiment;

FIG. 9B is a flowchart illustrating the flow of control in the information notification device according to the first embodiment;

FIG. 11 is a sequence diagram illustrating the series of operations of a device, display device, and information notification device;

FIG. 12B is a sequence diagram illustrating the series of operations of the device, display device, and information notification device;

FIG. 28 is a diagram for describing an example of settings of transmission destination information in FIG. 27;

DETAILED DESCRIPTION

Figure 1A:
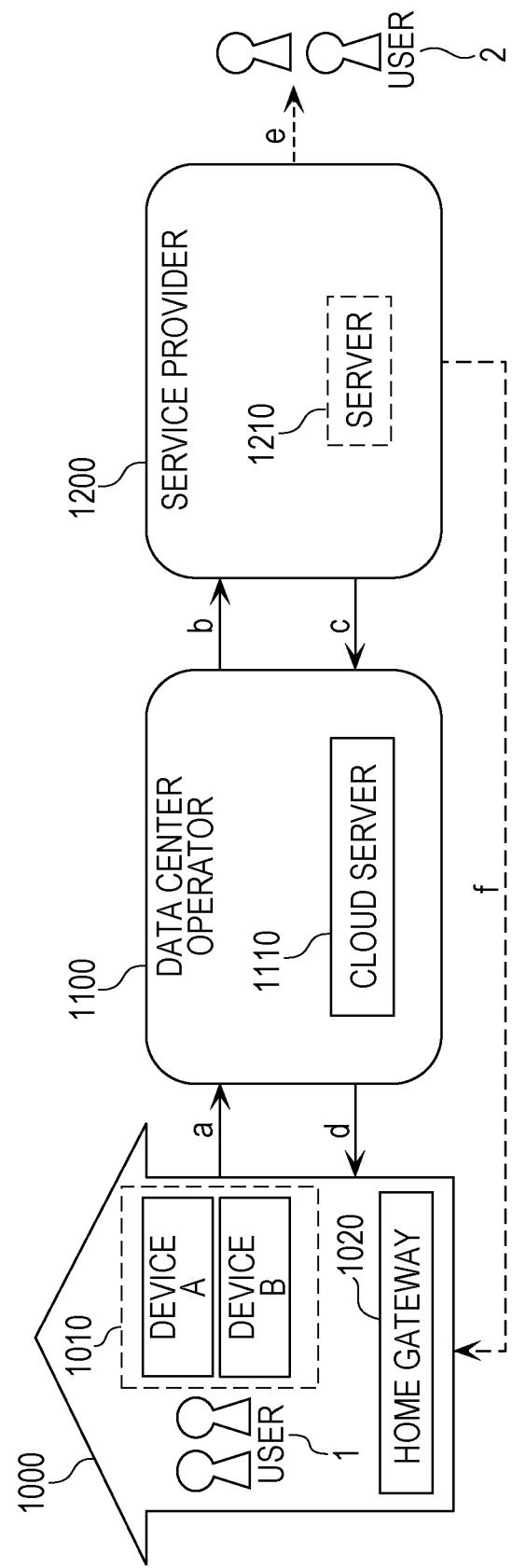
FIG. 1A is a diagram illustrating an overall image of an information providing system according to an embodiment.

Underlying Knowledge Forming Basis of the Present Disclosure

The Present Inventors have found the following problems in the system described in the Related Art. The system disclosed in Japanese Unexamined Patent Application Publication No. 2007-060622 has a timer setting confirmation unit and a timer-forgetting confirmation notification unit. In a case where the timer setting confirmation unit detects that the time set to the timer has arrived but the user has forgotten to turn the timer on, the timer-forgetting confirmation notification unit detects that the user has forgotten to turn the timer on, and accordingly the timer-forgetting confirmation notification unit sends an email to the user to confirm whether the user has forgotten to turn the timer on. Thus, even in a case where the user has forgotten to turn the timer on, this can be confirmed away from home.

However, the above-described conventional system is restricted to devices having a timer which can be set, to provide the service of sending an email to the user to confirm whether the user has forgotten to turn the timer on. Forgetting to operate devices without a timer, or devices which have a timer but the user is not using the timer, are not subject to this notification. Further, even if the user is notified in this way, if the notification is not received at a location and timing at which the user can respond to the notification, the user cannot perform suitable operations, and the user may forget again.

The present disclosure has been made in light of the above-described problem, and accordingly it is an object thereof to provide an information notification device and information notification method, in which notification of notification information is performed at an optimal display location and an optimal timing.

An information notification method according to an aspect of the present disclosure includes: holding management information in an information collection database; identifying a location of a user; determining that transmission of notification information to the user is appropriate in a case where information included in management information held in the information collection database satisfies a predetermined condition, and a current location of the user identified in the identifying is a predetermined location; specifying, out of one or more presentation devices, a presentation device at which the notification information is to be displayed; generating the notification information of a content according to the identified location of the user, in a case where determination has been made in the determining that transmission of the notification information is appropriate; and performing communication to transmit the notification information that has been generated in the generating to the presentation device that has been specified in the specifying.

According to the above configuration, a information notification device which can perform notification of information at a suitable display location and at a suitable timing, can be realized. The location of the user is identified in this configuration, so notification information can be generated and transmitted in accordance with the current location of the user, based on management information. Accordingly, the user can receive the notification information at a suitable timing at which he-she can respond to the notification information.

The information notification method may be further includes: performing communication to receive, from a first device out of a plurality of devices which operate by accepting input from the user, first device information uniquely identifying the first device, and first history information of the first device, the first history information of the first device including at least one of control information of the first device and state information indicating the state of the first device. In the holding, the first device information and first history information received in the performing communication may be correlated and held in the information collection database as the management information. In the determining, determination may be made that transmission of the notification information is appropriate in a case where information included in the first history information held in the management information satisfies a predetermined condition, and the location of the user that has been identified is a predetermined location.

In a case where the first device is a power-assisted bicycle, information included in the first history information may be a value of a remaining battery level of the first device, the predetermined condition may be the value of the remaining battery level of the first device being equal to or lower than a value predetermined to warrant charging of the first device, and the predetermined location may be within a home of the user where the first device is placed, or nearby the home.

The predetermined location may be an entryway of the home.

In the identifying, the user may be identified as being at the location of the entryway of the home, using operation history of a lock of the entryway of the home of the user having been operated, or operation history of lighting of the entryway having been operated.

Information included in the first history information may include information relating to a running state of the first device, indicating whether the first device is operating or is stopped. The predetermined condition may be that the first device is operating, and the predetermined location may be a location other than a room where the first device is placed.

The information notification method may further include detecting whether or not a child is present in a room where the first device is placed. The predetermined condition may be that the first device is operating, and that the presence of a child has been detected in the detecting in the room where the first device is placed.

In a case where determination is made in the determining that transmission of the notification information in the generating is appropriate, information prompting the user to effect control including stopping the first device, and information indicating that the first device is operating, may be generated in the generating as the notification information.

The information notification method may further include controlling to stop the first device in a case where determination is made in the determining that transmission of the notification information is appropriate. In a case where determination is made in the determining that transmission of the notification information is appropriate, and control is effected in the controlling to stop the first device, information to the effect that control has been effected to stop the first device because the first device was operating may be generated in the generating as the notification information.

The first device may be any one of an air conditioner, lighting, and a device using induction heating.

The information notification method may further include acquiring sensor information indicating a current state of the first device. The first history information may include information relating to a running state of the first device. In a case where information included in the first history information held in the management information and sensor information acquired in the acquiring satisfy a predetermined condition, and an identified location of the user is a predetermined location, determination may be made in the determining that transmission of the notification information is appropriate.

In a case where the first device is a hot tub, the first history information may include information indicating whether or not control has been effected to heat the hot tub, the sensor information may include information indicating which state of opened and closed the drain plug of the hot tub is in, the predetermined condition may be that control has been effected to heat the hot tub and that the state of the drain plug of the hot tub is opened, and the predetermined location may be within the home of the user where the hot tub is installed.

In a case where the first device is a washing machine, the first history information may include information indicating a state of whether or not the washing machine is running, the sensor information may include information indicating the state of whether the drum of the washing machine is currently empty, the predetermined condition may be that the washing machine has ended running and that the drum of the washing machine is not empty, and the predetermined location may be a location other than the room where the washing machine is installed.

In a case where the first device is a rice cooker, the first history information may include information indicating whether or not the rice cooker is in one of a state of cooking rice and a state of a timer having been set to cook rice, the sensor information may include information indicating whether rice is currently placed in the pot of the rice cooker, the predetermined condition may be that a timer of the rice cooker has been set to cook rice, and that no rice is currently placed in the pot of the rice cooker, and the predetermined location may be in the home of the user where the rice cooker is placed.

The information notification method may further include: performing communication to receive current date-and-time information. In the holding, behavioral practices of the user and first date-and-time information of when the behavior should be carried out may be correlated and held in the information collection database as the management information. In a case where the current date-and-time information received in the performing communication to receive current date-and-time information, satisfies the predetermined condition that the current date-and-time information is included in the first date-and-time information held in the management information, and in a case where the identified location of the user is the predetermined location, determination may be made in the determining that transmission of the notification information is appropriate. In a case where determination is made in the determining that transmission of the notification information is appropriate, information prompting the user to carry out the behavior may be generated in the generating as the notification information.

In a case where the behavior is the user taking out garbage to a predetermined garbage pick-up location, the first date-and-time information may include information relating to the date and time of garbage pick-up, and the predetermined location may be within the home of the user or at an entryway of the home.

The location of the user may be identified in the identifying using a sensor installed in the home of the user, the sensor using at least one of a motion detector and a heat sensor.

One or more presentation devices may include any one of an in-home smart grid display, a mobile terminal, and lighting capable of changing colors or blinking.

In a case where determination is made in the determining that transmission of the notification information is appropriate, and also the presentation device specified in the specifying is capable of audio output, the notification information may be generated including audio data of a content to be notified to the user.

At least one of the holding, the identifying, the determining, the specifying, the generating, and the communicating, may be executed by a processor.

An information notification device according to an aspect of the disclosure includes: an information collection database that holds management information; a location information identification unit that identifies a location of a user; a determination unit that determines that transmission of notification information to the user is appropriate in a case where information included in management information held in the information collection database satisfies a predetermined condition, and a current location of the user identified by the location information identification is a predetermined location; a presentation device specification unit that specifies, out of one or more presentation devices, a presentation device at which the notification information is to be displayed; a generation unit that generates the notification information of a content according to the identified location of the user, in a case where determination has been made by the determination unit that transmission of the notification information is appropriate; and a communication unit that transmits the notification information that has been generated by the generation unit to the presentation device that has been specified by the presentation device specification unit.

These general or specific aspects may be realized by a system, method, integrated circuit, computer program, or computer-readable recording medium such as a CD-ROM, and may be realized by any combination of a system, method, integrated circuit, computer program, and recording medium.

Overview of Service to be Provided

FIG. 1A illustrates an overview of an information providing system according to the embodiments. A group 1000 is, for example, a corporation, an organization, a home, or the like. The scale thereof is irrelevant. The group 1000 has multiple devices 1010, which are a device A, and device B, and a home gateway 1020. The multiple devices 1010 include those which are capable of connecting to the Internet, (e.g., a smartphone, personal computer (PC), television set, etc.), and those which are incapable of connecting to the Internet on their own (e.g., lighting, dishwasher, refrigerator, etc.). There may be devices which are incapable of connecting to the Internet on their own but can connected to the Internet via the home gateway 1020. There also is in the group 1000 a user 1 using the multiple devices 1010.

A data center operator 1100 includes a cloud server 1110. The cloud server 1110 is a virtual server which collaborates with various devices over the Internet. The cloud server 1110 primarily manages massive data (big data) which is difficult to handle with normal database management tools or the like. The data center operator 1100 manages data and operates the cloud server 1110, manages a data center which carries out these operations, and so forth. The duties which the data center operator 1100 undertakes will be described in detail later.

Figure 1B:
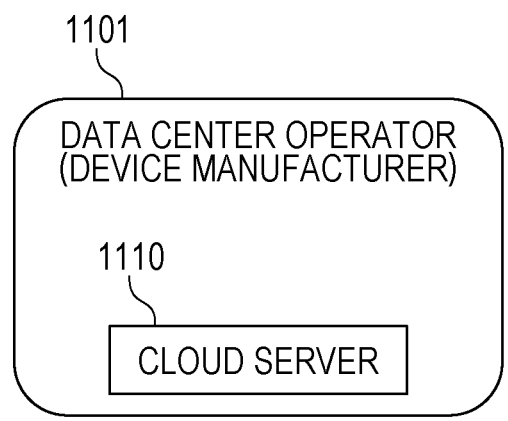
FIG. 1B is a diagram illustrating a modification of a partial configuration of an information providing system according to an embodiment.
Figure 1C:
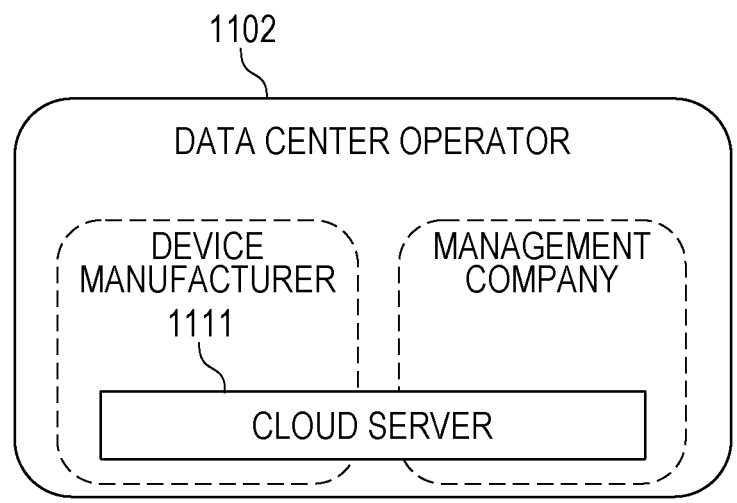
FIG. 1C is a diagram illustrating a modification of a partial configuration of an information providing system according to an embodiment.

Note that the data center operator 1100 is not restricted to a corporation which only performs data management and operates the cloud server 1110 or the like. For example, in a case where a device manufacturer which develops and manufactures any one of the multiple devices 1010 also manages data and the cloud server 1110 and so forth, the device manufacturer falls under being the data center operator 1100 (FIG. 1B). Also, the number of data center operators 1100 is not restricted to one. For example, in a case where a device manufacturer and another management company manage the data and operate the cloud server 1110 together or by apportionment of duties, both or one fall under being the data center operator 1100 (FIG. 1C).

A service provider 1200 has a server 1210. The server 1210 as referred to here is not restricted by the scale thereof, and for example may include memory or the like inside a personal computer (PC) owned by an individual. There also may be cases where the service provider does not have a server 1210.

The home gateway 1020 is not indispensable to the above-described service. For example, in a case where the cloud server 1110 performs all data management, the home gateway 1020 is unnecessary. Also, there may be cases where there are no devices incapable of Internet connection on their own, such as in a case where all devices in a home are connected to the Internet.

Next, the flow of information in the above-described service will be described. First, a device A or device B of the group 1000 transmits log information to the cloud server 1110 of the data center operator 1100. The cloud server 1110 collects the log information of the device A or device B (a in FIG. 1A). Log information here means information indicating, for example, the operating state, date-and-time of operation, and so forth, of multiple devices 1010. Examples include viewing history of the television, information of programming a video recorder to record video at certain times, date-and-time of running a washing machine and the amount of laundry, date-and-time of opening/closing the refrigerator door and the number of times, and so forth, but log information is not restricted to these examples, and refers to all information which can be obtained from the devices. The log information may be directly provided from the multiple devices 1010 themselves to the cloud server 1110 via the Internet. Alternatively, the log information from the multiple devices 1010 may be temporarily collected at the home gateway 1020 and then provided from the home gateway 1020 to the cloud server 1110.

Next, the cloud server 1110 of the data center operator 1100 provides the collected log information to the service provider 1200 in a certain unit of information. A certain unit of information may be a unit with which the data center operator 1100 can reorganize the collected information and provide to the service provider 1200, or may be a unit requested by the service provider 1200. While the increments have been described as being predetermined, this is not restrictive, and there are cases where the amount of information provided differs depending on the situation. The log information is saved in the server 1210 of the service provider 1200 as necessary (b in FIG. 1A).

The service provider 1200 reorganizes the log information into information suitable for services to be provided to the user, and thus provides the log information to the user. The user which is provided with the log information may be the user 1 using the multiple device 1010, or may be an external user 2. The service may be directly provided to the user from the service provider 1200, for example (b and e in FIG. 1A), or may be provided to the user by passing through the cloud server 1110 of the data center operator 1100 again (c and d in FIG. 1A). Alternatively, the cloud server 1110 of the data center operator 1100 may reorganize the log information into information suitable for services to be provided to the user, and provide this to the service provider 1200. The user 1 and the user 2 may be the same entity or different entities.

Figure 2A:
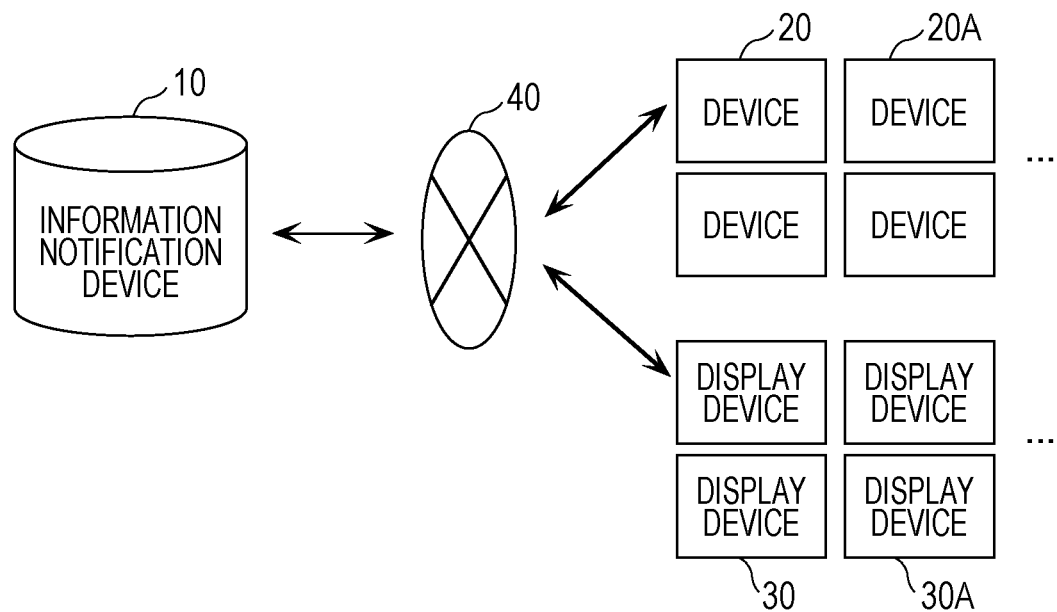
FIG. 2A is a diagram illustrating the configuration of a system including a information notification device according to a first embodiment.

The information notification device and information notification method according to thee embodiments will now be described in detail, with reference to the drawings. Note that the embodiments described below are all specific examples of the present disclosure. Values, shapes, materials, components, placements and connections of components, steps, orders of steps, and so forth in the following embodiments are only exemplary, and do not restrict the present disclosure. Components in the following embodiments which are not included in an independent Claim indicating the highest concept are described as being optional components.
First Embodiment
Overall Configuration of System FIG. 2A is a diagram illustrating a system configuration including an information notification device 10 according to a first embodiment. The system illustrated in FIG. 2A includes the information notification device 10, devices 20, display devices 30 which are an example of a presentation device, and a network 40.

The information notification device 10 is, for example, a Web server having a database, which is owned by a device manufacturer. The information notification device 10 is connected to the devices 20 and display devices 30 via the network 40. The information notification device 10 registers information transmitted from the devices 20 via the network 40, generates notification information based on the registered information, and transmits (transfers) notification information to be displayed on the display devices 30 to the display devices 30 via the network 40. Note that the information notification device 10 corresponds to the server 1210 illustrated in the example in FIG. 1A.

The devices 20 are devices used in everyday life, such as home appliances, lighting, vehicles, terminal devices, etc.

Examples of home appliances include audio and visual (AV) appliances such as television receivers, digital recorders, and so forth; white goods such as refrigerators, washing machines, air conditioners, rice cookers, vacuum cleaners, induction heating (IH) cookers, and so forth; health-related appliances such as toothbrushes, blood pressure gauges, body composition measuring devices, and so forth; and beauty-related appliances such as hair dryers, shavers, and so forth. Examples of vehicles include electric cars, power-assisted bicycles, and so forth. Examples of terminals include smartphones, feature phones, tablets, personal computers, and so forth. The devices 20 correspond to the devices 1010 illustrated in the example in FIG. 1A.

The display devices 30 are devices having a display device, such as cellular phones (smart phones and feature phones), tablets, television sets, refrigerators and washing machines provided with displays, for example. While the display devices 30 correspond to the devices 1010 illustrated in the example in FIG. 1A, The display devices 30 and the devices 20 in the present embodiment will be described as being different devices, unless stated otherwise.

The network 40 is a cabled network such as an Ethernet (a registered trademark), a wireless network such as a wireless local area network (LAN), a public network, a network including a combination of the above networks, or the like. A public network is a communication line which a telecommunication carrier provides for the general public, examples of which include common phone lines, Integrated Services Digital Networks (ISDN), and so forth.

Figure 2B:
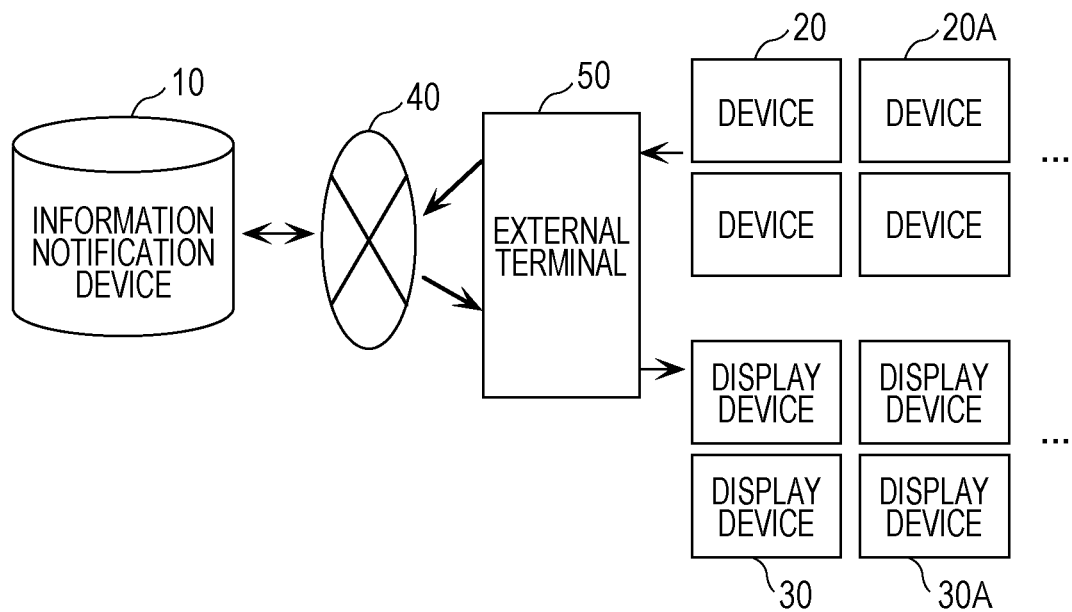
FIG. 2B is a diagram illustrating the configuration of a system including the information notification device according to the first embodiment.

An arrangement may also be made such as illustrated in FIG. 2B, where the devices 20 and display devices 30 are connected to the network 40 via an external terminal 50. Other connection arrangements may also be made, such as the devices 20 being connected to the network 40 via the external terminal 50 while the display devices 30 are connected to the network 40 without going through the external terminal 50, or vise versa.

The external terminal 50 is a terminal which can access the network 40, such as a cellular phone (smart phone or feature phone), tablet, router, access point, or the like, for example. Examples of the devices 20 connecting to the external terminal 50 include connection by near-field communication, such as by radio frequency identification (RFID) tags, near field communication (NFC) of which one standard is ISO/IEC 21481, Wireless Fidelity (Wi-Fi), Bluetooth (a registered trademark), and so forth, cabled connection via LAN cable or the like, and so forth. The external terminal 50 corresponds to the home gateway 1020 illustrated in the example in FIG. 1A.

Figure 3:
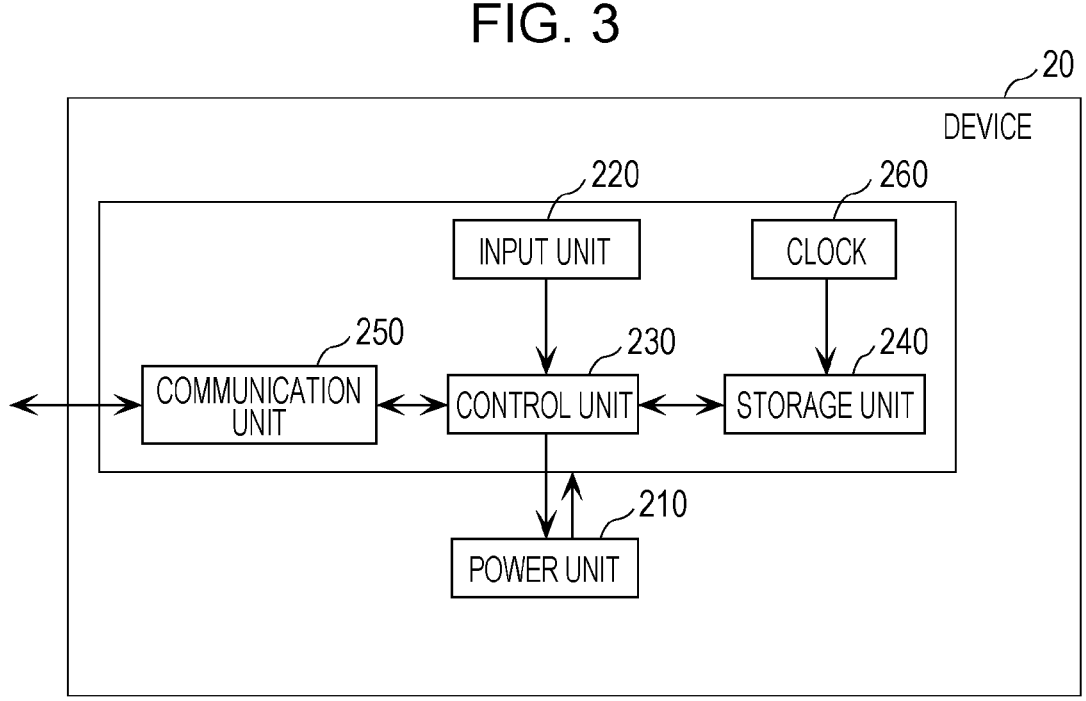
FIG. 3 is a block diagram illustrating a functional configuration of a device according to the first embodiment.

There are multiple devices 20 and display devices 30, as illustrated in FIGS. 2A and 2B. The information notification device 10 can collect information from each of the multiple devices 20, and transmit notification information to at least one of the multiple display devices 30. Description will be made in the present embodiment with regard to an example where a device 20 is a power-assisted bicycle, and a display device 30 is a smartphone.
Configuration of Device FIG. 3 is a block diagram illustrating a functional configuration of a device 20 according to the first embodiment. The device 20 in FIG. 3 operates upon accepting operations such as user input and so forth, and includes a power unit 210, an input unit 220, a control unit 230, a storage unit 240, and a communication unit 250.

The power unit 210 is the main power supply of the device 20. When the power unit 210 is on, power is supplied from the power unit 210 to the entire device 20. When the power unit 210 is off, supply of power to the entire device 20 is stopped.

The input unit 220 is the portions which accept user operations. The input unit 220 is, for example, a power button, traveling mode change button, brakes, pedals, and so forth, i.e., portions which the user can operate.

The control unit 230 is a portion which controls the operations of the entire device 20. The control unit 230 accepts operations from the input unit 220, controls the device 20, and records control information of the device 20 in the storage unit 240. The control unit 230 further collects state information and the like of the device 20 generated as a result of user operations, performs calculations thereof, and stores in the storage unit 240.

Now, an example of control information of the device 20 is a case where the user presses a mode change button which is an operation portion of the input unit 220 so as to switch the device 20 to the power mode, in which information is generated indicating the event that the device 20 has been "switched to power mode", which is control information. This control information is registered in a manner correlated with time information from a clock 260 (e.g., "switched to power mode at hh/mm"). The time information to be correlated with the control information is not restricted to being from the clock 260 of the device 20; the information notification device 10 may have a clock, for example. In this case, at the time of the information notification device 10 obtaining history information (described later) from the device 20, the information notification device 10 may correlate time information indicating the time at which the information notification device 10 received the history information, with the history information.

Examples of state information of the device 20 include traveling distance calculated from the number of rotations of the pedals and the remaining battery level (e.g., 1000 m traveled, remaining battery level 40%), i.e., information indicating the state of the device 20. This state information also is registered in a manner correlated with time information, in the same way as with the control information described above. The state information may be collected or calculated each time there is user input of the like, or may be collected or calculated at each certain interval (e.g., every 5 minutes), and stored in the storage unit 240. Description will be made in the present embodiment regarding an arrangement where the history information includes at least one of control information and state information.

The storage unit 240 stores history information including at least one of control information of the device 20 and state information of the device 20. And the storage unit 240 further stores device information of the device 20. The device information of the device 20 is information whereby the device 20 can be uniquely identified, and is information where the device 20 can be identified as a power-assisted bicycle such as a device model number, for example.

The communication unit 250 transmits the device information and history information stored in the storage unit 240 to the information notification device 10 via the network 40. The communication unit 250 may transmit the device information and history information every certain interval (e.g., every five seconds), or may perform this transmission at a timing of manual operation by the user, or may transmit at a timing as requested from the information notification device 10.

The clock 260 manages time information indicating the current point-in-time, in terms of, for example, 12:30:15, Sep. 1, 2012.

Configuration of Display Device

Figure 4:
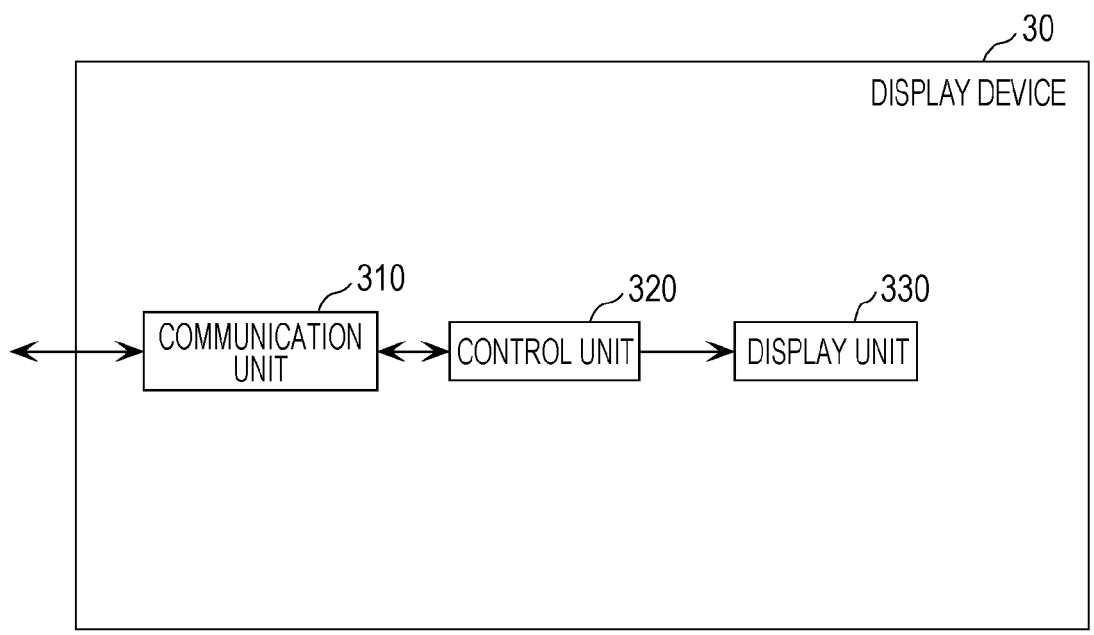
FIG. 4 is a block diagram illustrating a functional configuration of a display device according to the first embodiment.

FIG. 4 is a block diagram illustrating a functional configuration of the display device 30 according to the first embodiment. The display device 30 in FIG. 4 includes a communication unit 310, a control unit 320, and a display unit 330.

The communication unit 310 receives notification information transmitted from the information notification device 10. The control unit 320 displays the notification information received from the communication unit 310 on the display unit 330. The notification information may be received in the form of email. In this case of receiving the notification information in the form of email, the control unit 320 displays the notification information on the display unit 330 by user operations. The display unit 330 has a display screen on which the notification information is displayed.

Configuration of Information Notification Device

Figure 5:
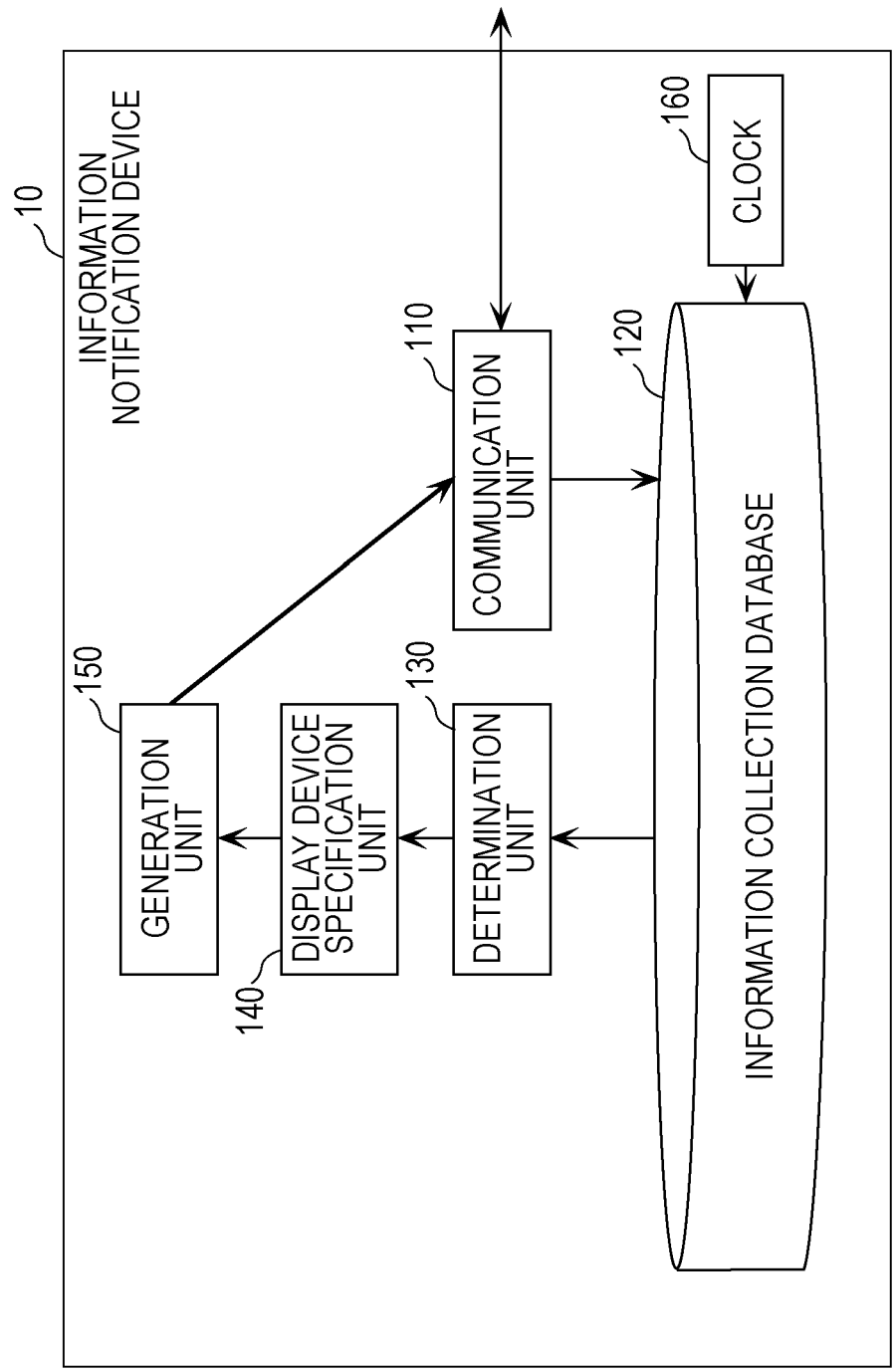
FIG. 5 is a block diagram illustrating a functional configuration of an information notification device according to the first embodiment.

FIG. 5 is a block diagram illustrating a functional configuration of the information notification device 10 according to the first embodiment. FIG. 6 is a diagram illustrating an example of history information stored in an information collection database. FIG. 7 is a diagram illustrating an example of transmission destination information held in a display device specification unit.

The information notification device 10 illustrated in FIG. 5 includes a communication unit 110, an information collection database 120, a determination unit 130, a display device specification unit 140, a generation unit 150, and a clock 160, and obtains information relating to operation states from each of the multiple devices, and so forth.

The communication unit 110 obtains, from a first device (device 20) of the multiple devices which operate by accepting user input, first device information which uniquely identifies the first device, and first history information of the first device, which includes history of at least one of control information of the first device and state information indicating the state of the first device, and transmits notification information. The communication unit 110 transmits the generated notification information to the display device specified by the display device specification unit 140.

Specifically, the communication unit 110 receives device information and history information from a device 20 out of the multiple devices, and registers the received device information in the information collection database 120. The communication unit 110 also transmits the notification information generated at the generation unit 150 to a display device 30 specified by the display device specification unit 140. The device information and history information from the device 20 may be obtained at a timing which the communication unit 110 requests, or at intervals set at the device 20 or whenever transmitted from the device 20, or may be obtained at intervals set at the communication unit 110 (e.g., every 5 seconds).

The information collection database 120 holds information (user information) of the user who owns the first device (device 20), and the first device information, in a correlated manner. The information collection database 120 further holds the received first history information in a manner correlated with the first device information which it holds, based on the first device information received by the communication unit 110. In a case where there is no time information included in the history information which the communication unit 110 has received, the information collection database 120 obtains, from the clock 160, time information the time at which the communication unit 110 received the history information, and correlates and holds the history information and obtained time information.

Specifically, the information collection database 120 stores the user information, device information, and history information, in a correlated manner. User information here is information of the user, indicating for example, name, date of birth, address, and so forth. The user information is registered at the same time of connecting the device 20 to the network 40, in a manner correlated with the device information. It is a prerequisite here that the device 20 is connected to the network 40 here, so the registration method for initially connecting the device 20 to the network 40 and so forth will be omitted from description.

FIG. 6 illustrates an example of contents registered in the information collection database 120, where user information and device information are registered in a correlated manner. History information is further registered in a manner correlated with the device information. The history information may also be registered in a manner correlated with time information, as illustrated in FIG. 6. In a case where time information is not provided to the history information obtained by the communication unit 110, the history information may be registered in the information collection database 120 by being correlated with time information from the clock 160. Note that the contents illustrated in FIG. 6 are only exemplary, and are not restrictive. For example, the device information may be registered in a manner correlated with the user information of the user which is using the device. Further, the history information is not restricted to that illustrated in FIG. 6, and may include all information detectable by the device 20, such as distance traveled, history of changing the traveling mode, and so forth.

In a case where the information included in the first history information held in the information collection database 120 satisfies predetermined condition, the determination unit 130 determines that it is appropriate to transmit notification information relating to the first device (device 20). Specifically, the determination unit 130 determines whether or not to generate notification information based on particular information and conditions set for each device. Particular information as used here is one or more of information included in the history information, such as information if remaining battery level included in the history information of a power-assisted bicycle, for example. Conditions are such as whether the remaining battery level has fallen below a certain threshold value (e.g., 20% or the like), for example. In a case where the particular information satisfies the conditions, the determination unit 130 determines that it is appropriate to generate notification information.

Note that the conditions (e.g., threshold values), and combinations of particular information and conditions, are information set and held by the information notification device 10. For example, in a case where the device is a power-assisted bicycle, a combination is held in which the particular information is the "remaining battery level", and the conditions are "below 20%". The combinations of particular information and conditions are not restricted to be held by the determination unit 130, and may be held in the information collection database 120; however, description will be made in the present embodiment with the combinations being held by the determination unit 130.

The display device specification unit 140 holds transmission destination information indicating one or more display devices to which notification information, relating to each of the one or more devices, is to be transmitted. The display device specification unit 140 specifies a display device, of the multiple display devices, on which notification information relating to the first device is to be displayed, based on the transmission destination information and the received first device information.

Specifically, the display device specification unit 140 holds information indicating to which display device the notification information for a device 20 should be transmitted for display (transmission destination information), and specifies a particular display device 30 based on the device information of the device 20. The display device specification unit 140 holds the transmission destination information illustrated in FIG. 7, for example, and based on this transmission destination information in FIG. 7 confirms the display device 30 correlated with the device 20 and specifies the display device 30 that has been confirmed.

Note that the devices and display devices do not need to be correlated on a one-on-one basis as illustrated in FIG. 7. An arrangement may be made where multiple display devices are correlated with a device, so that the multiple display devices receive transmission of notification information from the communication unit 110. The transmission destination information, which is the correlation between devices and display devices such as illustrated in FIG. 7, may be set at the information notification device 10, or may be set and changed by the user of the device 20. Alternatively, the transmission destination information may be dynamically changed based on history information, which will be described later in a second modification. The transmission destination information may be stored in the information collection database 120.

The generation unit 150 generates this notification information in a case where the determination unit 130 determines that it is appropriate to transmit notification information relating to the first device. Specifically, in a case where the determination unit 130 determines that it is appropriate to generate notification information, the generation unit 150 generates the notification information. The notification information may be generated in a format of an email, or may be generated in a format of a display on a display unit 330 of the display device 30 like a push notification, or may be generated in a format where an application installed in the display device 30 is automatically activated so as to display the notification information using the application.

The clock 160 manages time information indicating the current point-in-time, in terms of, for example, 12:30:15, Sep. 1, 2012.

Control Method of Device

Next, a control method of the above-described device 20 will be described with reference to FIGS. 8A and 8B. FIGS. 8A and 8B are flowcharts illustrating the flow of control at the device 20 according to the first embodiment.

First, the input unit 220 accepts input of user operations (S101).

Next, the control unit 230 controls the device 20 based on operations accepted by the input unit 220 (S102).

The control unit 230 then collects or calculates state information of the device 20 (S103).

Thereafter, the control unit 230 correlates the control information and state information with time information to yield history information, which is stored in the storage unit 240 (S104).

The device 20 performs the processing illustrated in FIG. 8B, in parallel with the control described by way of FIG. 8A. That is to say, first, the communication unit 250 requests the control unit 230 for information to transmit to the information notification device 10 (S111). Next, the control unit 230 obtains history information and device information from the storage unit 240 (S112). The communication unit 250 then transmits the history information and device information obtained by the control unit 230 to the information notification device 10 (S113).

Control Method of Information Notification Device

Next, a control method of the above-described information notification device 10 will be described with reference to FIGS. 9A and 9B. FIGS. 9A and 9B are flowcharts illustrating the flow of control at the information notification device 10 according to the first embodiment.

First, the communication unit 110 receives history information and device information from the device 20 (S201).

Next, the communication unit 110 registers the history information and device information in the information collection database 120, in a manner correlated with the user information, based on the device information (S202). In a case where the history information is not correlated with time information as described above, the history information is correlated with time information of the time at which the communication unit 110 received the history information, and registered in the information collection database 120.

The information notification device 10 performs the processing illustrated in FIG. 9B, in parallel with the control described by way of FIG. 9A. That is to say, the determination unit 130 obtains the history information and device information from the information collection database 120 (S211).

Next, the determination unit 130 determines whether or not it is appropriate to generate notification information, based on whether or not the particular information included in the history information satisfies the predetermined conditions (S212).

In a case where the determination unit 130 determines that there it is not appropriate to generate notification information (NO in S212), the flow ends. On the other hand, in a case where the determination unit 130 determines that there is notification information to be determined (YES in S212), the display device specification unit 140 specifies the display device which is to display the notification information, based on the device information (S213).

Next, the generation unit 150 generates the notification information to be displayed on the specified display device (S214).

The communication unit 110 then transmits the notification information generated by the generation unit 150 to the display device specified by the display device specification unit 140 (S215).

Control method of Display Device

Figure 10:
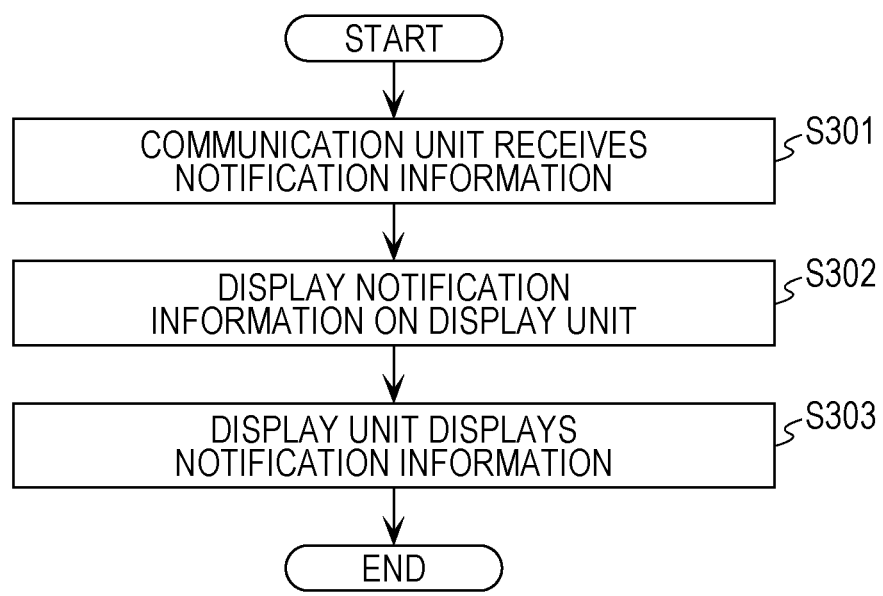
FIG. 10 is a flowchart illustrating the flow of control in the display device according to the first embodiment.

A control method of the above-described display device 30 will be described with reference to FIG. 10. FIG. 10 is a flowchart illustrating the flow of control at the display device 30 according to the first embodiment.

First, the communication unit 310 receives notification information from the information notification device 10 (S301).

Next, the control unit 320 displays the received notification information on the display unit 330 (S302).

The display unit 330 displays the notification information, under command from the control unit 320 (S303).

Sequence of Device, Display Device, and Information Notification Device

FIGS. 11 through 12B are sequence diagrams illustrating the series of actions of the device, display device, and information notification device. FIG. 11 is a compilation of the actions of each of the device, display device, and information notification device, described by way of FIGS. 8A through 10. Components which are the same as FIGS. 8A through 10 are denoted with the same reference numerals.

The descriptions in the components are simplified, but are the same as the processing in FIGS. 8A through 10, so detailed description thereof will be omitted.

Figure 12A:
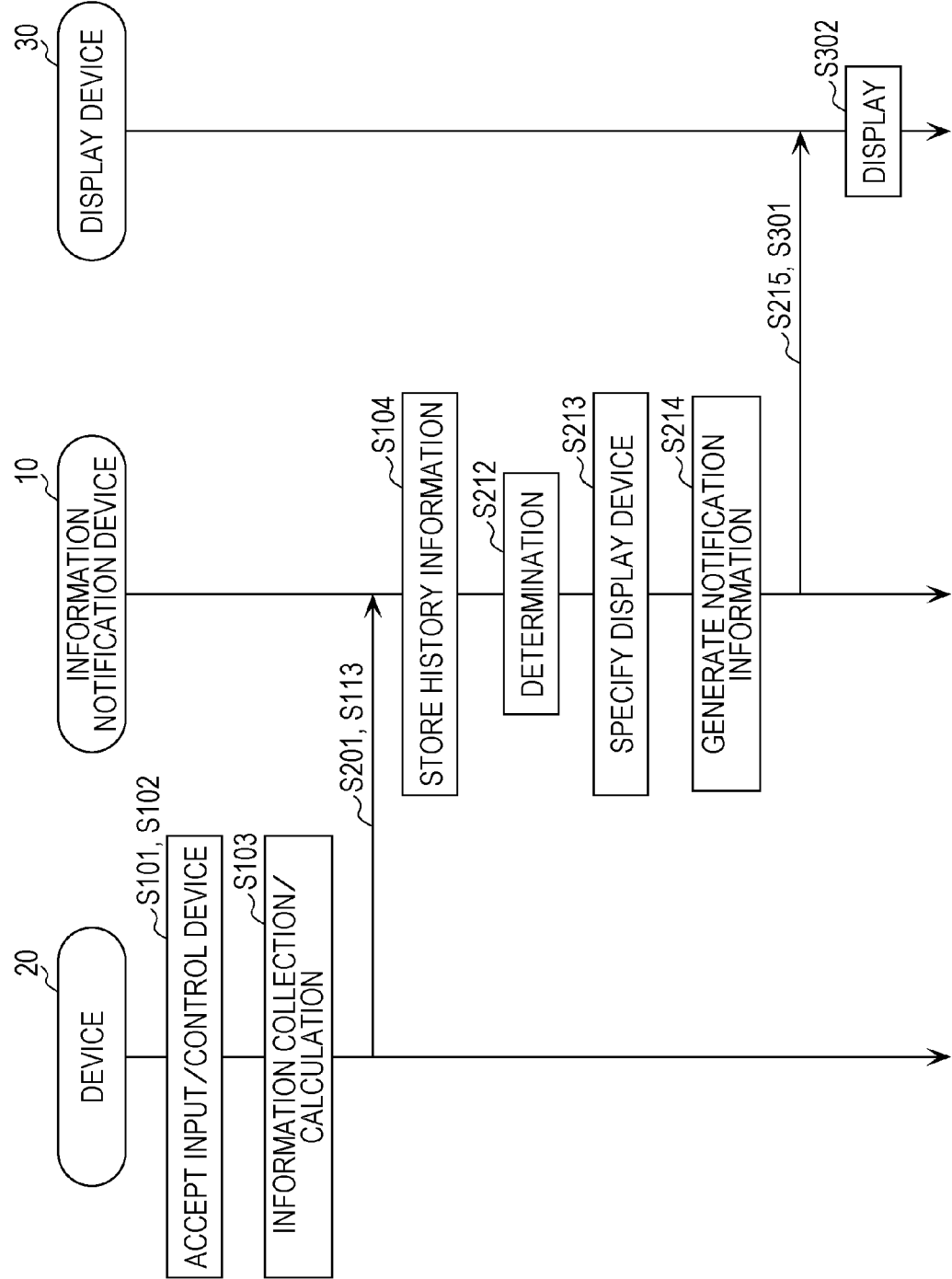
FIG. 12A is a sequence diagram illustrating the series of operations of the device, display device, and information notification device.

It should be noted that FIG. 11 illustrates the processing of S104 being executed at the device 20, but this is not restrictive. For example, the processing of S104 may be performed by the information notification device 10, as illustrated in FIG. 12A. In this case, the device 20 does not perform S104, and only has to transmit the history information and device information to the information notification device 10 in S113. In this case, in S104 the information notification device 10 correlates the control information and state information received in S201 with time information, and stores in the storage unit 240 of the device 20 as history information, and also registers this in the information collection database 120 in S202.

Also, FIG. 11 illustrates the processing of S214 being executed at the information notification device 10, but this is not restrictive. For example, the display device 30 may perform the processing of S214, as illustrated in FIG. 12B. In this case, the information notification device 10 does not perform S214, and only has to transmit the notification information to the display device 30 in S215. Upon receiving notification to the effect that notification information is to be displayed in S301, the display device 30 only has to generate the notification information to be displayed in S214.

Note that the processing which the device, display device, and information notification device perform is not restricted to the examples illustrated in FIGS. 11 through 12B. A device, display device, or information notification device, different from the device, may perform the processing of the display device, and information notification device illustrated in FIGS. 11 through 12B.

Advantages

According to the present embodiment, a information notification device 10 which can perform notification of information at a suitable display location and at a suitable timing, can be realized. More specifically, the determination unit 130 of the information notification device 10 determines whether or not to generate notification information based on the history information of the device 20, and the display device specification unit 140 specifies a suitable display device. Accordingly, the notification information can be displayed on a suitable display device for the user, at a suitable timing, whereby overlooking of the notification information by the user can be reduced.

First Modification

Description has been made in the first embodiment regarding an example of reducing overlooking of the notification information by the user, by displaying the notification information on a suitable display device for the user, at a suitable timing. However, regardless of reduced incidences of the user overlooking notification information, by displaying the notification information on a suitable display device for the user and at a suitable timing, if the user is not at a location where he/she can take action based on the notification information, the notification information will remain unresponded to, and the user may have forgotten the notification information by the time he/she has traveled to a location where he/she can respond.

For example, if the user receives notification information to charge up the power-assisted bicycle while away from home, the user will be unable to perform this action, and may have forgotten about this by the time of reaching home. Description will be made in the present modification regarding a method of transmitting notification information when the user is at a location where the notification information can be responded to, to reduce the possibility of such incidents occurring.

Figure 13:
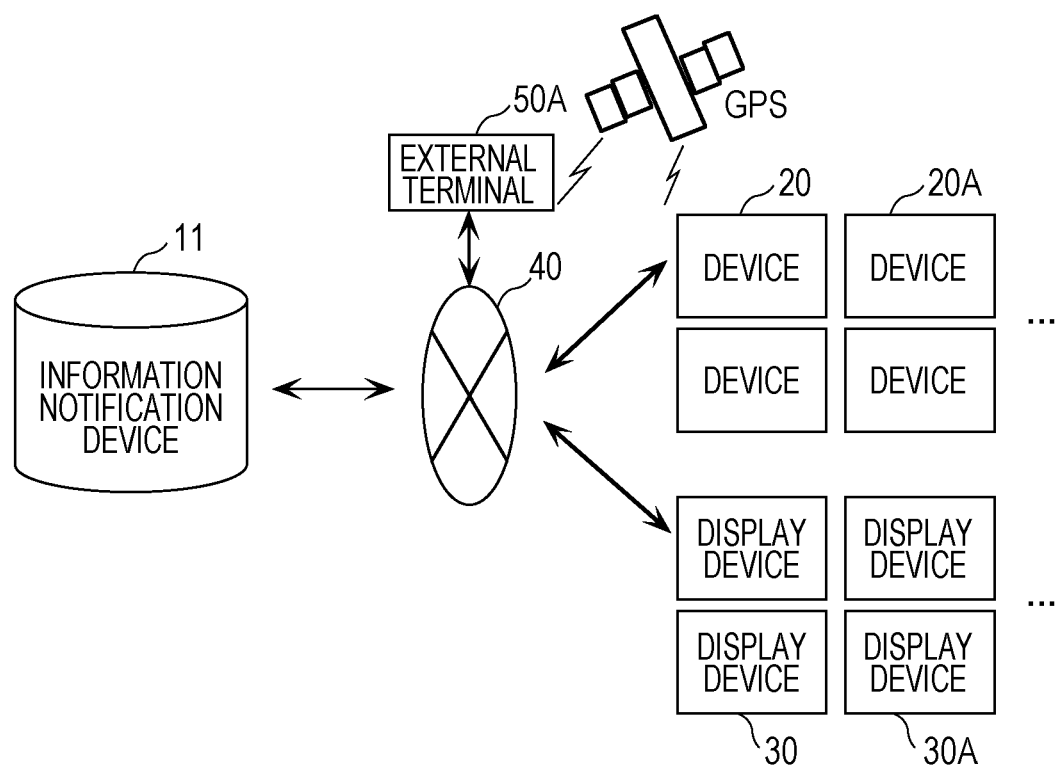
FIG. 13 is a block diagram illustrating a system configuration of a first modification of the first embodiment.

FIG. 13 is a block diagram illustrating a system configuration according to the first modification of the first embodiment. Components which are the same as those in FIG. 2B are denoted with the same reference numerals, and description thereof will be omitted. The system configuration illustrated in FIG. 13 differs from the system configuration illustrated in FIG. 2B with regard to the points that the configurations of an information notification device 11 and an external terminal 50A differ from those of the information notification device 10 and external terminal 50 in FIG. 5B, respectively.

The external terminal 50A is a cellular phone (smartphone or feature phone), and is a terminal which can obtain global positioning system (GPS) information. In addition to the functions of the information notification device 10, the information notification device 11 also receives GPS information from the external terminal 50A.

Having stated such, however, it should be noted that this arrangement is not restricted to the information notification device 11 receiving GPS information from the external terminal 50A. For example, an arrangement may be made where a portable device 20 is provided with functions to obtain GPS information, in which case the information notification device 11 may receive GPS information (location information) from this device 20.

For example, in a case where the power-assisted bicycle is provided with GPS functions, the information notification device 11 may obtain location information from the power-assisted bicycle. In this case, the external terminal 50A and the device 20 may be the same device (that is to say, the device 20 is the bicycle, and at the same time the external terminal 50A also is the bicycle). However, even in a case where the external terminal 50A and the portable device 20 are the same device, description thereof will be the same as in a case where the external terminal 50A and the device 20 are different devices; accordingly, the following description will be made regarding an arrangement where the external terminal 50A and the device 20 are different devices, with the information notification device 11 obtaining GPS information from the external terminal 50A.

Configuration of Information Notification Device

Figure 14:
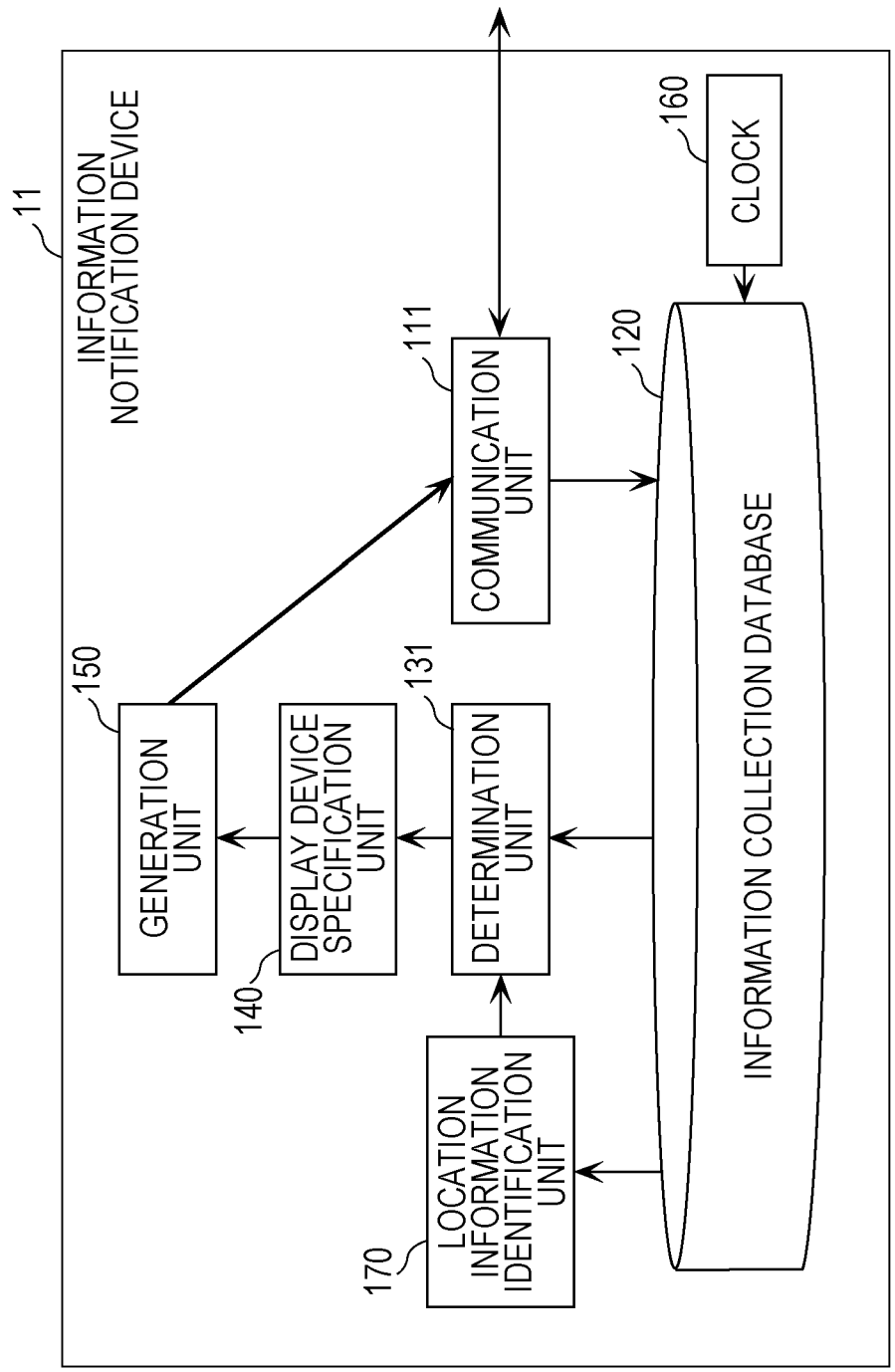
FIG. 14 is a block diagram illustrating a functional configuration of an information notification device according to the first modification of the first embodiment.

FIG. 14 is a block diagram illustrating the functional configuration of the information notification device 11 according to the first modification of the first embodiment. Components which are the same as those in FIG. 5 are denoted with the same reference numerals, and description thereof will be omitted. The information notification device 11 illustrated in FIG. 14 differs from the information notification device 10 in FIG. 5 with regard to the points that the configurations of a communication unit 111 and determination unit 131 differ from those of the communication unit 110 and determination unit 130, respectively, and that a location information identification unit 170 has been added.

The communication unit 111 has the functions of the communication unit 110. The communication unit 111 further receives GPS information from the external terminal 50A, as history information of the external terminal 50A, correlates the user information and device information and history information of the external terminal 50A, and stores in the information collection database 120. Note that the communication unit 111 may receive the GPS information of the external terminal 50A at equal intervals (e.g., every 5 seconds), or may be receive by making a request to the external terminal 50A. In a case where time information is not included in the history information of the external terminal 50A, time information may be added at the time of registering in the information collection database 120, in the same way as with the first embodiment.

The location information identification unit 170 identifies the location of the user. More specifically, the location information identification unit 170 obtains the newest (or the latest) GPS information included in the history information of the external terminal 50A registered in the information collection database 120 to identify the location information of the user. The location of the user as used here is, for example, information indicating the location of the user, such as at home or away from home. Note that the user location information may also be a detailed address, such as "1600 Pennsylvania Avenue, Washington DC". The address of the home of the user is registered in the information collection database 120, so whether the user is at home or away from home can be distinguished from the GPS information.

The determination unit 131 has the functions of the determination unit 130. In a case where information included in first history information held in the information collection database 120 satisfies predetermined conditions, and also the location of the user which has been identified is a location which has been predetermined as being a location at which the user can respond to notification information, the determination unit 131 further determines that it is appropriate to transmit notification information relating to the first device. Specifically, the determination unit 131 determines whether or not it is appropriate to generate notification information, based on the location information of the user identified by the location information identification unit 170, in addition to the conditions which the particular information satisfy as described in the first embodiment.

Note that information stipulating that the location of the user which has been identified is a location predetermined as being a location where the user can respond to notification information, in other words information by which to decide whether or not to display the notification information when the user is at which location in relation to a device 20 regarding which the user is to act (respond) according to the notification information, is held in the device information of the device 20 in a correlated manner. According to this information, in a case where the device 20 is the power-assisted bicycle for example, notification information may be displayed to the effect that the remaining battery level is low when the user is at home. In a case where the device 20 is an air conditioner for example, and the user has forgotten to turn off the air conditioner, notification information may be displayed to the effect that the air conditioner has been left on when the user is away from home. Note that this information which is held may alternatively be held in the determination unit 131, or may be held in the information collection database 120.

Control Method of Information Notification Device

Figure 15:
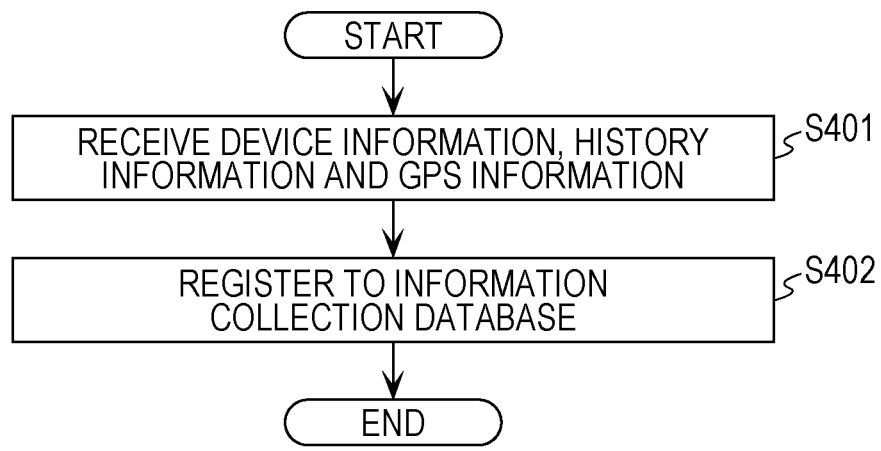
FIG. 15 is a flowchart illustrating the flow of control in the information notification device of the first modification of the first embodiment.
Figure 16:
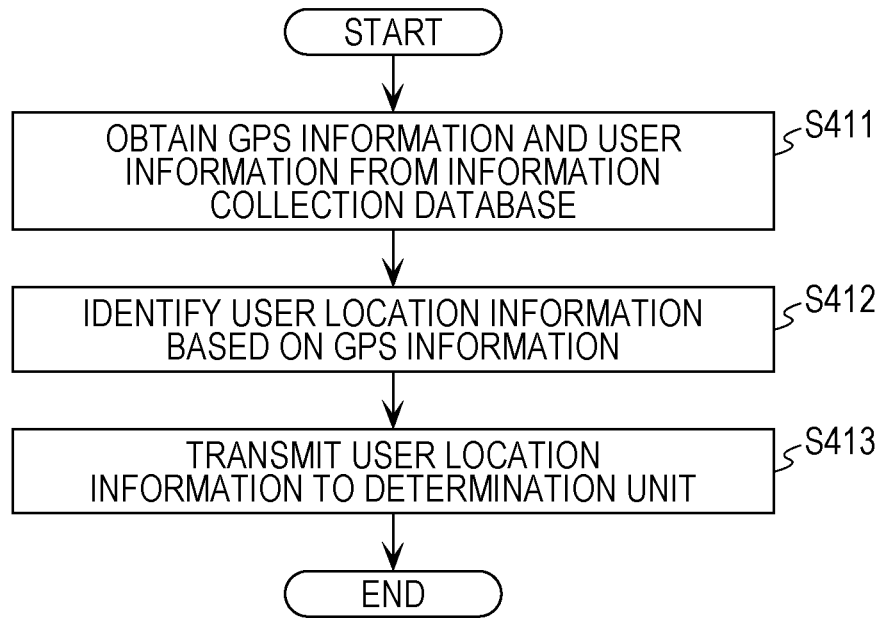
FIG. 16 is a flowchart illustrating the flow of control in the information notification device of the first modification of the first embodiment.
Figure 17:
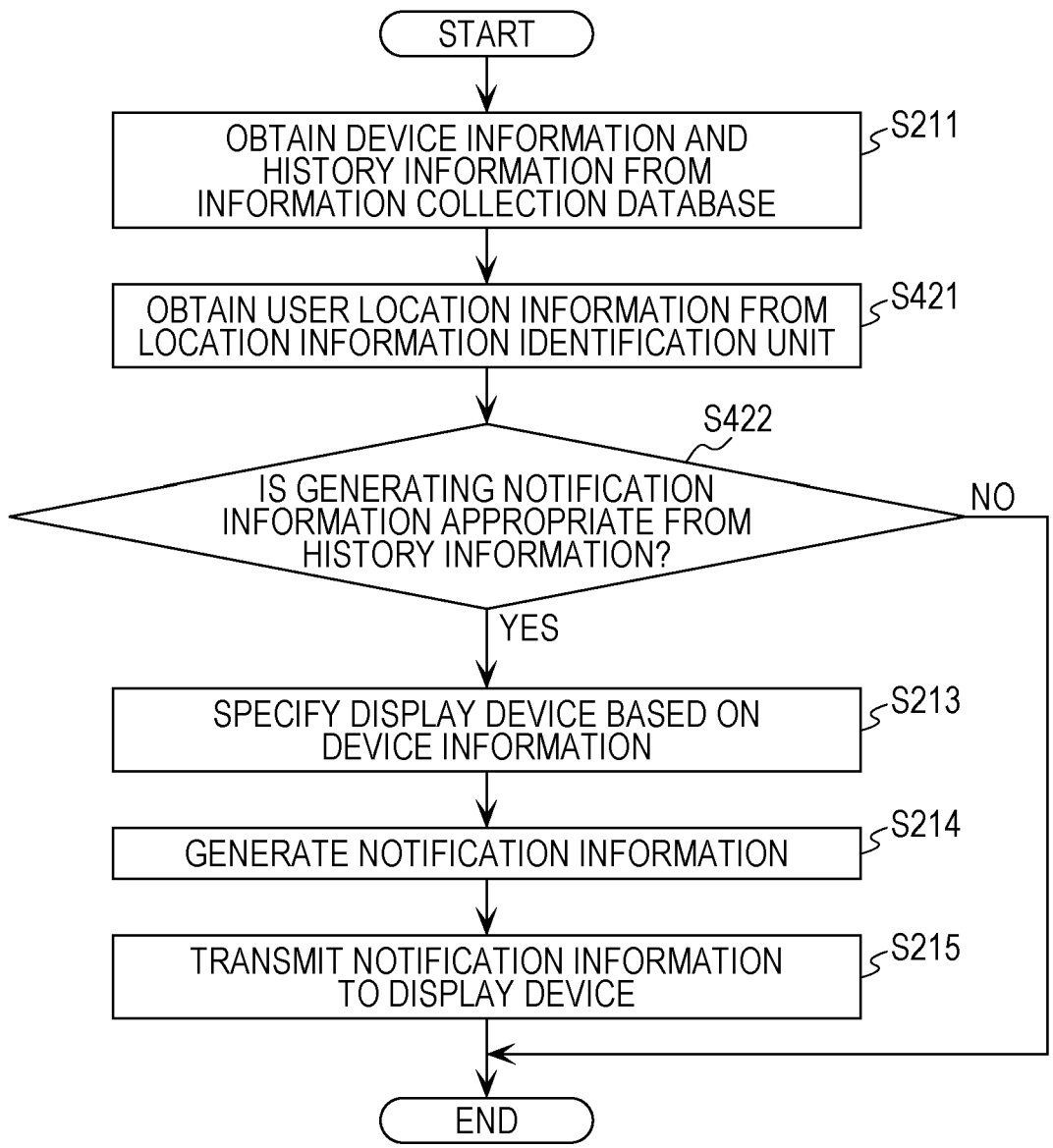
FIG. 17 is a flowchart illustrating the flow of control in the information notification device of the first modification of the first embodiment.

Next, a control method of the information notification device 11 described above will be described with reference to FIGS. 15 through 17. FIGS. 15 through 17 are flowcharts illustrating the flow of control at the information notification device 11 according to the first modification of the first embodiment. Steps which are the same as those in FIGS. 9A and 9B are denoted with the same reference numerals, and description will be omitted.

First, the communication unit 111 receives history information and device information of the device 20 from the device 20, and receives device information and GPS information of the external terminal 50A from the external terminal 50A (S401).

The communication unit 111 next correlates the history information, GPS information, and device information, with the user information, based on each device information, and registers in the information collection database 120 (S402).

The information notification device 11 performs the processing of FIGS. 16 and 17 in parallel with the control described by way of FIG. 15. That is to say, the location information identification unit 170 obtains GPS information, and address information of which is user information, as illustrated in FIG. 16 (S411). Next, the location information identification unit 170 identifies the location information of the user, based on the obtained GPS information (S412). The identified location information is then transmitted to the determination unit 131 (S413).

Also, the determination unit 131 obtains location information of the user transmitted from the location information identification unit 170 in S421, as illustrated in FIG. 17. Next, the determination unit 131 determines whether or not to generate notification information, based on the location information of the user in addition to the combination of the particular information and conditions included in the history information (S422). For example, in a case where the device 20 is the power-assisted bicycle, determination is made that it is appropriate to generate notification information in a case where the remaining battery level is 20% or lower and the user is currently at home. S213 and thereafter are the same as the above-described, and accordingly description thereof will be omitted.

Advantages

According to the present modification, a information notification device 11 which can perform notification of information at a suitable display location and at a suitable timing, can be realized. More specifically, the location information identification unit 170 of the information notification device 11 identifies the location of the user whereby notification information can be displayed when the user is at a suitable location capable of responding to the notification information. Accordingly, the user can act more readily in response to the notification information, and the chances (or cases) of forgetting the notification information can be reduced.

Second Modification

Figure 18:
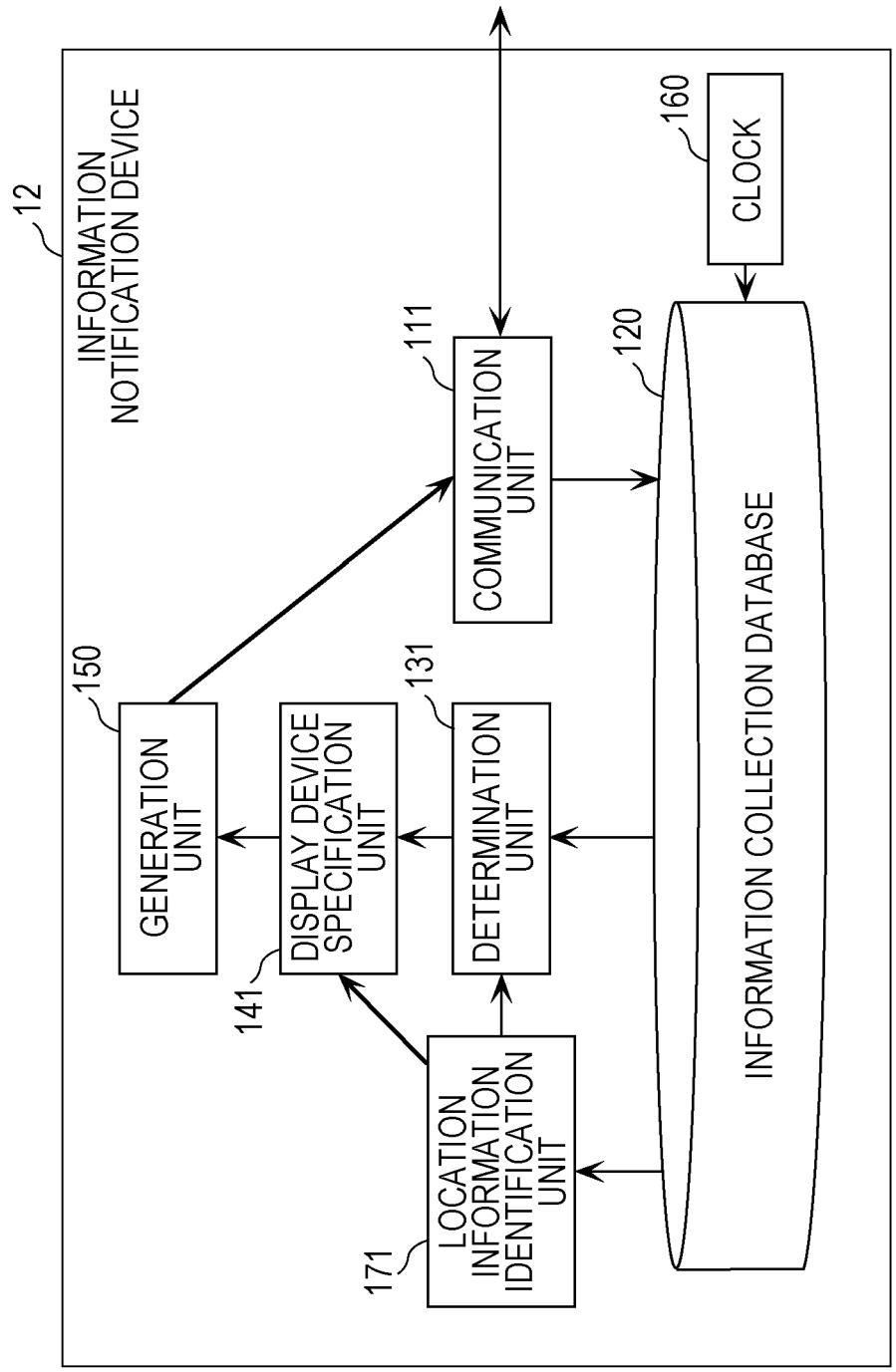
FIG. 18 is a block diagram illustrating a functional configuration of an information notification device according to a second modification of the first embodiment.

An information notification device which is different from that in the first modification will be described in the second modification, with reference to FIG. 18. FIG. 18 is a block diagram illustrating an information notification device 12 according to the second modification of the first embodiment. Components which are the same as those in FIGS. 5 and 14 are denoted with the same reference numerals, and description thereof will be omitted. The information notification device 12 illustrated in FIG. 18 differs from the information notification device 11 in FIG. 14 with regard to the point that the configurations of a location information identification unit 171 and display device specification unit 141 differ from the location information identification unit 170 and display device specification unit 140, respectively.

The location information identification unit 171 references control information included in history information of multiple devices, which the information collection database 120 holds, and identifies a second device having history information including time information which is the closest to the current time out of the multiple devices. More specifically, in addition to the functions of the location information identification unit 170, the location information identification unit 171 references control information included in the history information of one or more devices which can serve as a display device 30, out of multiple devices including the devices 20, and identifies the device of which the control information is the newest (or the latest).

For example, a television set, a cellular phone, and the like, are examples of devices which are a device 20 but can serve as a display device 30. In a case where the user is operating a television set, which is a device 20, the location information identification unit 171 identifies the control information of the television set as being the newest (or the latest). That is to say, by identifying a device having control information of having been operated at a point-in-time closest to the current point-in-time, the user can be assumed to be operating or nearby the identified device.

In a case where the second device identified by the location information identification unit 171 further has a display mechanism, the display device specification unit 141 specifies the second device as being a display device to which to transmit the notification information relating to the first device. More specifically, in addition to the functions of the display device specification unit 140, the display device specification unit 141 further specifies a device 20 which can serve as the display device 30 identified by the location information identification unit 171 to be the display device 30. For example, if the device 20 is the power-assisted bicycle and the display device 30 is a cellular phone, but the location information identification unit 171 identifies that the device 20 of which the control information is newest is the television set, the display device specification unit 141 specifies the television set as the display device 30 instead of the cellular phone. As a result, the notification information is displayed on the television set.

Advantages

According to the present modification, a information notification device 12 which can perform notification of information at a suitable display location and at a suitable timing, can be realized. More specifically, the location information identification unit 171 of the information notification device 12 identifies a device operated at the closest point-in-time to the current point-in-time, and thus can predict that the user is operating or that near the identified device. The display device specification unit 141 specifies the device identified by the location information identification unit 171, whereby the notification information is displayed at the specified device, so the notification information can be communicated to the user even more efficiently. For example, the notification information is displayed on the television set when the user is watching television, so the notification information can be communicated to the user in a sure manner.

Third Modification

An information notification device which is different from that in the first embodiment will be described in a third modification, with reference to FIGS. 19 through 22.

Configuration of Information Notification Device

Figure 19:
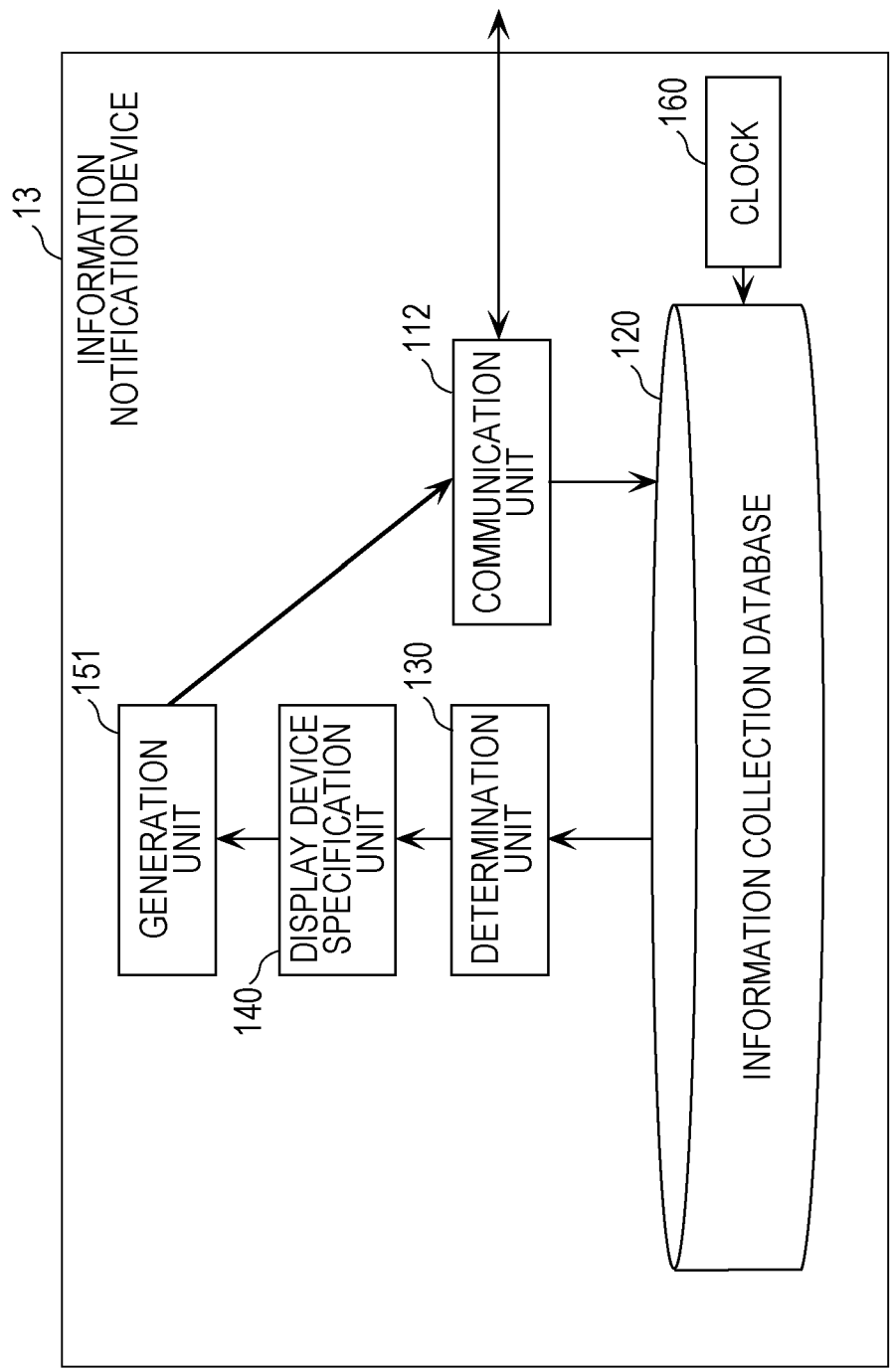
FIG. 19 is a block diagram illustrating a functional configuration of an information notification device according to a third modification of the first embodiment.

FIG. 19 is a block diagram illustrating a functional configuration of an information notification device according to the third modification of the first embodiment. Components which are the same as those in FIG. 5 are denoted with the same reference numerals, and description thereof will be omitted. The information notification device 13 illustrated in FIG. 19 differs from the information notification device 10 in FIG. 5 with regard to the point that the configurations of a communication unit 112 and a generation unit 151 differ from those of the communication unit 110 and generation unit 150, respectively.

In addition to the functions of the generation unit 150, the generation unit 151 further generates control commands of the device 20 along with the notification information. For example, in a case where the device 20 is an air conditioner, the generation unit 151 generates notification information including, in addition to a notification to the effect of "Did you forget to turn off the air conditioner?", notification information prompting control of the device 20, such as "Do you want to turn off the air conditioner? Please answer 'Yes' or 'No'." as well. In a case where 'Yes' has been pressed in the notification prompting control, the generation unit 151 generates a control command to control the device 20 at the same time.

The communication unit 112 transmits the control command for the device 20 to a display device 31. The communication unit 112 may further transmit an operation command to the display device 31 in addition to the notification information.

Configuration of Display Device

Figure 20:
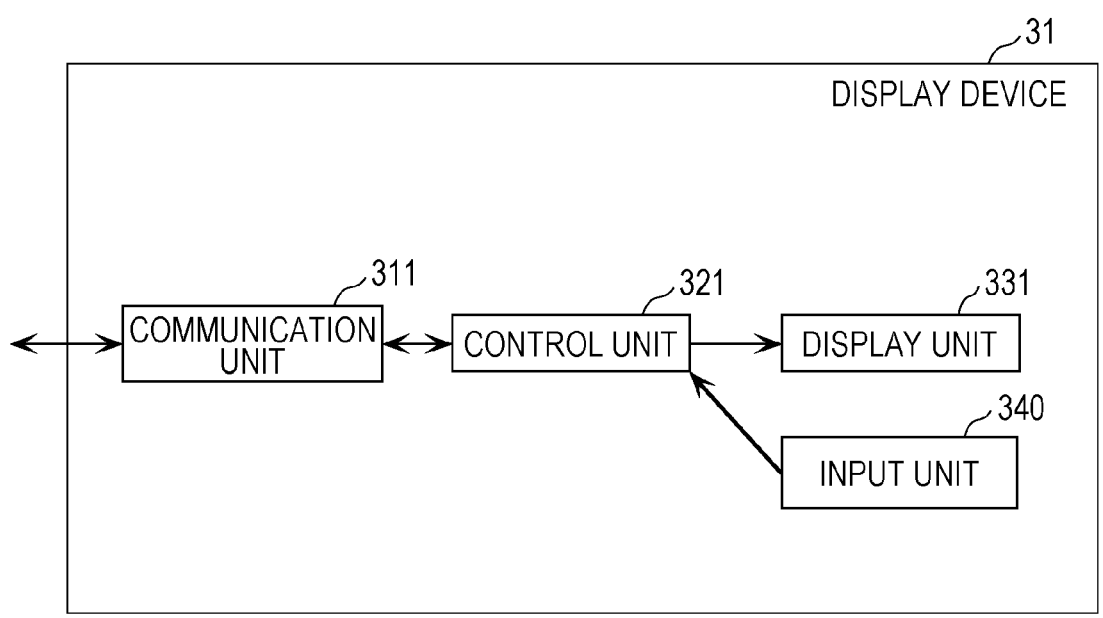
FIG. 20 is a block diagram illustrating a functional configuration of the display device of the third modification of the first embodiment.

FIG. 20 is a block diagram illustrating a functional configuration of the display device according to the third modification of the first embodiment. The display device 31 illustrated in FIG. 20 differs from the display device 30 in FIG. 4 with regard to the points that the configurations of a communication unit 311, a control unit 321, and a display unit 331 differ from those of the communication unit 310, control unit 320, and display unit 330 respectively, and that an input unit 340 has been added.

The communication unit 311 receives notification information and control commands from the information notification device 13. The control unit 321 cause the display unit 331 to display the received notification information. The control unit 321 displays notification information prompting the user to operate the device 20 in the present embodiment. The control unit 321 also transmits a control command for the device 20 that has been generated based on information input by the user using the input unit 340, from the communication unit 311 to the device 20 via the network 40. The display unit 331 displays notification information prompting the user to operate the device 20, and the input unit 340 accepts user input based on the content displayed on the display unit 331.

Control Method of Information Notification Device

Figure 21:
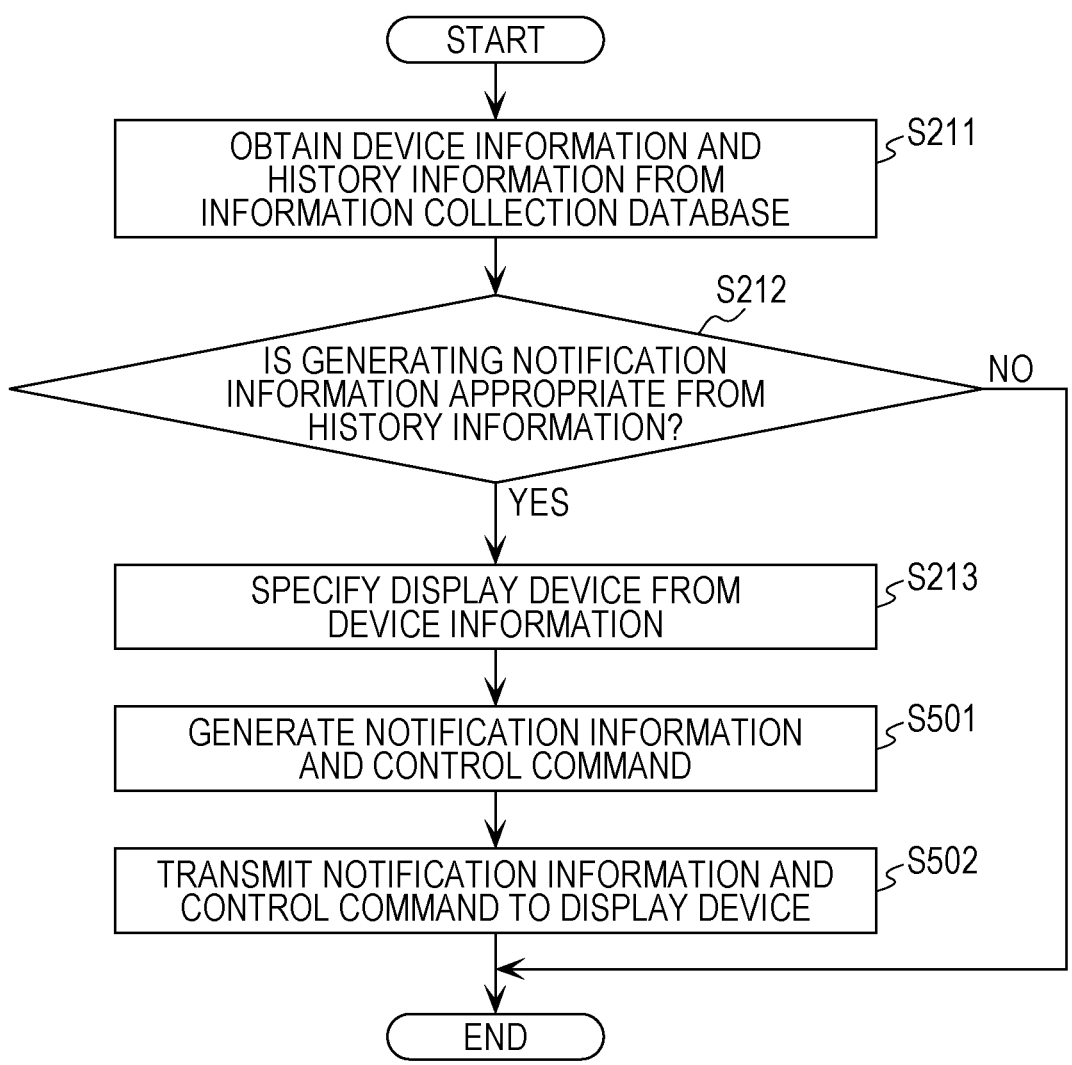
FIG. 21 is a flowchart illustrating the flow of control in the information notification device of the third modification of the first embodiment.

Next, a control method of the above-described information notification device 13 will be described with reference to FIG. 21. FIG. 21 is a flowchart illustrating the flow of control of the information notification device 13 according to the third modification of the first embodiment. Steps which are the same as those in FIGS. 9A and 9B are denoted by the same reference numerals, and description thereof will be omitted.

First, S211 through S213 have already been described, so description will be omitted here.

Next, in S501 the generation unit 151 generates notification information to be displayed on the specified display device, and a control command to control the display device 31 (S501).

The communication unit 112 then transmits the notification information and control command generated by the generation unit 151 to the display device specified by the display device specification unit 140 (S502).

Control Method of Display Device

Figure 22:
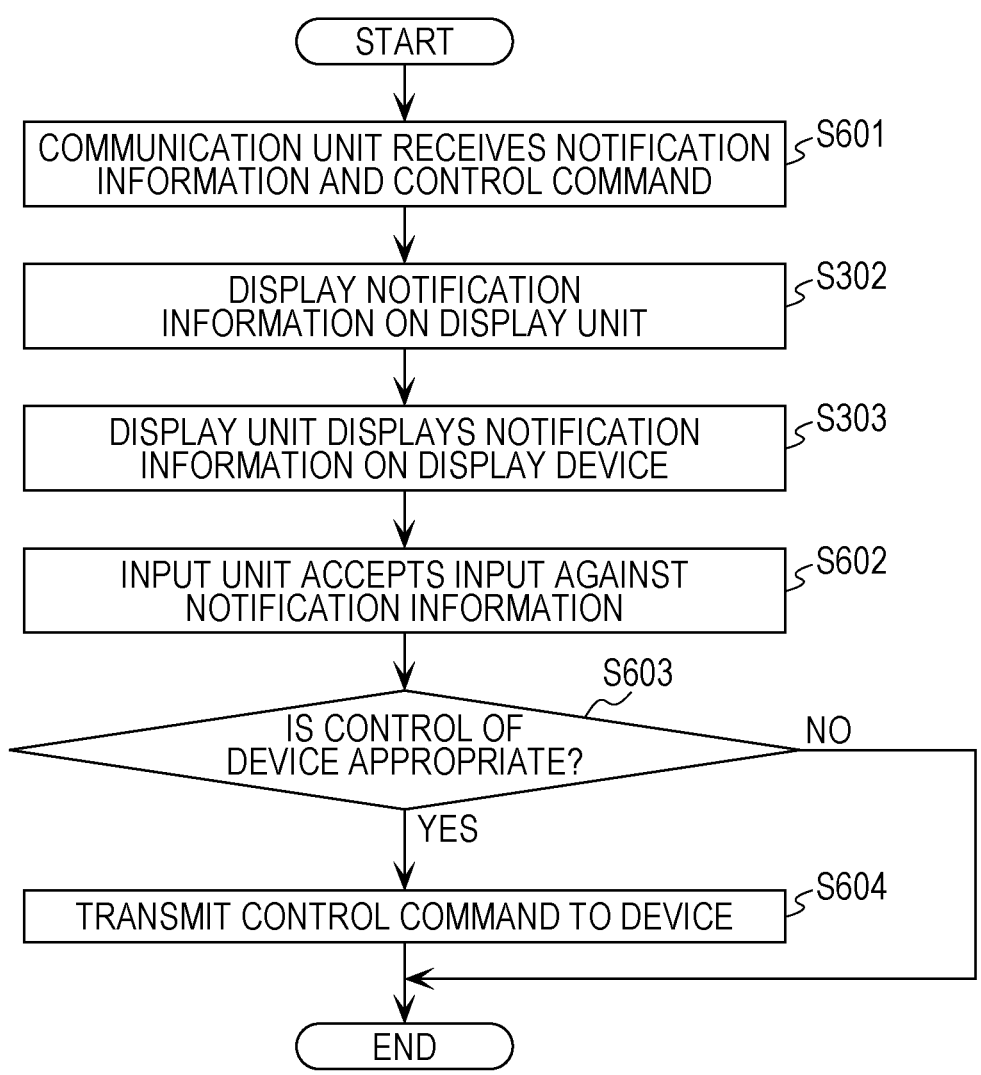
FIG. 22 is a flowchart illustrating the flow of control in the display device of the third modification of the first embodiment.

Next, a control method of the above-described display device 31 will be described with reference to FIG. 22. FIG. 22 is a flowchart illustrating the flow of control of the display device 31 according to the third modification of the first embodiment. Steps which are the same as those in FIG. 10 are denoted by the same reference numerals, and description thereof will be omitted.

First, the communication unit 311 receives notification information and a control command for the device 20 from the information notification device 13 (S601).

Next, when having received the notification information as described above, the control unit 321 causes the display unit 331 to display the notification information to be displayed (S302), and the display unit 331 displays the notification information under command from the control unit 321 (S303).

The input unit 340 then accepts user input operations based on the notification information displayed on the display unit 331 (S602).

The control unit 321 determines whether transmission of the control command, generated based on the input information accepted at the input unit 340, to the device 20, is appropriate (S603).

In a case of having determined that transmission of the control command to the device 20 is not appropriate (NO in S603), the control unit 321 ends the flow. On the other hand, in a case of the control unit 321 having determined that transmission of the control command to the device 20 is appropriate (YES in S603), the communication unit 311 transmits the control command to the device 20 (S604).

Advantages

According to the present modification, a information notification device 13 which can perform notification of information at a suitable display location and at a suitable timing, can be realized. More specifically, the generation unit 151 of the information notification device 13 generates a control command for the device 20, whereby at the time of receiving the notification information, the user can also control the device 20.

Second Embodiment

Description will be made in a second embodiment regarding an example where the device 20 is a washing machine or lighting, and the display device 30 is a smartphone.

Configuration of Information Notification Device

Figure 23:
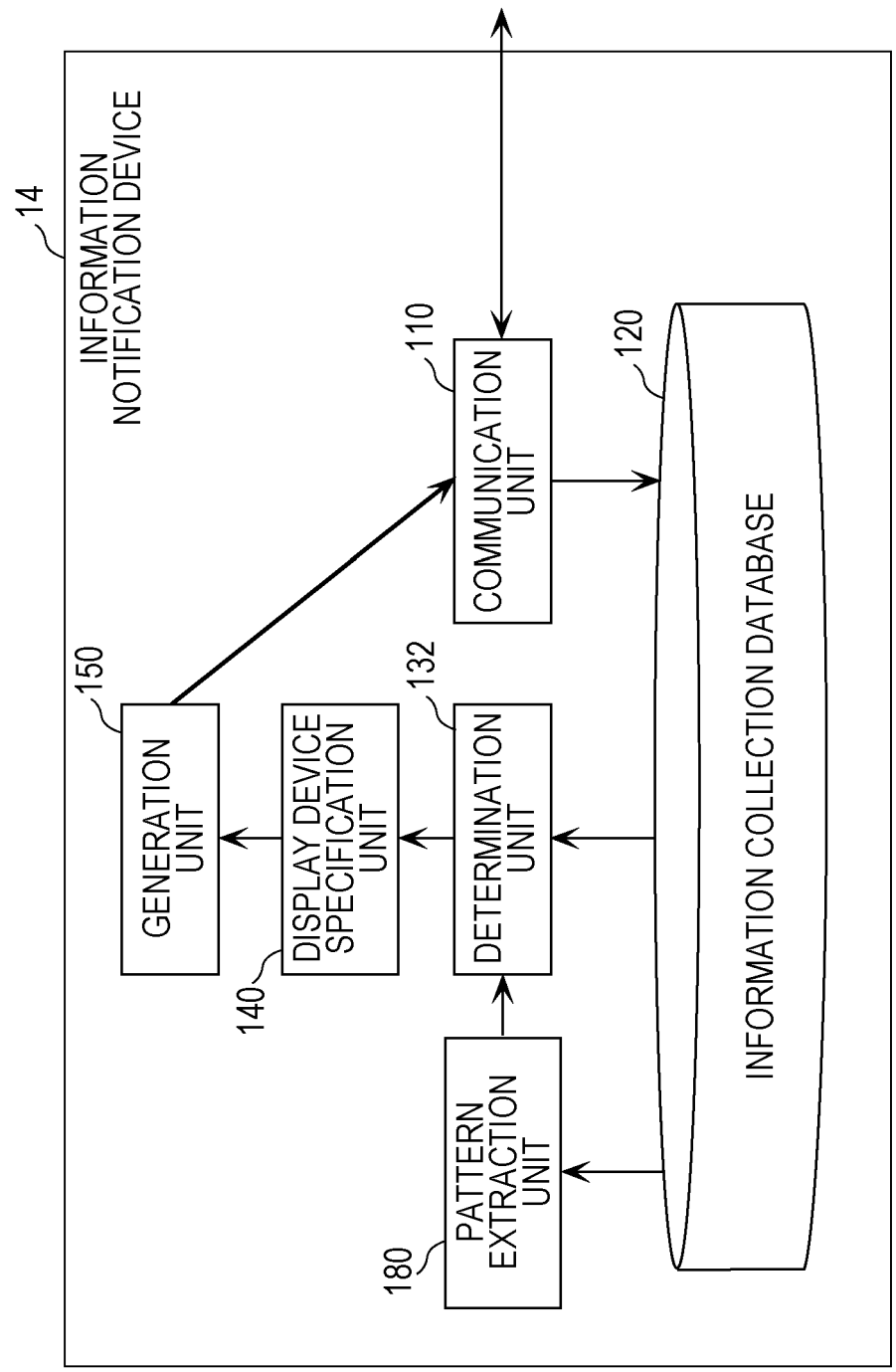
FIG. 23 is a block diagram illustrating a functional configuration of an information notification device according to a second embodiment.

FIG. 23 is a block diagram illustrating a functional configuration of an information notification device according to the second embodiment. Note that components which are the same as those in FIG. 5 are denoted by the same reference numeral, and description thereof will be omitted. The information notification device 14 illustrated in FIG. 23 differs from the information notification device 10 in FIG. 5 with regard to the points that the configuration of the determination unit 132 is different from that of the determination unit 130, and that a configuration of a pattern extraction unit 180 has been added.

The pattern extraction unit 180 extracts a usage pattern of the user using the first device, by referencing the first history information held in the information collection database 120. More specifically, the pattern extraction unit 180 extracts behavioral practices (behavior patterns) of the user using the device, from the history information of the various devices of the user, and time information included therein, which are stored in the information collection database 120. Behavioral practices (behavior patterns) unique to the user, such as running the washing machine everyday before bedtime, or changing the power-assisted bicycle when the remaining battery level is 30% or lower since the power-assisted bicycle is ridden a long distance every day, for example, are extracted as usage patterns of the devices.

The pattern extraction unit 180 extracts usage patterns of the user by data mining techniques, such as correlation analysis, time-series analysis, and so forth. The timing at which the pattern extraction unit 180 extracts usage patterns may be at a timing specified by the administrator of the information notification device 14, or may be at equal intervals (e.g., once a week).

In addition to the functions of the determination unit 130, the determination unit 132 further determines, in a case where determination is made form the first history information that usage of a first device indicated in a usage pattern extracted by the pattern extraction unit 180 is not being used, that transmission of notification information prompting the user to use the first device indicated in the usage pattern is appropriate. The generation unit 150 generates notification information prompting the user to use the first device, and the communication unit 110 transmits the generated notification information to the display device specified by the display device specification unit 140.

More specifically, the determination unit 132 obtains the history information of the device 20 from the information collection database 120, and obtains a usage pattern relating to the device 20 (a usage pattern of the user using the device 20) from the pattern extraction unit 180. The determination unit 132 obtains history information of the device relating to the obtained usage pattern, and time information included therein. For example, a case will be described where the device 20 is a washing machine, and the determination unit 132 obtains the history information of the washing machine and obtains a usage pattern of the washing machine from the pattern extraction unit 180, which indicates a behavioral practice of the user in which the user of the washing machine starts the washing machine running at night before going to bed (before all lights are turned off after 11 PM). In this case, the determination unit 132 has determined from the lighting information in this usage pattern that the user has not yet gone to bed, and accordingly further obtains history information regarding lighting.

In a case of determining from particular information included in the history information of the device 20 that the device 20 indicated in the obtained usage pattern is not being used (in a case where the current usage is different from the obtained usage pattern), the determination unit 132 determines that it is appropriate to generate notification information. The particular information here is information included in the history information of the washing machine, such as power on/off information of the washing machine, for example. That the washing machine which is the device 20 indicated in this usage pattern is not being used, means that the lights have all gone out at night, but the power has not been turned on for the washing machine. In this case, the determination unit 132 can determine that the user has forgotten to run the washing machine, and accordingly can determine that generating notification information is appropriate. Thus, in addition to the history information of the device 20 and the extracted usage pattern, in a case where the device 20 indicated in the usage pattern is determined to not be in use from the history information or time information of another device relating to the device 20, determination can be made that generating notification information is appropriate.

Control Method of Information Notification Device

Figure 24:
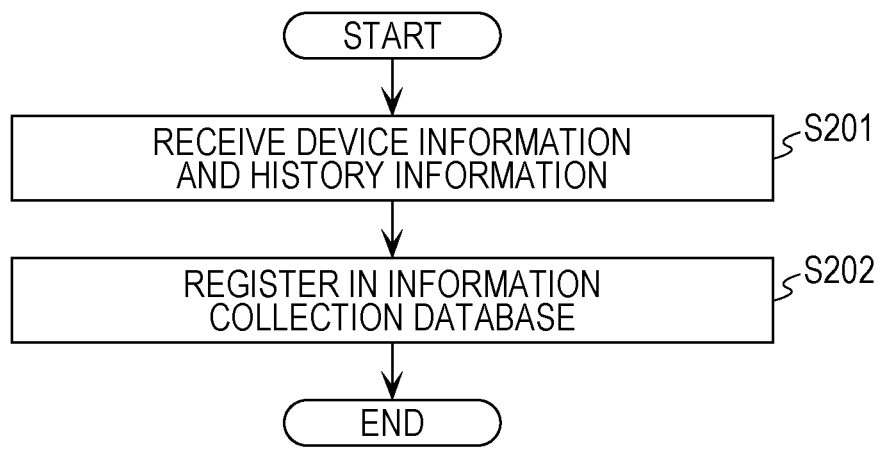
FIG. 24 is a flowchart illustrating the flow of control in the information notification device of the second embodiment.
Figure 25:
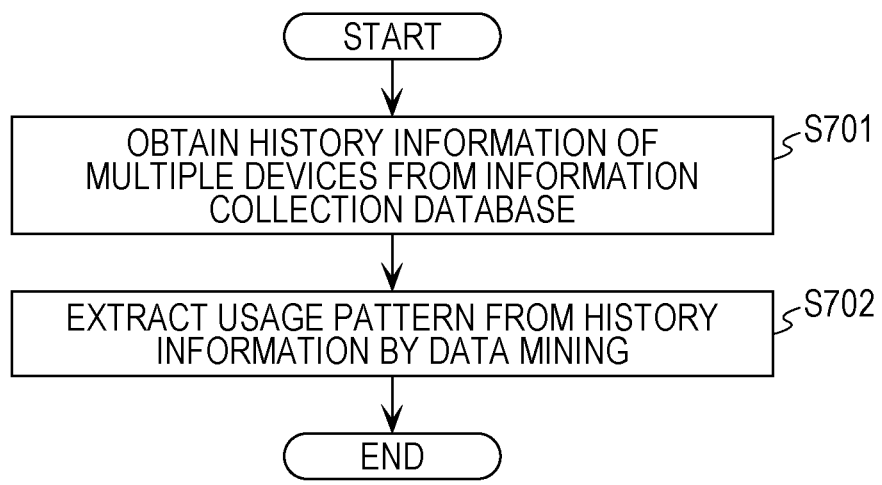
FIG. 25 is a flowchart illustrating the flow of control in the information notification device according to the second embodiment.
Figure 26:
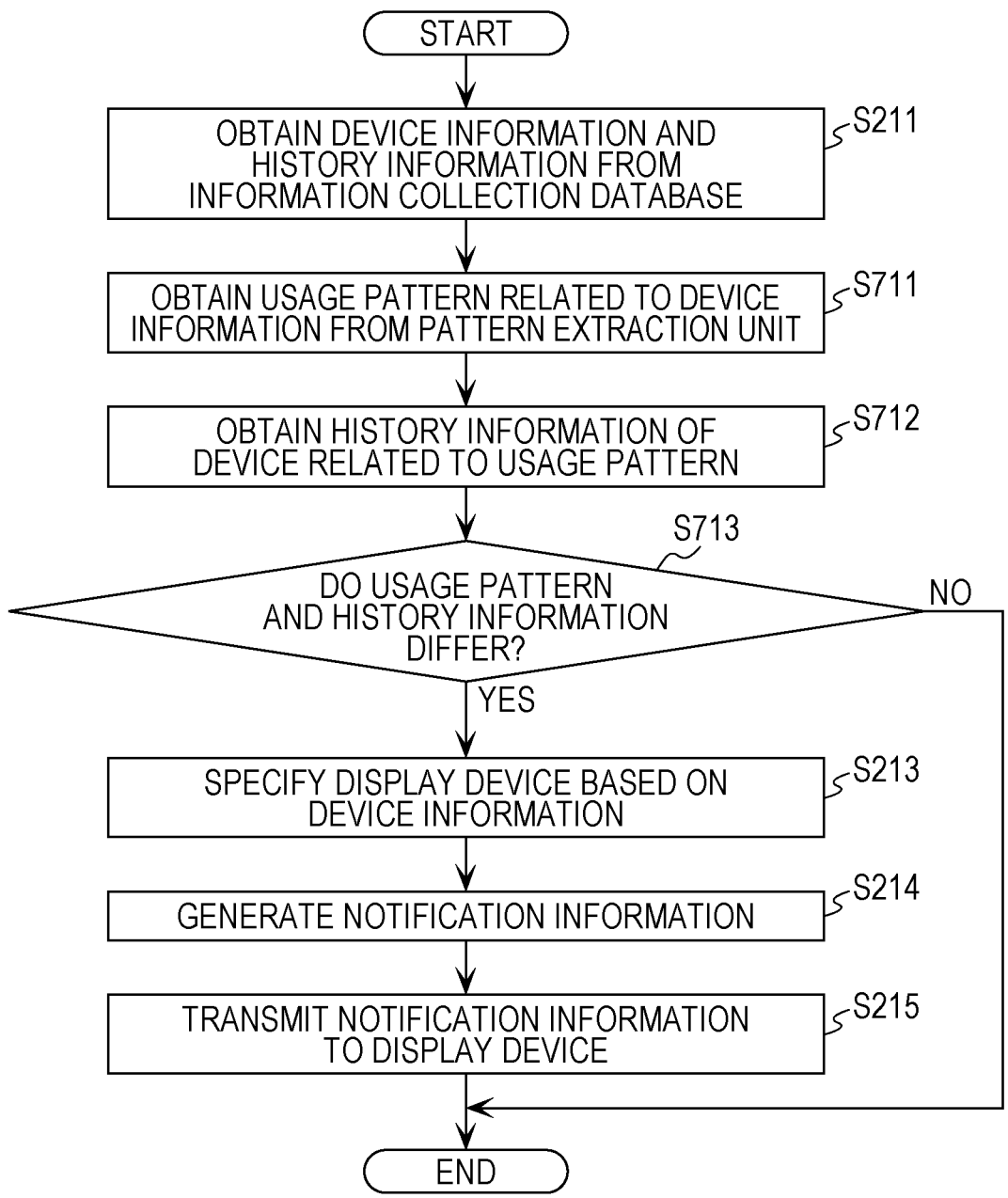
FIG. 26 is a flowchart illustrating the flow of control in the information notification device according to the second embodiment.

Next, a control method of the above-described information notification device 14 will be described with reference to FIGS. 24 to 26. FIGS. 24 to 26 are flowcharts illustrating the flow of control of the information notification device 14 according to the second embodiment. Steps which are the same as those in FIGS. 9A and 9B are denoted by the same reference numerals, and description thereof will be omitted.

First, the flow of control illustrated in FIG. 24 is the same as that already described in FIG. 9A, so description will be omitted.

The information notification device 14 performs the processing illustrated in FIGS. 25 and 26 in parallel with the control described by way of FIG. 24. That is to say, the pattern extraction unit 180 first obtains history information for multiple devices from the information collection database 120 (S701 in FIG. 25).

Next, the pattern extraction unit 180 extracts usage patterns by data mining techniques (S702).

The determination unit 132 obtains history information and device information from the information collection database 120 (S211 in FIG. 26).

Next, the determination unit 132 obtains, from the pattern extraction unit 180, a usage pattern relating to the device information obtained from the information collection database 120 (S711).

The determination unit 132 then references the obtained usage pattern, and obtains other device information relating to that usage pattern and history information or time information (S712).

Next, the determination unit 132 determines whether the obtained usage pattern and the obtained history information differ or not (S713). Specifically, the determination unit 132 determines whether or not the device 20 indicated in the obtained usage pattern is being used. In a case where the obtained pattern and the obtained history information are the same (NO in S713), the determination unit 132 ends the flow. On the other hand, in a case where the obtained pattern and the obtained history information are not the same (YES in S713), the display device specification unit 140 specifies a display device based on the device information (S213).

Thereafter, the generation unit 150 generates notification information to be displayed on a specified display device (S214). The communication unit 110 transmits the notification information generated at the generation unit 150 to the display device specified by the display device specification unit 140 (S215).

Advantages

According to the present embodiment, an information notification device 14 which can perform notification of information at a suitable display location and at a suitable timing, can be realized. More specifically, the pattern extraction unit 180 of the information notification device 14 extracts usage patterns unique to the user so notification information can be communicated at timings and under conditions suitable for each user. Accordingly, the user can receive the notification information at a more suitable timing.

Thus, according to the above-described embodiments, an information notification device which can perform notification of information at a suitable display location and at a suitable timing, can be realized.

In the above-described embodiments, the components may be configured as dedicated hardware, or may be realized by executing a software program suitable for each component. Each component may be realized by a program execution unit such as a processor reading out a software program stored in a recording medium such as a hard disk, semiconductor memory, or the like, and executing the software program. Software which realizes the information notification device and so forth of the above-described embodiments is a program such as described next.

The program causes a computer to execute: communicating, in which is received, from a first device out of multiple devices which operate by accepting input from the user, first device information uniquely identifying the first device, and first history information of the first device including at least one of control information of the first device and state information indicating the state of the first device; correlating and holding, in an information collection database which holds information of the user who owns the first device and the first device information in a correlated manner, the first history information that has been received with the first device information that is held, based on the first device information that has been received; determining that transmission of notification information relating to the first device is appropriate in a case where information included in the first history information held in the information collection database satisfies a predetermined condition, and the location of the user that has been identified is a predetermined location; specifying a display device on which to display the notification information relating to the first device out of multiple display devices, based on transmission destination information indicating one or more display devices to which notification information regarding the one or more devices is to be transmitted, and on the first device information that has been received; and generating the notification information in a case where determination is made in the determining that transmission of the notification information regarding the first device is appropriate. Communication is further performed in which the generated notification information is transmitted to the display device specified in the specifying.

The display of notification information in the above-described embodiments may be realized by a method. For example, an arrangement may be made where an information display method of a system which controls multiple devices which operate by accepting input from a user, an information communication device which obtains information relating to an operating state from each of the multiple devices, and multiple display device which obtain, from the information communication device, information relating to the operating state of at least a first display device out of the multiple devices, and display this information, includes determining, in a case where information relating to the operating state of the first device satisfies a predetermined condition, that notification of information relating to the operating state of the first device is appropriate; specifying, out of the multiple display devices, a first display device which is to display the notification relating to the operating state of the first device, and making notification thereof; and displaying, on the first display device that has been specified, information relating to the operating state of the first device that has been notified.

An arrangement may be made where, for example, in a case where information relating to an operating state of a second device out of the multiple devices that is different from the first device, satisfies a predetermined condition, determination is made that notification of the operating state of the second device is appropriate, a second display device is specified out of the multiple display devices that is different from the first display device, to display the notification relating to the operating state of the second device, and notification is made thereto, and information relating to the operating state of the second device that has been notified is displayed on the second display device that has been specified.

Further, for example, a display may be made on the first display device to the effect that the operating state of the second device is being displayed on the second display device, along with information relating to the operating state of the first device that has been notified being displayed on the first display device.

Further, for example, a list of icons indicating the multiple display devices which the user owns, and a list of icons indicating the multiple devices which the user owns, may be displayed on the screen of the first display device, and user operations on the display screen correlating an icon indicating the first device and an icon representing the first display device may be accepted, so as to specify the first display device out of the multiple display devices to be the display device which displays the notification relating to the operating state of the first device.

While description has been made in the above embodiments regarding cases where the devices are home appliances or the like, used in common homes, the devices may be industrial devices, such as manufacturing machines or the like used in factories or the like, for example.

While description has been made in the above embodiments regarding cases where the information notification device is a Web server owned by a manufacturer or the like, the information notification device may be an in-home server installed in the home, for example.

While description has been made in the above embodiments regarding a configuration where the information collection database 120 is included in the information notification device, the information collection database 120 may be a database situated outside of the information notification device.

While description has been made in the above embodiments that transmission destination information such as illustrated in FIG. 7 is set by the user of the information notification device 10 or a device 20, this is not restrictive. The manufacturer side which provides the information notification device 10 and so forth may set the transmission destination information as initial settings. In this case, the manufacturer side may set the transmission destination information such as the display device being a television if the device 20 is a power-assisted bicycle and the display device being a smartphone if the device 20 is an air conditioner, for example, as initial settings.

Also, in a case where the user sets the transmission destination information, an arrangement may be made where the user can view a list of his/her own devices (device list) registered in the information collection database 120 on a smartphone, personal computer, or the like, and can select a display device for notification information for each device which he/she has registered. In this case, the display device may have a database information obtaining unit, an input unit, and a display unit. More specifically, the display unit displays obtained device information, and the input unit accepts user operations. The database information obtaining unit requests the information collection database 120 for a list of devices which the user owns (has), when the input unit accepts a database information obtaining command. In a case where the user has used the input unit to select a display unit to display notification information regarding the device, the information notification device collects this information from the display device, and updates the contents of the display device specification unit.

Figure 27:
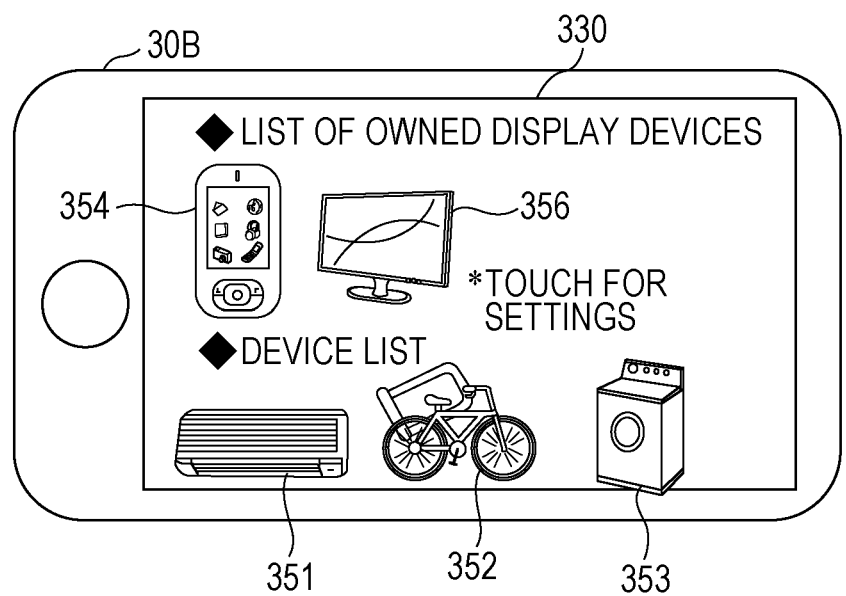
FIG. 27 is a diagram illustrating an example of a display screen where display device candidates and devices are displayed as icons.

Now, an example of selecting a display device for notification information for each device, in a case where a device list of a user is displayed by icons on a smartphone, which also is a display device, will be described with reference to FIGS. 27 through 28C. FIG. 27 is a diagram illustrating an example of a display screen where display device candidates and devices are displayed as icons, and FIGS. 28A through 28C are diagrams for describing an example of settings of transmission destination information in FIG. 27.

In the example illustrated in FIG. 27, a list of devices, in which each device is represented by an icon, is displayed on the display unit 330 of a smartphone which also is a display device 30B. Also displayed here is a list of display devices which the user owns (has), in which each display device is represented by an icon. Specifically, in the example illustrated in FIG. 27, an air conditioner icon 351, a power-assisted bicycle icon 352, and a washing machine icon 353, are displayed as icons for devices, and a smartphone icon 354 and a television set icon 356 are displayed as icons for display devices.

In this case, if the user wants to set the display device for displaying notification information for the power-assisted bicycle to be the smartphone for example, the user drags the power-assisted bicycle icon 352 on the display unit 330 on top of the smartphone icon 354, as illustrated in FIGS. 28 (a) and 28 (b). This sets the smartphone as being the display device which displays the notification information regarding the power-assisted bicycle. An arrangement may be made such as illustrated in FIG. 28 (c) for example, where a power-assisted bicycle icon 352c is displayed at a reduced size overlapping the smartphone icon 354. It can also be seen from FIG. 28 (c) that an air conditioner icon 351c is displayed at a reduced size overlapping the television set icon 356, meaning that the television set has been set as being the display device to display notification information regarding the air conditioner.

The method for setting (selecting) the display devices for notification information is not restricted to the immediately-preceding example. For example, the smartphone service as the display device 30B may display information prompting selection of a display device.

Figure 29A:
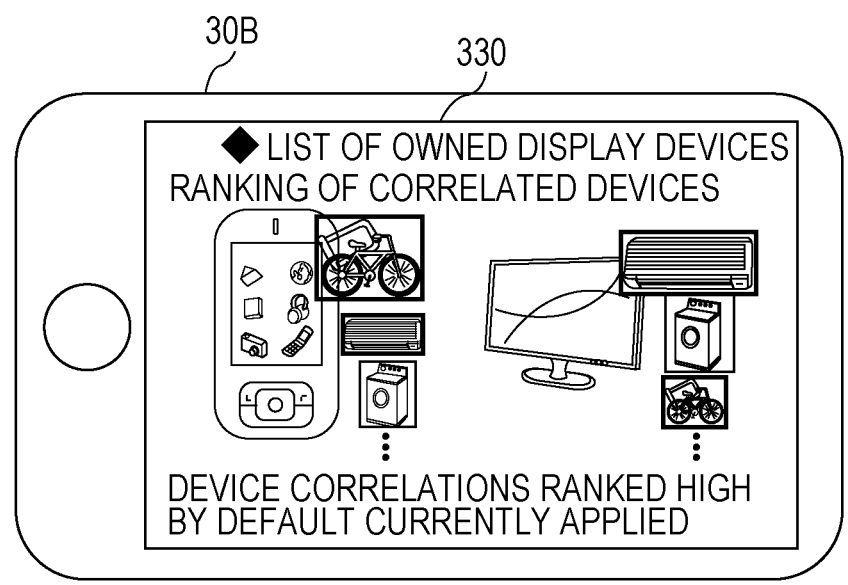
FIG. 29A is a diagram illustrating an example of a display screen where icons for display device candidates are displayed according to device icons.
Figure 29B:
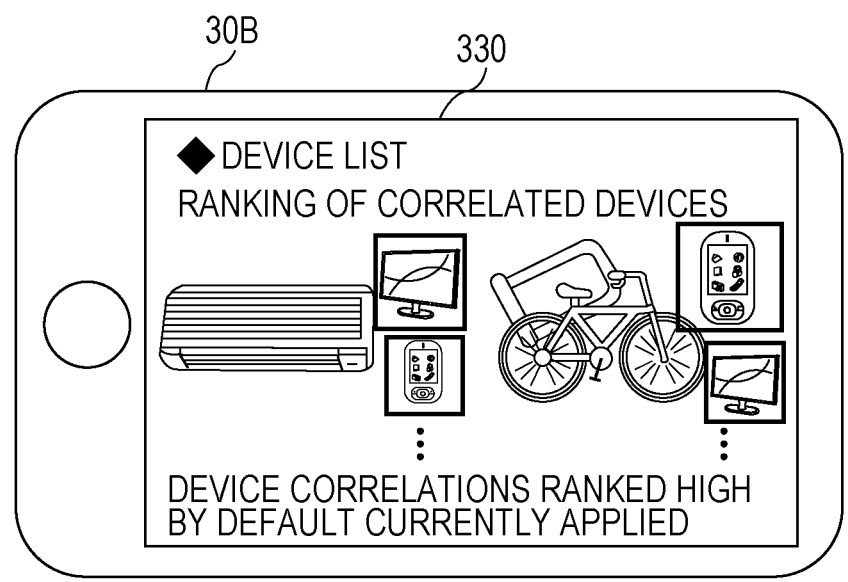
FIG. 29B is a diagram illustrating an example of a display screen where icons for display device candidates are displayed according to device icons.

FIGS. 29A and 29B are diagrams illustrating examples of display screens where icons of display device candidates are displayed for each device. Icons representing display devices which the user owns (has) may be displayed as illustrated in FIG. 29A, with icons of device candidates regarding which the display devices are to be selected as notification information destinations being displayed nearby, as illustrated in FIG. 29A. Alternatively, icons representing devices may be displayed as illustrated in FIG. 29B, with icons of display device candidates to which the notification information regarding the device is to be transmitted being displayed nearby.

In the example illustrated in FIG. 29A, the devices are displayed ranked according to past results at the providing side (manufacturer) of the information notification device 10 or the like, history of selection of devices by users in the past, and so forth. Higher-ranking devices are correlated by default. In more detail, the power-assisted bicycle is selected by default as a device regarding which notification information is displayed on the smartphone. The air conditioner is selected by default as a device regarding which notification information is displayed on the television set. In the example illustrated in FIG. 29B, the devices are displayed ranked according to past results at the providing side (manufacturer) of the information notification device 10 or the like, history of selection of display devices by users in the past, and so forth. Higher-ranking display devices are correlated by default. In more detail, the smartphone is selected by default as a display device for displaying notification information regarding the power-assisted bicycle. The television set is selected by default as a display device for displaying notification information regarding the air conditioner. This facilitates selection of a display device for each device by the user on the display unit 330.

While description has been made in the above embodiments regarding an example where transmission destination information such as illustrated in FIG. 7 is set by the user of the information notification device 10 or a device 20, this is not restrictive. Even in a case where the user has set the transmission destination information, the information notification device 10 or the like may perform settings such that display devices which are commonly specified are also set so as to display the notification information. That is to say, if a television set is commonly specified as a display device to display notification information regarding the air conditioner, for example, the television set may also be specified as a display device in addition to the display device set by the user, so that the notification information is displayed on the television set as well.

Figure 30:
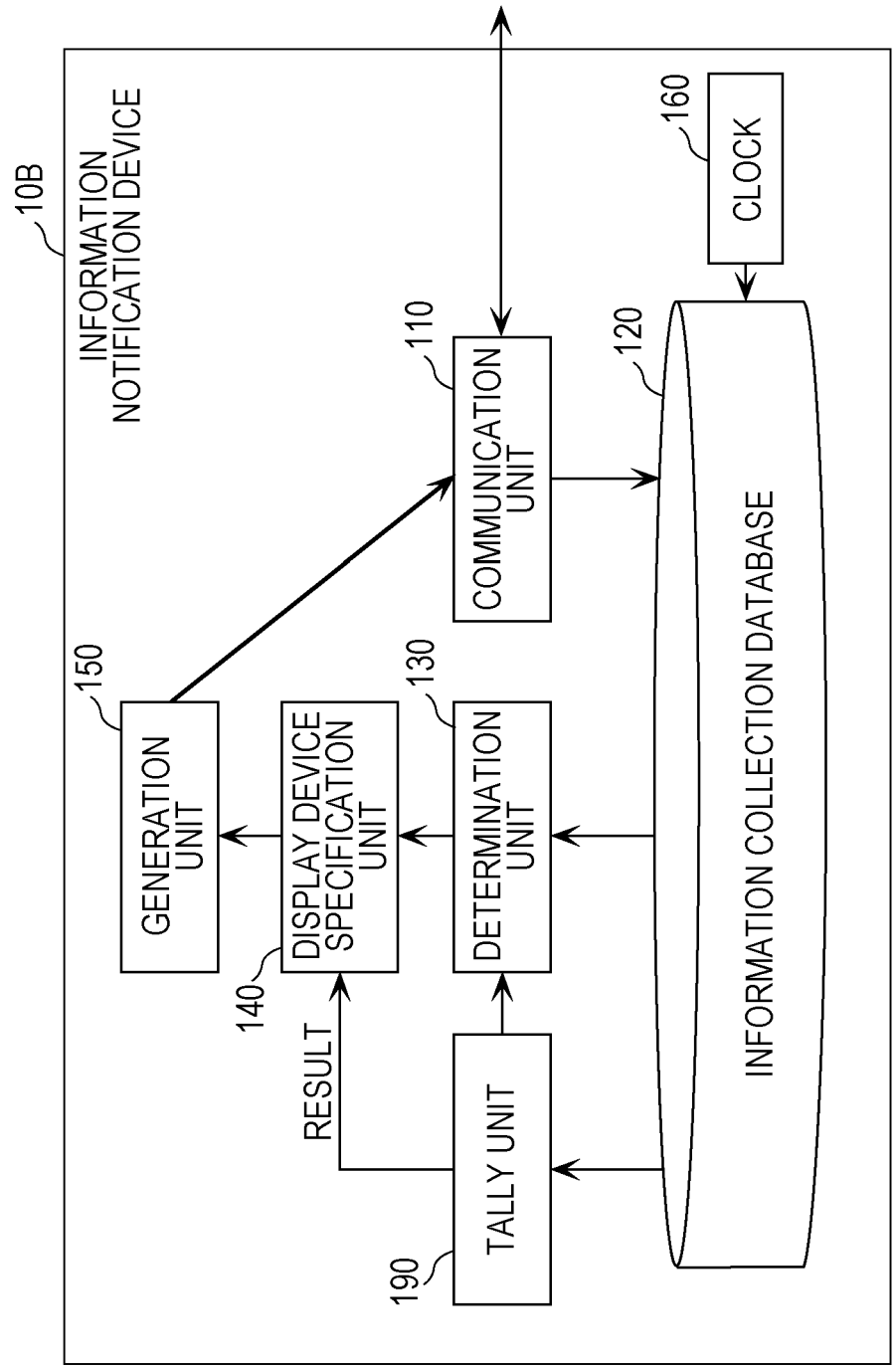
FIG. 30 is a block diagram illustrating a functional configuration of an information notification device, set so as to be displayed on a commonly-specified display device.

A configuration of an information notification device which realizes this arrangement will be described next. FIG. 30 is a block diagram illustrating a functional configuration of an information communication device 10B, set so as to be displayed on a commonly-specified display device. Note that components which are the same as those in FIG. 5 are denoted by the same reference numerals, and description thereof will be omitted. The information notification device 10B illustrated in FIG. 30 differs from the information notification device 10 in FIG. 5 with regard to the point that a tally unit 190 has been added.

The tally unit 190 uses the information which the information collection database 120 holds (records) to keep track of the multiple devices and display devices held (recorded) therein, and transmits the tallied results to the display device specification unit 140. The display device specification unit 140 specifies display devices in the higher-ranking combinations based on the results transmitted thereto, in addition to the display devices set by the user.

The information notification device 10B thus tallies the multiple devices and display devices held (recorded) in the information collection database 120 using the information held (recorded) therein, and applies higher-ranking combinations. Accordingly, the notification information can be displayed on display devices applied as high-ranking combinations, in addition to user-set display devices.

An arrangement may be made regarding the above-described embodiments where, in a case that the user is viewing notification information regarding a device on a screen of one display device which the user has specified in the transmission destination information, notification information regarding a separate device is also displayed thereupon in an overlapping manner.

Figure 31A:
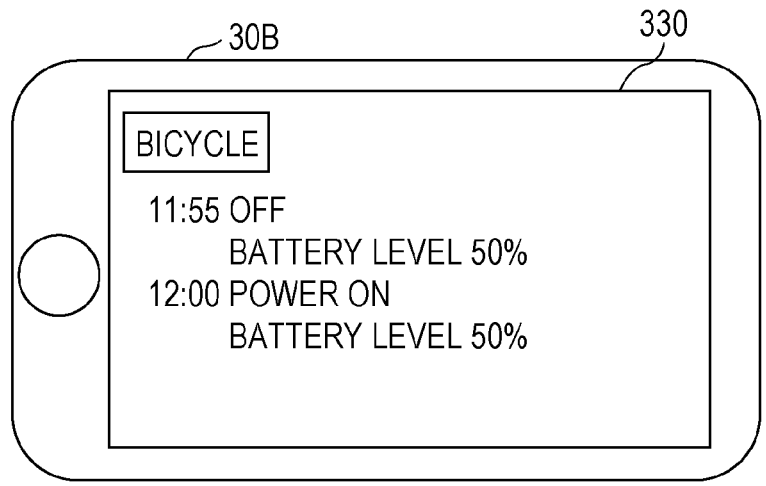
FIG. 31A is a diagram illustrating an example of a display screen displaying information indicating a display device displaying notification information.
Figure 31B:
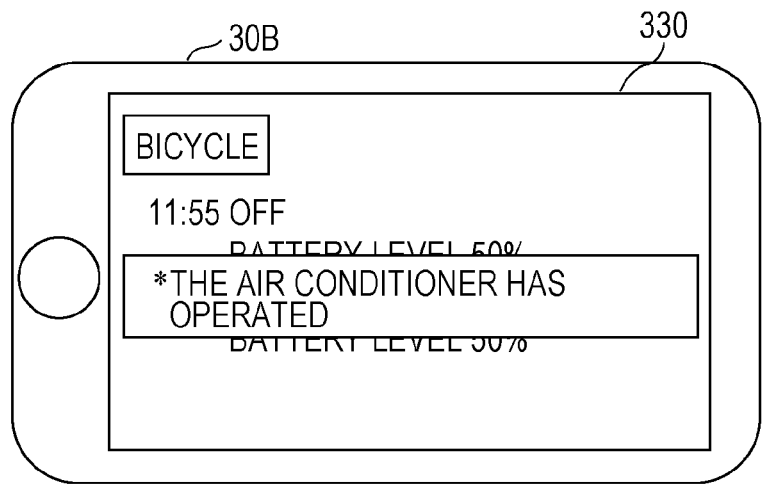
FIG. 31B is a diagram illustrating an example of a display screen displaying information indicating a display device displaying notification information.

An example of this arrangement will be described with reference to FIGS. 31A through 31C. FIGS. 31A and 31B are diagrams illustrating an example of a display screen displaying information representing a display device displaying notification information. In the example illustrated in FIG. 31A, the user is confirming notification information regarding the power-assisted bicycle on the display unit 330 (display screen) of the smartphone which is the display device 30B. Notification information to the effect that the air conditioner has operated is then further displayed thereupon, as illustrated in FIG. 31B. By overlapping the notification information regarding another device in this way, the chances (or the cases) of the user overlooking the notification information are reduced.

Figure 31C:
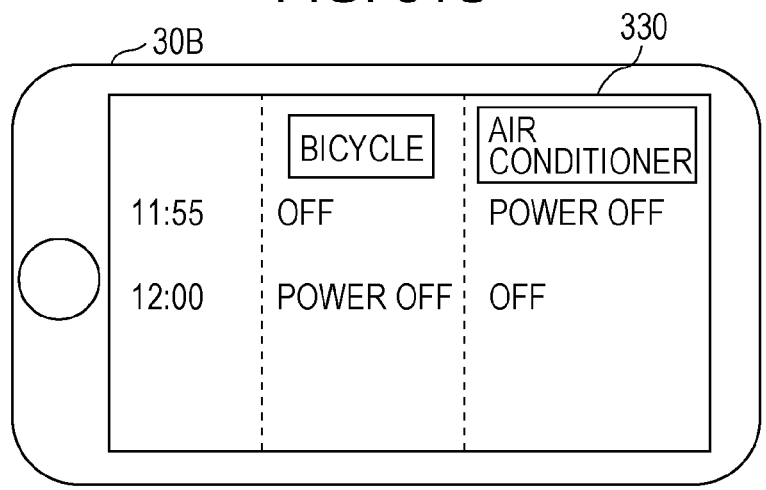
FIG. 31C is a diagram illustrating another example of a display screen displaying information indicating a display device displaying notification information.

The display form in which notification information is displayed at the same time on the screen of one display device specified in the transmission destination information is not restricted to the above-described arrangement, and a parallel display may be made as well, such as illustrated in FIG. 31C. FIG. 31C is a diagram illustrating another example of a display screen displaying information indicating the display device displaying the notification information.

Also, an arrangement may be made in the above embodiments where, in a case where the user is viewing the screen of a certain display device, but that display device is not specified in the transmission destination information, information is displayed indicating the display device on which the notification information is being displayed. An example of this arrangement will be described below.

Figure 32:
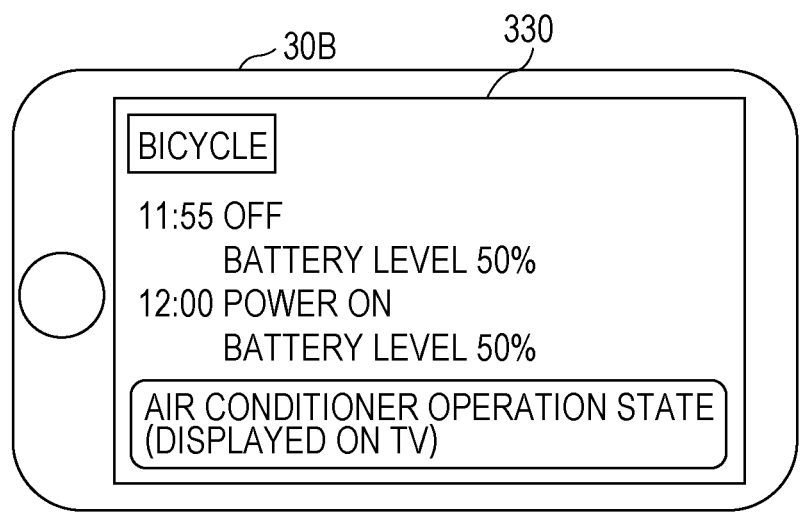
FIG. 32 is a diagram illustrating an example of a display screen displaying information indicating a display device displaying notification information.

FIG. 32 is a diagram illustrating an example of a display screen displaying information indicating the display devices displaying notification information. In the example illustrated in FIG. 32, the user has been confirming history information of the power-assisted bicycle or notification information regarding the power-assisted bicycle on the display unit 330 (display screen) of the display device 30B which is a smart phone, upon which a display is made to the effect that notification information regarding the operating state of the air condition is being displayed on the television set.

Thus, information to the effect that notification information is being displayed on a display device specified in the transmission destination information may be displayed on the display unit 330 of the display device 30B, which is a different display device from the specified display device. In other words, the information notification device 10 or the like may transmit notification information to a display device specified in the transmission destination information, and also transmit sub-information of the notification information to a display device other than the specified display device so as to display the sub-information.

Also, an arrangement may be made in the above-described embodiments where, in a case where there is a display device that has been specified in the transmission destination information that is showing an error, a display may be made on the display screen of a display device to that effect. This example will be described below.

Figure 33:
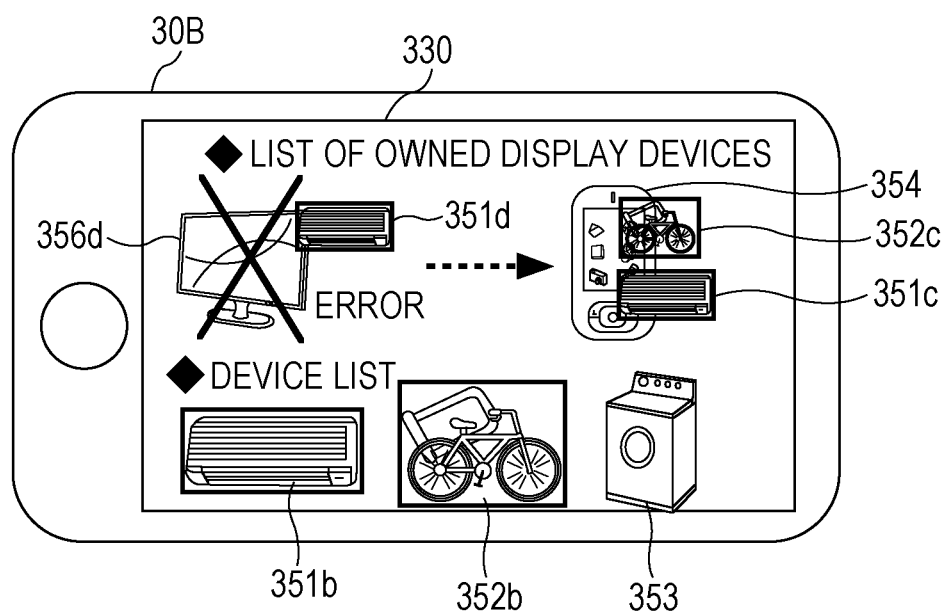
FIG. 33 is a diagram illustrating an example of a display screen on which is displayed a notice to the effect that an error has occurred among the display devices.

FIG. 33 is a diagram illustrating an example of a display screen making a display to the effect that there is a display device showing an error. The same components as those in FIGS. 28A through 28C are denoted by the same reference numerals, and description will be omitted.

The example illustrated in FIG. 33 illustrates a television set icon 356d indicating an error, on the display unit 330 of the display device 30B which is a smartphone, due to the television set, which is one of the display devices, not being able to display (or transmit) notification information as the power to the television set has been turned off or some other reason. The television set has been specified as a display device to display notification information regarding the air conditions, which can be seen from the fact that the air conditioner icon 351d is displayed at reduced size next to the television set icon 356d which is showing the error.

In this case, the notification information is displayed on a different display device from the television set. That is to say, the notification information is being displayed on the smartphone which is a different display device, which can be seen from the air conditioner icon 351c being displayed at reduced size next to the smartphone icon 354.

Accordingly, the method for displaying notification information in a case where a display device is showing an error may be set such that the notification information is displayed on a display device other than the specified display device which has the highest priority. The method of determining the priority of the different display devices may be specified by the user, or may be specified by the providing side (manufacturer), or may be specified in order of most recently operated display devices. Further, display may be in order from the setting value of registration in the information collection database 120, or may be set according to an order set by people having the same family makeup as the user.

An arrangement may be made in the above-described embodiments where the information notification device does not display notification information based on lifestyle patterns of the user. For example, the determination unit of the information notification device may determine the time that the user goes to bed and rises, from history information of devices such as lighting, and estimate the lifestyle pattern of the user based on this. The determination unit may then determine not to generate notification information during a time period when the user can be conceived to be sleeping, and not transmit the notification information to the display device during this time period.

Now, the determination unit can estimate the lifestyle pattern of the user by taking the average value of the tallied time at which the lighting goes off, from history information of the lighting for one month, for example. The determination unit can also estimate the time at which all of the lighting in the house goes off after 10 PM, for example, based on the history information of the lighting, as being the bedtime of the user.

Also, in a case where the user can be determined to be sleeping from on sensor information of the air conditioner, based on history information of the air conditioner for example, the determination unit may not transmit notification information to the display device at this time. In a case where the user can be determined to be sleeping by confirmation of movement detection results by a motion sensor of the air conditioner, based on history information of the air conditioner for example, the determination unit may not transmit notification information to the display device at this time. The determination unit can estimate the sleeping hours of the user by comparing with an everyday lifestyle pattern of the user, based on determination results (values) of the motion sensor. Of course, this holds true for the rising time as well. An example of a display screen on a display device in such a case will be described next.

FIGS. 34A and 34B are diagrams illustrating an example of a display screen of a display device in a case where notification information was not displayed, based on a lifestyle pattern of the user. Components which are the same as those in FIG. 28 are denoted with the same reference numerals, and description thereof will be omitted.

Figure 34:
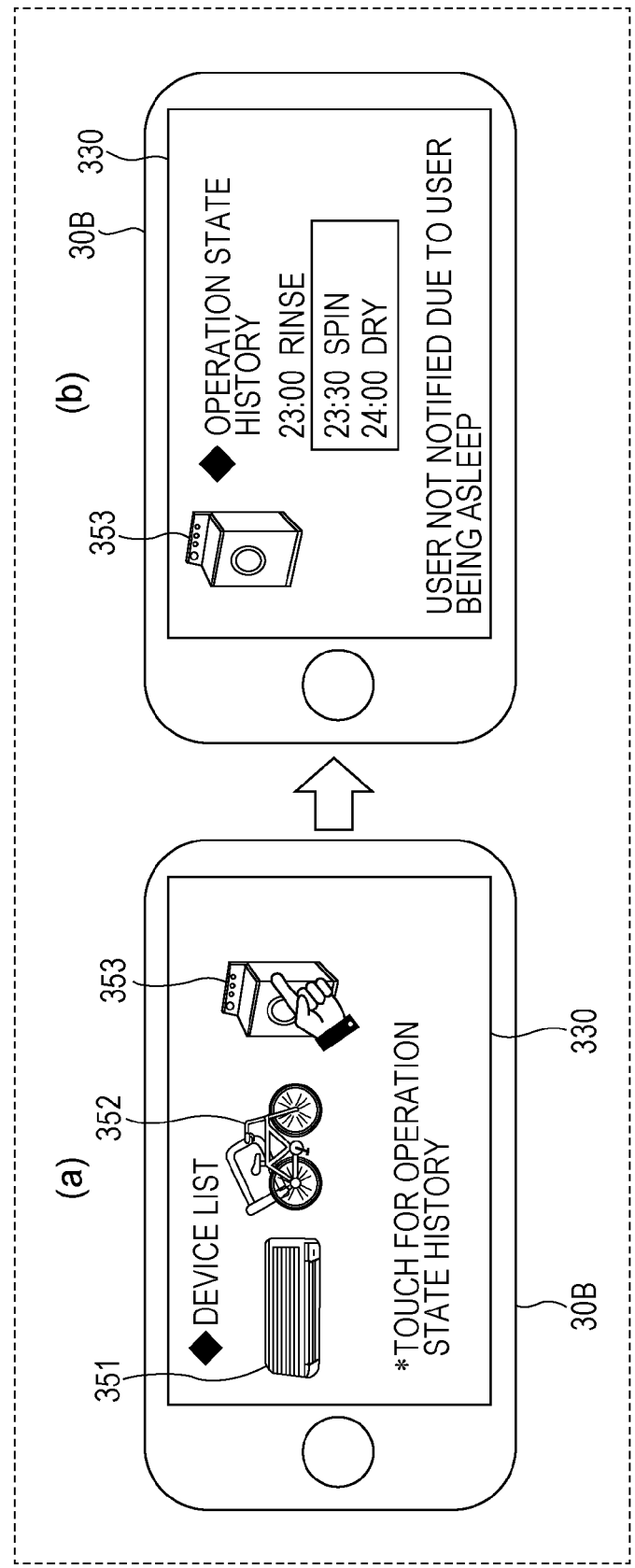
FIG. 34 is a diagram illustrating an example of a display screen of a display device in a case where notification information was not displayed, based on a lifestyle pattern of the user.

A case is considered where, upon rising, the user touches the washing machine icon 353 displayed on the display unit 330 of the smartphone which is the display device 30B as illustrated in FIG. 34 (a), to confirm the operation state history. This displays the operation state history during the night (notification information relating to the washing machine which was not displayed during the night) on the display unit 330, as illustrated in FIG. 34 (b). The arrangement illustrated here also displays on the display unit 330 that the notification information was not transmitted (blocked) due to the user being asleep.

Figure 35:
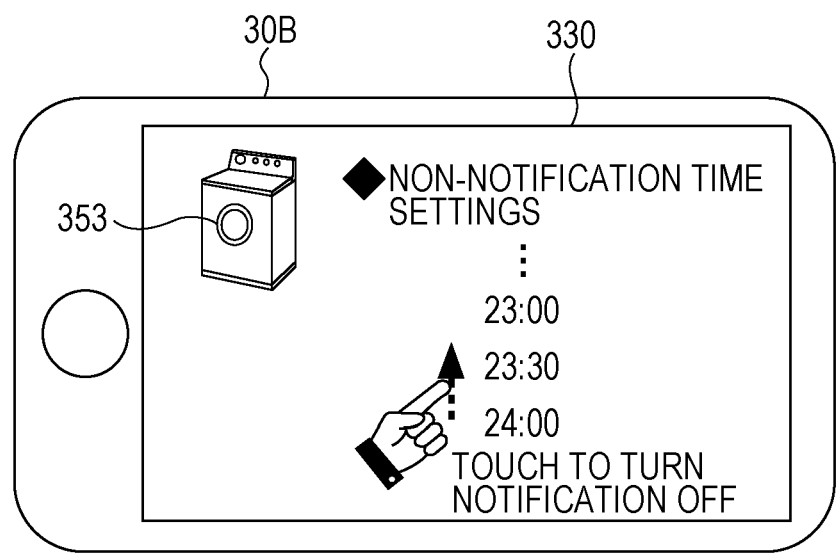
FIG. 35 is a diagram illustrating an example of a display screen of a display device where a time zone where notification information is not displayed can be set.

Note that the arrangement is not restricted to the information notification device determining that the user is sleeping and accordingly not transmitting notification information. For example, the user may set a time slot beforehand during which notification information is not transmitted, as illustrated in FIG. 35, for example. FIG. 35 is a diagram illustrating an example of a display screen of a display device, enabling a time slot in which notification information to not be displayed to be set. A time slot (blocked time) during which notification information is not transmitted may be set by the user on the display unit 330 (display screen) of the display device 30B which is a smartphone, as illustrated in FIG. 35.

Also, an arrangement may be made in the above-described embodiments where, when transmitting notification information to a display device specified by the display device specification unit, the information notification device causes lighting or lights on devices or the like to blink, thereby alerting the user that notification information is displayed on the specified display device.

Figure 36:
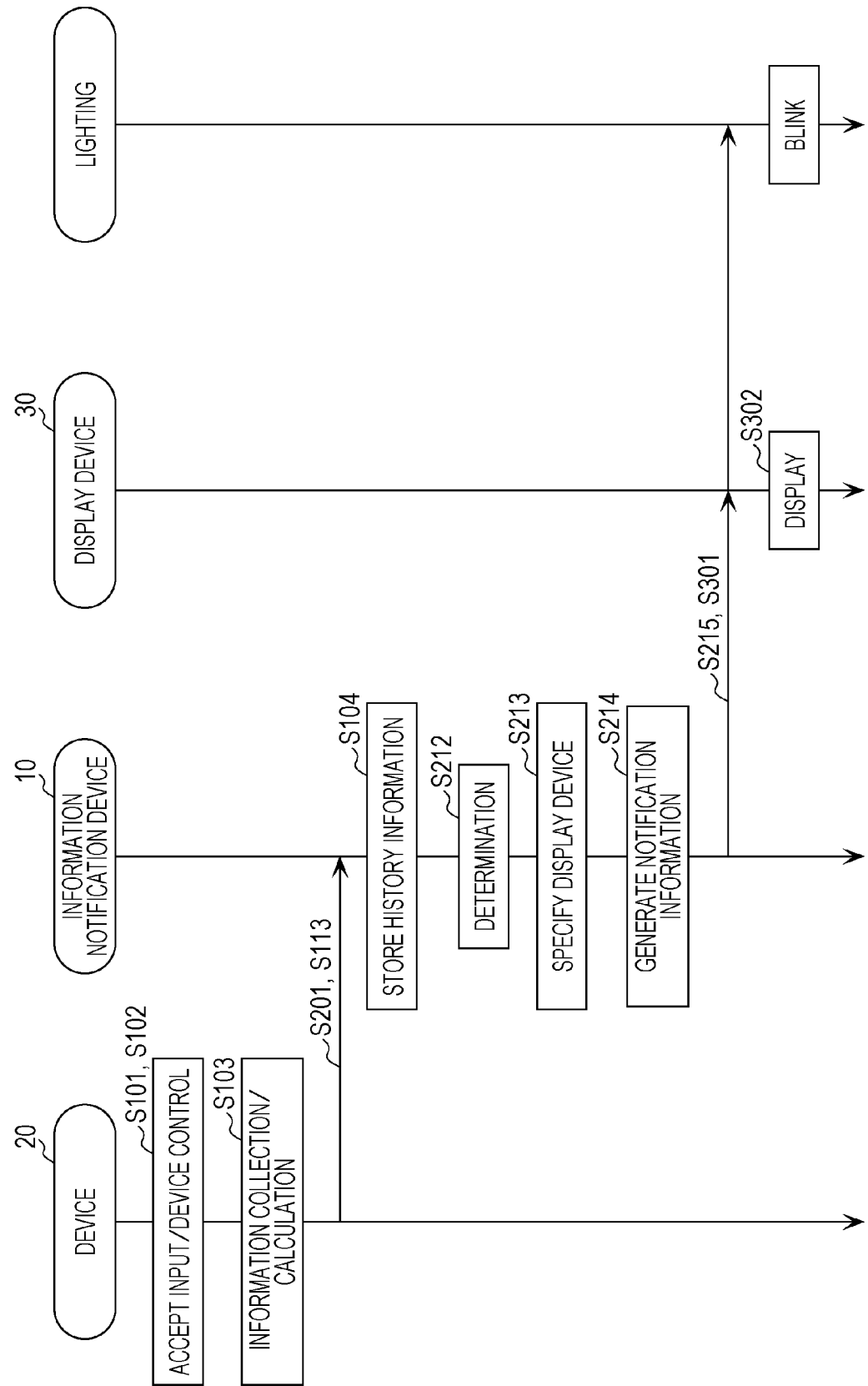
FIG. 36 is a sequence diagram illustrating the series of operations of a device, display device, information notification device, and lighting.

FIG. 36 is a sequence diagram regarding this arrangement. FIG. 36 is a sequence diagram illustrating the series of operations of a device, display device, information notification device, and lighting. Components which are the same as those in FIG. 12A are denoted with the same reference numerals, and description thereof is omitted.

In FIG. 36, the information notification device 10 transmits a control signal to control lighting, and lights of devices which have portions that emit light, at the time of transmitting notification information to the display device specified by the display device specification unit. Upon receiving the control signal, the device having the portion that emits light operates the portion that emits light according to the control signal. Thus, the user can be alerted to the fact that notification information is being displayed on a specified display device such as a smartphone, by portions that emit light, such as lighting and device lights blinking.

Of course, the display device is not restricted to a smartphone. Also, the operation of the portions which emit light may be stopped when a user action responding to the notification information is sensed. Further, in a case where the portions which emit light are lights on a device, the color and blinking intervals of the lights may be used to represent the contents of the notification information and different display devices where the notification information is being displayed.

The user may be alerted by audio besides light. In this case, the pitch and intervals of the audio may be used to represent the contents of the notification information and different display devices where the notification information is being displayed. Further, the user may freely set the tone and sound for alerting, or settings may be made based on the results of tallying the setting values of all other users as well.

Third Embodiment

Description has been made in the first modification of the first embodiment regarding a method of transmitting notification information in a case where the user can actually act in response to the notification information. Description will be made in a third embodiment regarding a method of transmitting notification information depending on (in accordance with) the location where the user is.

Figure 37:
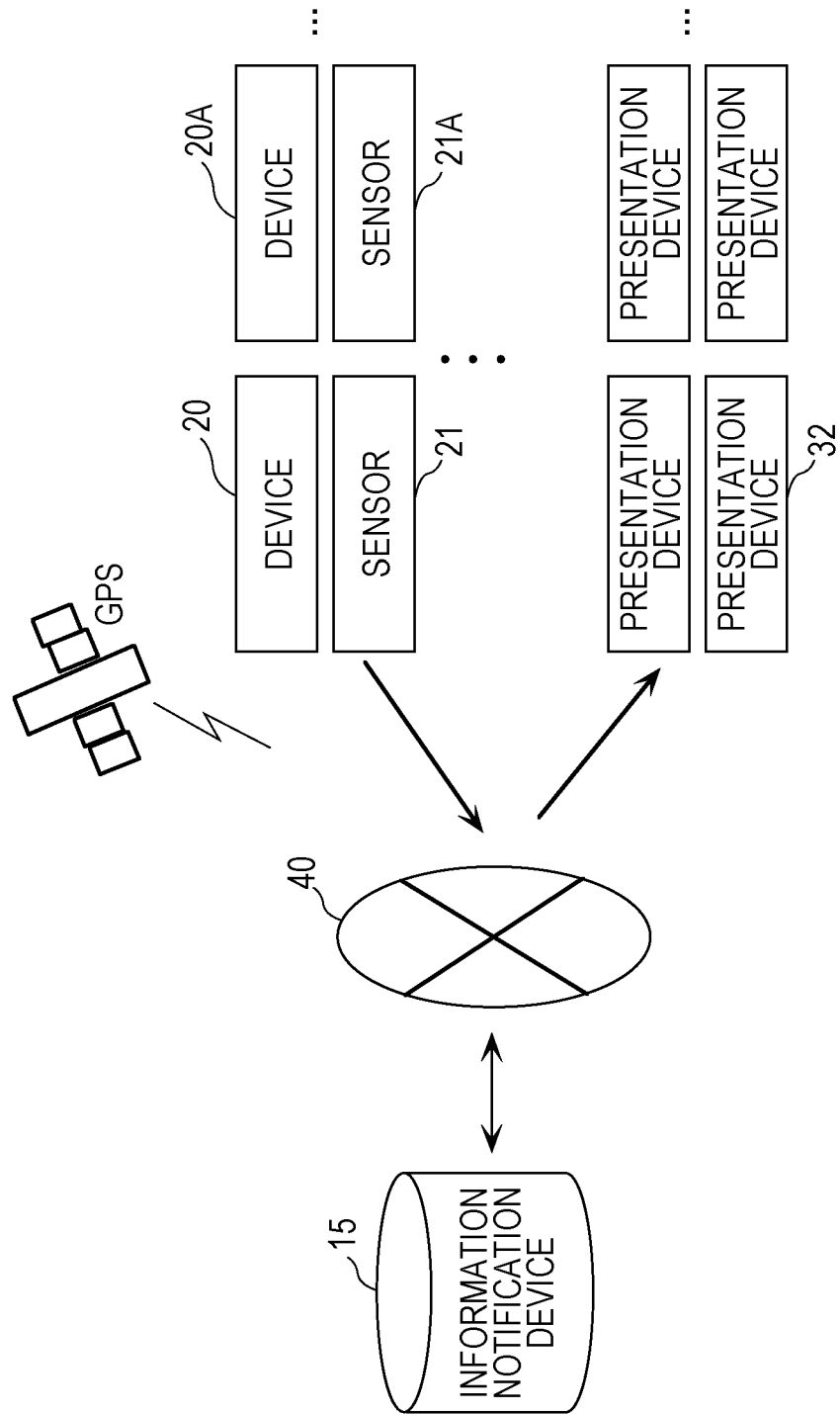
FIG. 37 is a block diagram illustrating a system configuration according to a third embodiment.

FIG. 37 is a block diagram illustrating a system configuration according to the third embodiment. Components which are the same as those in FIGS. 2A and 13 are denoted by the same reference numerals, and description thereof will be omitted.

The system configuration illustrated in FIG. 37 differs from the system configuration illustrated in FIG. 2A in that the configuration of an information notification device 15 differs from that of the information notification device 10, sensors 21 such as a sensor 21A have been added, and the display device 30 has been replaced by a presentation device 32.

Examples of the sensor 21 include a motion sensor, heat sensor, weight sensor, and so forth. These may be installed in the home of the user, installed in devices 20, and so forth.

The presentation device 32 is not restricted to a display device having a display unit, and may be a device which has a speaker or the like and presents the user with audio, or may be a device which has lighting capable of changing colors or blinking.

Configuration of Information Notification Device

Figure 38:
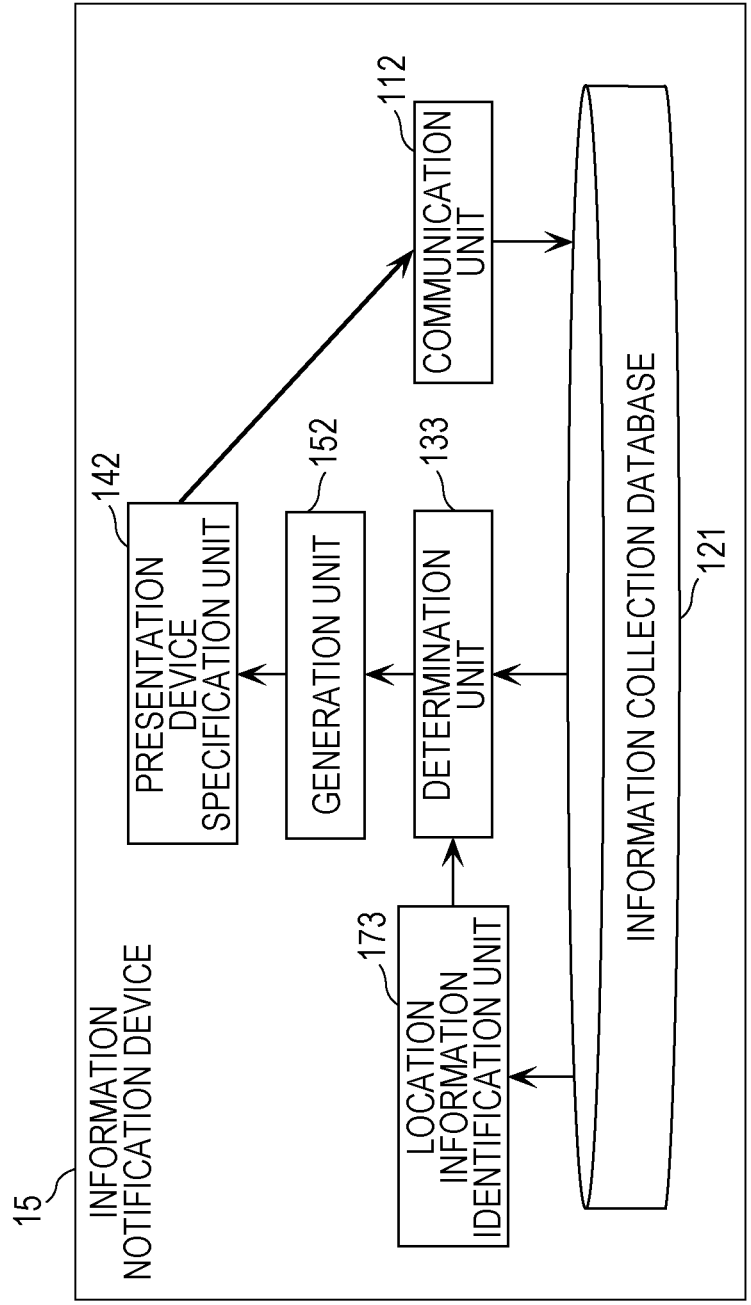
FIG. 38 is a block diagram illustrating a functional configuration of an information notification device according to the third embodiment.

FIG. 38 is a block diagram illustrating a functional configuration of the information notification device according to the third embodiment. The information notification device 15 illustrated in FIG. 38 includes a communication unit 112, information collection database 121, determination unit 133, presentation device specification unit 142, generation unit 152, and location information identification unit 173.

The communication unit 112 transmits notification information generated by the generation unit 152 to a presentation device specified by the presentation device specification unit 142. The communication unit 112 according to the present embodiment further receives, from a first device (device 20) out of the multiple devices which operate by accepting input from the user, first device information which uniquely identifies the first device, and first history information of the first device which includes at least one history of control information of the first device and state information indicating the state of the first device. The communication unit 112 receives the device information and history information from the device 20 out of the multiple devices, and registers in the information collection database 121. The device information and history information from the device 20 may be obtained at a timing which the communication unit 112 requests, or may be obtained at intervals set at the device 20 or at a timing of transmission from the device 20, or may be obtained at equal intervals (e.g., every 5 seconds) set at the communication unit 112. In a case where no time information is included in the history information, time information may be added at the time of registering in the information collection database 121, in the same way as with the first embodiment. The communication unit 112 may also receive current date-and-time information from the network 40.

The information collection database 121 holds management information. The information collection database 121 correlates the first device information and first history information received by the communication unit 112, and holds as management information. Note that the information collection database 121 may correlate and hold behavioral practices of the user, and first date-and-time information at which to carry out this behavior, in a correlated manner as management information.

The location information identification unit 173 identifies the location information of the user. This location information of the user is information indicating the location of the user, such as for example, whether the user is in the house or outside of the house (nearby the house), at the entryway, near the entryway, in a particular room, not in a particular room, and so forth.

For example, the location information identification unit 173 may identify the location information of the user using GPS. Alternatively, the location information identification unit 173 may identify that the current location of the user is in the house or at the entryway of the house, using operation history of the user having operated the lock of the entryway of the house in a case of an electronic lock, or operation history of the lighting of the entryway of the house having been operated. The location information identification unit 173 may identify that the current location of the user is a particular room in the house, using the sensor 21 installed in a particular room of the house of the user, for example. The sensor 21 uses at least one of a motion sensor and a heat sensor. The location information identification unit 173 may also identify that the current location of the user is at the entryway or near the entryway of the house, using the sensor 21 that uses at least one of a motion sensor and a heat sensor, installed in the entryway or near the entryway of the house of the user, for example. The location information identification unit 173 may further identify that the user is near the entryway of the house by the user performing visible-light communication with a device installed at the entryway of the house of the user, for example.

In a case where information included in management information (history information) which the information collection database 121 holds satisfies a predetermined condition, and the current location of the user identified by the location information identification unit 173 is at a predetermined location, the determination unit 133 determines that it is appropriate to transmit notification information to the user.

Specifically, the determination unit 133 determines whether or not generating of the notification information is appropriate, based on whether or not the identification information satisfies the condition, and on the current location of the user which the location information identification unit 173 has identified. The particular information is information included in the management information. The management information includes the history information in the present embodiment, so the particular information may be information included in the history information.

For example, in a case where the device 20 is the power-assisted bicycle, the information included in the management information (information included in the history information) may be remaining battery level value of the power-assisted bicycle (device 20), and the predetermined condition may be that the value of the remaining battery level of the first device is equal to or lower than a value predetermined to warrant charging of the power-assisted bicycle (device 20). In this case, the predetermined location may be within or nearby the home of the user where the power-assisted bicycle (device 20) is placed, such as at the entryway of the home for example.

The presentation device specification unit 142 holds transmission destination information indicating one or more presentation devices to which notification information regarding one or more devices is to be transmitted. The presentation device specification unit 142 specifies a presentation device out of the multiple presentation devices, to display notification information relating to the first device (device 20), based on the transmission destination information and the received first device information (device information of the device 20). The presentation device may be a display device having a display, such as cellular phones (smart phones and feature phones), tablets, television sets, refrigerators and washing machines provided with displays, for example, or may be an in-home smart grid display, a mobile terminal, or lighting capable of changing colors or blinking. That is to say, the presentation device may be the display device according to the first embodiment, or may be a device including an in-home smart grid display, a mobile terminal, and lighting capable of changing colors or blinking.

In a case where determination is made by the determination unit 133 that transmission of notification information to the user is appropriate, the generation unit 152 generates notification information of a content in accordance with the current location of the user, that has been identified by the location information identification unit 173. The notification information may be generated in a format of an email, or may be generated in a format of a display on a display unit like a push notification, or may be generated in a format where an application installed in the presentation device 32 is automatically activated so as to display the notification information using the application. The notification information may include audio data of the content to be notified to the user, or may include a command to control light so as to alert the user by lighting blinking or the like.

Control Method of Information Notification Device

A control method of the information notification device 15 configured such as described above will be described. In the following, description will be made where the device 20 is the power-assisted bicycle, and information included in the management information is history information including a value of the remaining battery level of the device 20.

Figure 39:
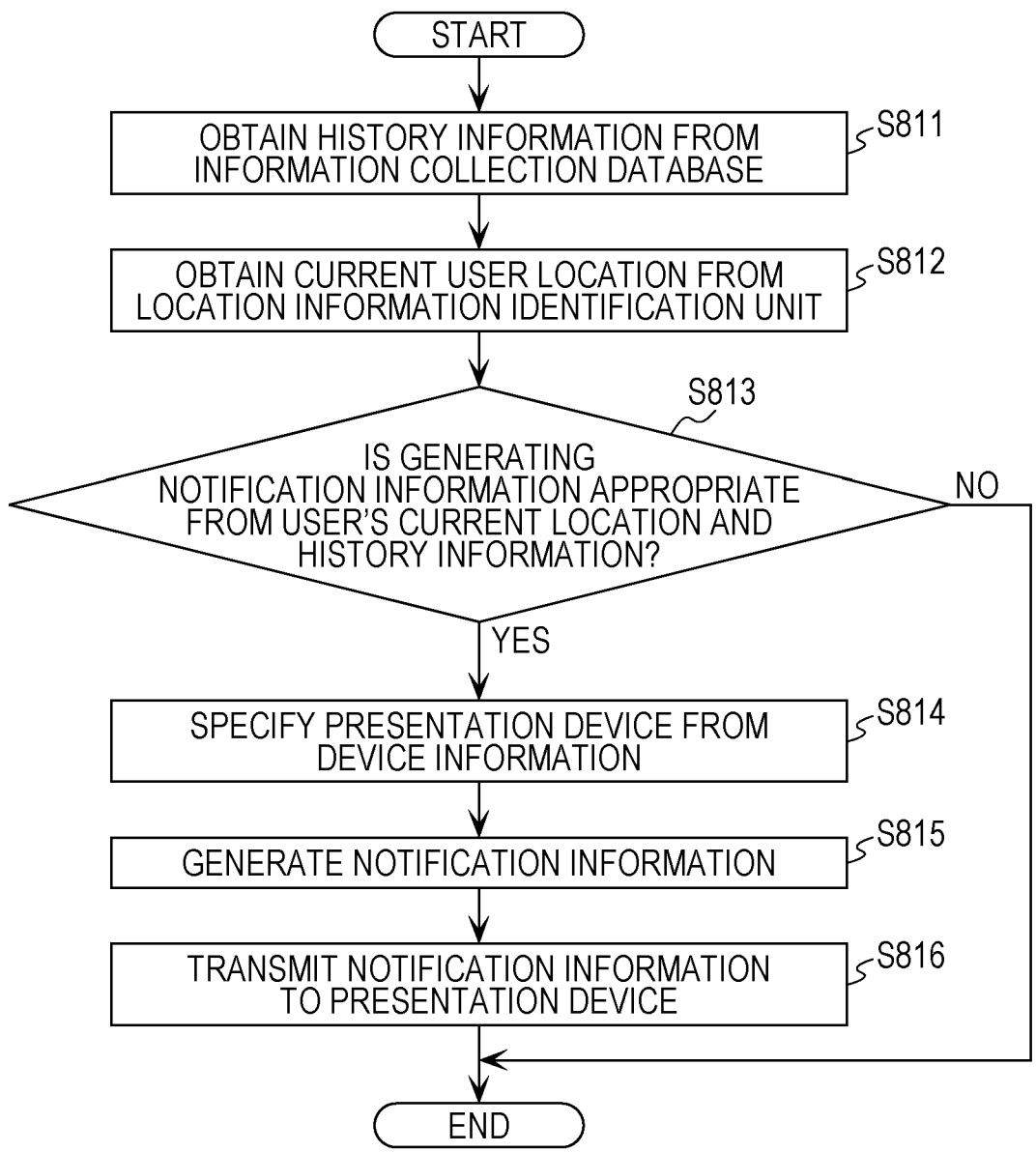
FIG. 39 is a flowchart illustrating the flow of control in the information notification device of the third embodiment.

FIG. 39 is a flowchart illustrating the flow of control in the information notification device according to the third embodiment. First, the determination unit 133 obtains history information from the information collection database 121 (S811). The determination unit 133 according to the present embodiment obtains history information including the current remaining battery level of the power-assisted bicycle (device 20). An assumption will be made here that history information has been obtained which indicates that the remaining battery level is low, such as the remaining battery level of the power-assisted bicycle being 20% or lower.

Next, the determination unit 133 obtains the current location of the user from the location information identification unit 173 (S812). The determination unit 133 according to the present embodiment obtains the current location information of the user from the sensor 21 and history information.

The determination unit 133 then determines whether or not generating notification information is appropriate, based on the history information including the particular information and condition, and the location information indicating the current location of the user (S813). If it assumed here that the remaining battery level of the power-assisted bicycle (device 20) is low (20% or lower or the like), and further that the user is at the entryway of the house, near the entryway, or within the house, determination is made in the present embodiment that generating notification information is appropriate. The particular information here is the remaining battery level of the power-assisted bicycle (device 20). The condition is that the remaining battery level of the power-assisted bicycle is at or below a predetermined value which warrants charging of the first device, such as the remaining battery level of the power-assisted bicycle being 20% or lower, and that the current location of the user is at the entryway or near the entryway.

In a case where the determination unit 133 determines that generating notification information is not appropriate (NO in S813), the flow ends. On the other hand, in a case where the determination unit 133 determines that generating notification information is appropriate (YES in S813), the presentation device specification unit 142 specifies a presentation device of the one or more presentation devices to display the notification information (S814). The specified presentation device here may be specified by the user beforehand, or if the user is near the entryway, a display or the like installed near the entryway may be specified.

Next, the generation unit 152 generates the notification information to be transmitted to the specified presentation device (S815). In the case of the present embodiment, the generation unit 152 generates notification information to the effect of "please charge" for example. The notification information may be generated in a format displayed on a display, or may be generated in a format audibly transmitted (audio data), or may be generated as a command to cause lighting visible from the current location of the user to blink or the like.

The communication unit 112 then transmits the notification information generated at the generation unit 152 to the presentation device 32 specified by the presentation device specification unit 142 (S816).

Advantages

According to the present embodiment, an information notification device 15 which can perform notification of information at a suitable display location (presentation location) and at a suitable timing, can be realized. More specifically, in a case where the remaining battery level of the power-assisted bicycle, which is a device 20, is low, is provided to the effect that the power-assisted bicycle warrants charging, if the current location of the user is at the entryway of the house. That is to say, location information identification unit 173 of the information notification device 15 identifies the location of the user based on the particular information included in the management information (history information), whereby notification information can be displayed in accordance with the current location of the user. This enables the user to act more readily in response to the notification information, and the chances (or the cases) that the user will forget the notification information are reduced.

While description has been made in the present embodiment with regard to the example of the remaining battery level of the power-assisted bicycle (device 20) as the particular information, this is not restrictive. The particular information may be the degree of depletion of a detachable battery pack of the power-assisted bicycle (device 20), or may be whether or not a detachable battery pack has been attached to the power-assisted bicycle (device 20), or may be whether or not it is time for maintenance of the power-assisted bicycle (device 20).

First Modification

Description was made in the third embodiment regarding an example of a method to transmit notification information according to the location where the user is, based on information included in the management information (history information) in the case that the device 20 is the power-assisted bicycle. In a first modification, a method will be described to transmit notification information according to the location where the user is, based on information included in the management information (history information) in the case that the device 20 is an air conditioner, lighting, or a device using IH. Note that the system configuration in the present modification is the same as the system configuration illustrated in FIG. 37, except that the configuration of the information notification device 15 is different, so description will be omitted.

Configuration of Information Notification Device

Figure 40:
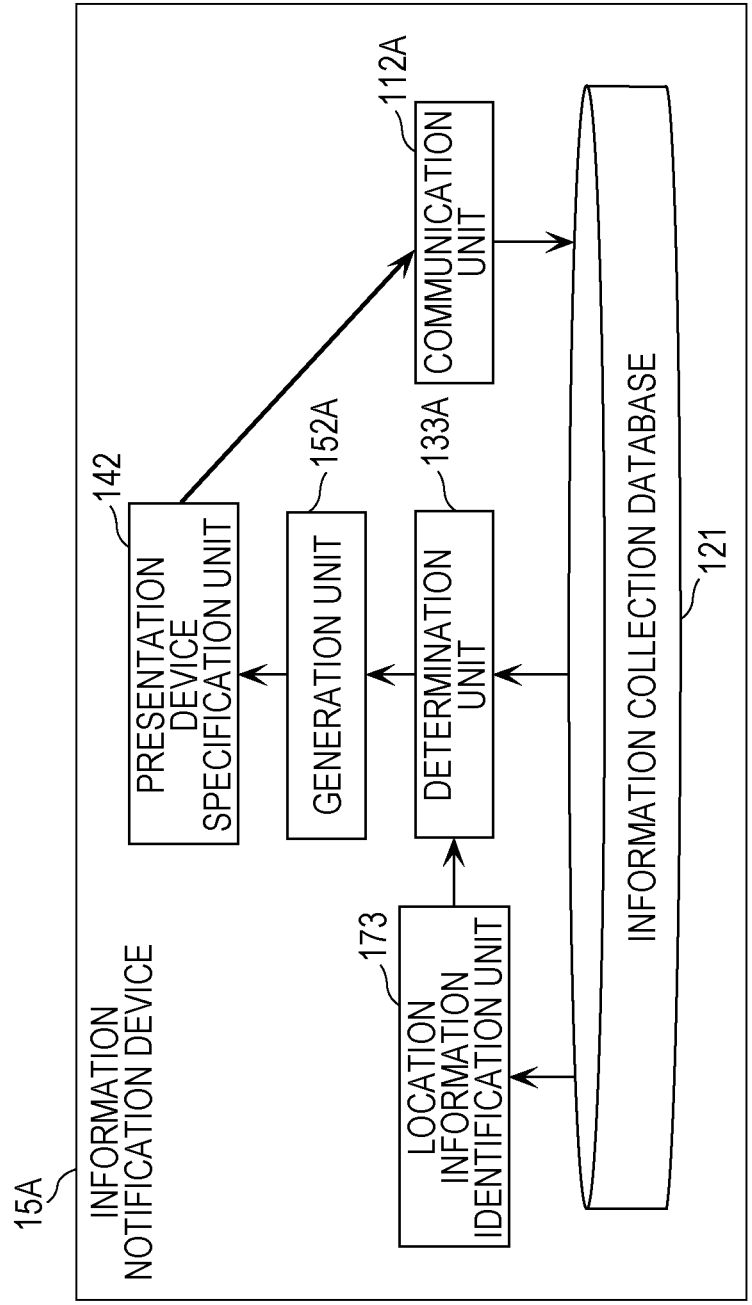
FIG. 40 is a block diagram illustrating a functional configuration of the information notification device of the first modification of the third embodiment.

FIG. 40 is a block diagram illustrating a functional configuration of the information notification device of the first modification of the third embodiment. An information notification device 15A illustrated in FIG. 40 differs from the information notification device 15 in FIG. 38 in that the functions of a determination unit 133A, generation unit 152A, and communication unit 112A differ from those of the determination unit 133, generation unit 152, and communication unit 112, respectively. Other configurations are the same as those of the information notification device 15 in FIG. 38, so description will be made below primarily regarding the different points.

The determination unit 133A determines that transmission of notification information to the user is appropriate in a case where information included in management information which the information collection database 121 holds satisfies a predetermined condition, and the current location of the user that has been identified by the location information identification unit 173 is at a predetermined location.

For example, in a case where the device 20 is an air conditioner, lighting, or a device using IH, or the like, information included in the management information (information included in the history information) includes information relating to the running state of the device 20, indicating whether the device 20 is running or stopped. In this case, the predetermined condition is that the device 20 is operating for example, and the predetermined location is that the user is at a location other than the room where the device 20 is installed, for example. Note that in this case, the predetermined condition may be that the device 20 is operating, and that a child has been detected in the room where the device 20 is installed.

In a case where determination is made by the determination unit 133A that transmission of notification information to the user is appropriate, the generation unit 152A generates notification information of a content in accordance with the current location of the user that has been identified by the location information identification unit 173. In the present modification, in a case where determination is made by the determination unit 133A that transmission of notification information to the user is appropriate, the generation unit 152A generates notification information including information promoting the user to stop the device 20, and information to the effect that the device 20 is operating. As described above, the notification information may be generated in a format of an email, or may be generated in a format of a display on a display unit like a push notification, or may be generated in a format where an application installed in the presentation device 32 is automatically activated so as to display the notification information using the application. The notification information may include audio data of the content to be notified to the user, or may include a command to control light so as to alert the user by lighting blinking or the like. The information prompting the user to effect control to stop the device 20 (prompting the user to act) may include information by which to select whether or not to stop the device 20 (selection of actions).

In addition to the functions of the communication unit 112, the communication unit 112A further receives information indication actions from the user, and controls the device 20. For example, the communication unit 112A receives control commands or the like from the user to control the device 20, and transmits the control commands or the like to the device 20 so as to control the device 20.

Control Method of Information Notification Device

Next, a specific example of a control method of the information notification device 15A configured as described above will be described. Description will be made in the following assuming that the device 20 is an IH device, and that the information included in the management information is history information including the current running state of the device 20.

Figure 41:
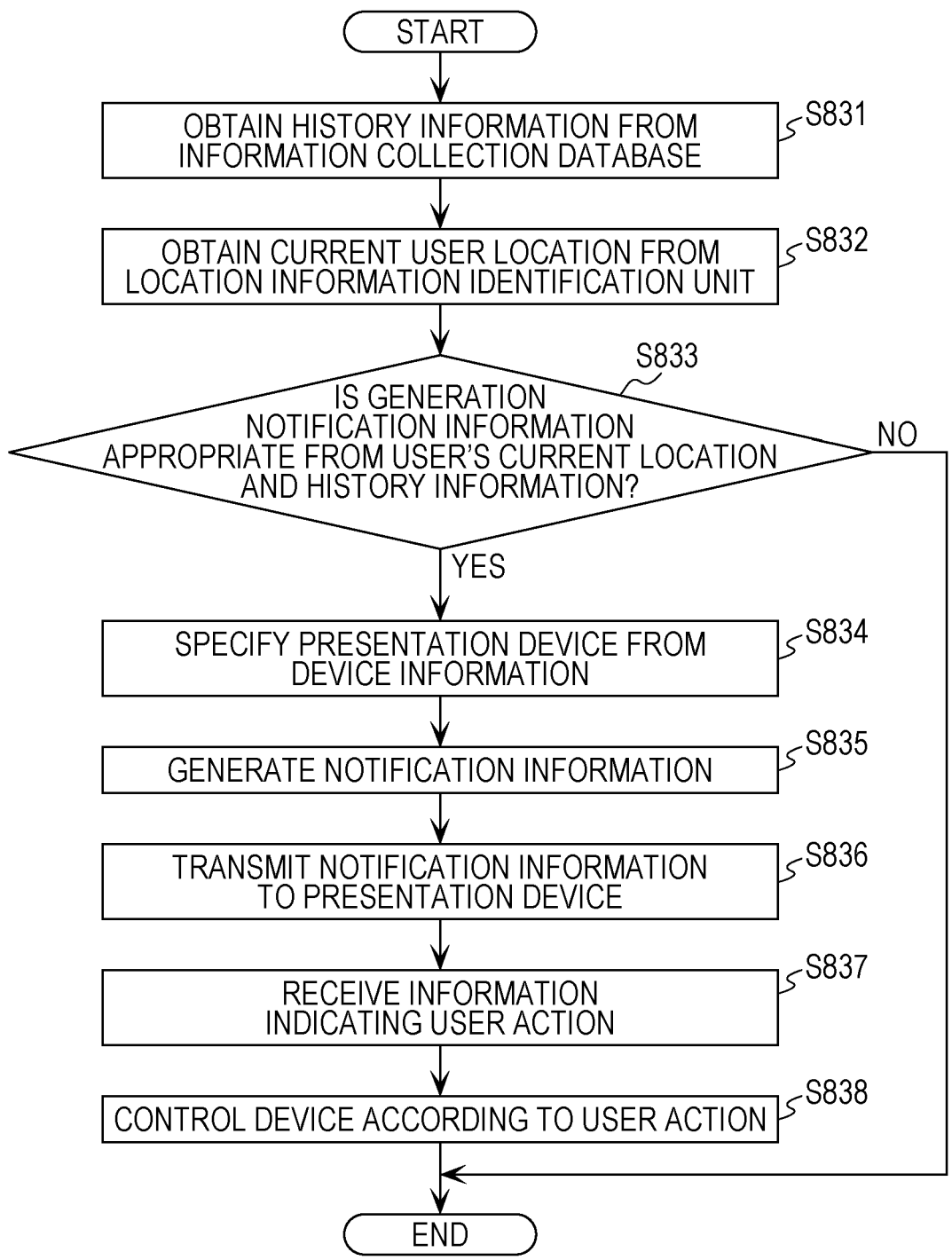
FIG. 41 is a flowchart illustrating the flow of control in the information notification device of the first modification of the third embodiment.

FIG. 41 is a flowchart illustrating the flow of control at the information notification device according to the first modification of the third embodiment. First, the determination unit 133A obtains history information from the information collection database 121 (S831). In the present modification, the determination unit 133A obtains history information including the current running state of the IH device (device 20). Assumption will be made here that history information indicating that the device 20 is running has been obtained, such as the IH device is operating.

Next, the determination unit 133A obtains the current location of the user from the location information identification unit 173 (S832). In the present modification, the determination unit 133A obtains the location information indicating the current location of the user from the sensor 21 and from history information.

Next, the determination unit 133A determines whether or not generating of notification information is appropriate, based on the history information including the particular information and condition, and the location information indicating the current location of the user (S833). In the present modification, determination is made that generating of notification information is appropriate in a case where the IH device (device 20) is running (operating), and the user is at a location other than the room where the IH device (device 20) is installed. The particular information here is information of whether or not the IH device (device 20) is running (operating). The condition is that the IH device (device 20) is running (operating), and that the current location of the user is a location other than the room where the IH device (device 20) is installed.

In a case where the determination unit 133A determines that generating notification information is not appropriate (NO in S833), the flow ends. On the other hand, in a case where the determination unit 133A determines that generating notification information is appropriate (YES in S833), the presentation device specification unit 142 specifies a presentation device out of the one or more presentation devices to display the notification information (S834). The presentation device specified here may be that specified by the user or the like beforehand, or a display or the like installed in a room where the current location of the user is may be specified.

Next, the generation unit 152A generates notification information to transmit to the specified presentation device (S835). In the present modification, the generation unit 152A generates notification information including information to the effect that the IH device (device 20) is operating, and information promoting the user to effect control including stopping the IH device (device 20), such as "Do you want to stop the IH device?" for example. The notification information here may be generated in a format displayed on a display, or may be generated in a format audibly transmitted (audio data), or may be generated as a command to cause lighting visible from the current location of the user to blink or the like.

Next, the communication unit 112A transmits the notification information generated by the generation unit 152A to the presentation device specified by the presentation device specification unit 142 (S836).

The communication unit 112A then receives information indicating an action from the user (S837). In the present modification, the communication unit 112A receives a control command to control the device 20 as information indicating a user action, such as stopping the IH device (device 20) or the like, for example.

The communication unit 112A controls the device in accordance with the user actions (S838). In the present modification, the communication unit 112A transmits to the IH device (device 20) the control command, received from the user, to control the IH device (device 20), thereby effecting control such as stopping the IH device (device 20). The device 20 is not restricted to an IH device, and may be an air conditioner or lighting. The control method is the same in each case, so description will be omitted.

Advantages

According to the present modification, an information notification device 15A which can perform notification of information at a suitable display location (presentation location) and at a suitable timing, can be realized. More specifically, in a case where a device 20 such as an IH device, air conditioner, or lighting, is running, and the current location of the user is different from the room where the device 20 is installed, notification information is provided to the effect that the device 20 is running, and prompting the user to effect control so as to stop the device 20. That is to say, the location information identification unit 173 of the information notification device 15A identifies the location of the user based on the particular information (current running state) included in the management information (history information), and thus can display notification information in accordance with the current location of the user. This enables the user to act more readily in response to the notification information, and the chances (or the cases) that the user will forget the notification information are reduced.

While description has been made that in a case where a device 20 such as an IH device, air conditioner, or lighting, is running, and the current location of the user is different from the room where the device 20 is installed, notification information is provided to the effect that the device 20 is running, and prompting the user to effect control so as to stop the device 20, but this is not restrictive. An arrangement may be made where notification information is provided in a case where the device 20 is running, the current location of the user is different from the room where the device 20 is installed, and moreover detection has been made by the sensor 21A in the room where the device 20 is installed that there is a child alone in the room. In this case, the notification information may include information that the device 20 is running and a child is left unattended in the room, prompting the user to effect control so as to stop the device 20.

Second Modification

Description has been made in the first modification of the third embodiment regarding an example of transmitting notification information in accordance with a location where the user is, based on information (current running state) included in management information (history information), and including information in the notification information being transmitted prompting the user to act. An example will be described in a second modification regarding an example of transmitting controlling the device in accordance with a location where the user is, based on information (current running state) included in management information (history information), and also transmitting notification information, with information to the effect that the device has been controlled.

The system configuration in the present modification is also the same as the system configuration illustrated in FIG. 37, except that the configuration of the information notification device 15 is different, so description will be omitted.

Configuration of Information Notification Device

Figure 42:
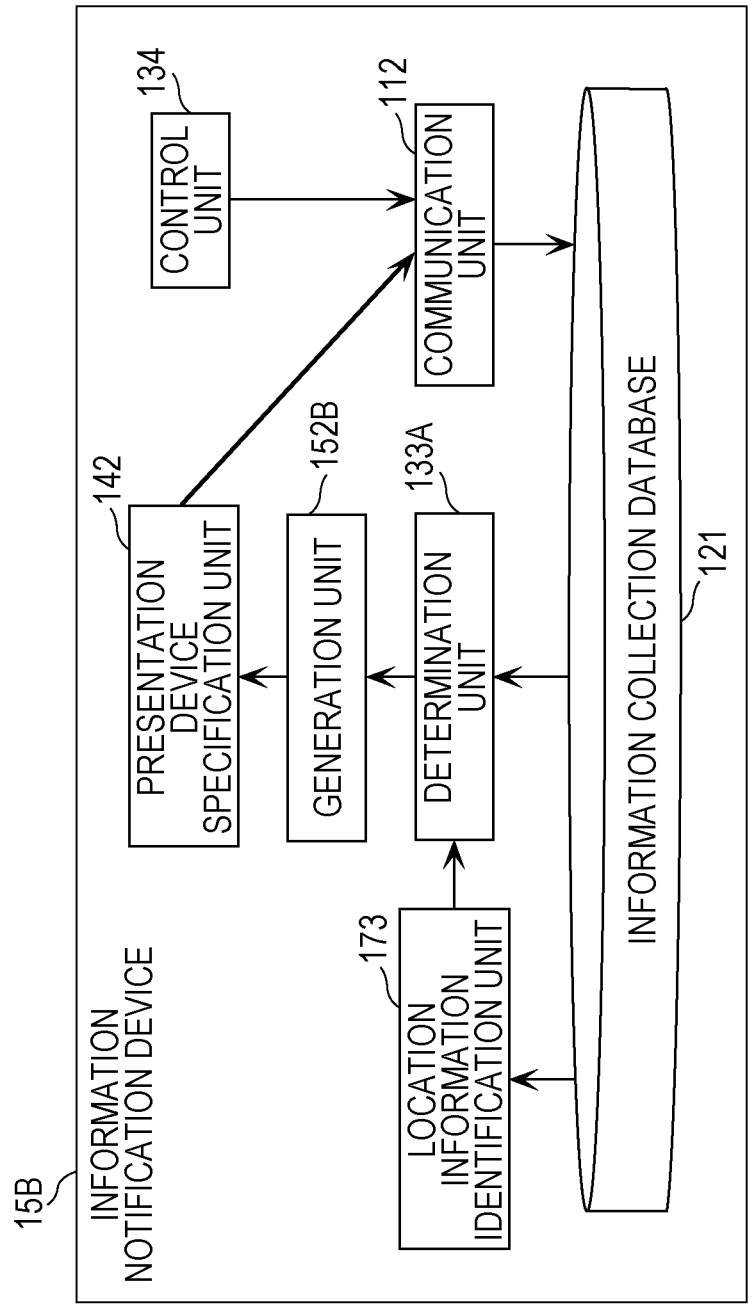
FIG. 42 is a block diagram illustrating a functional configuration of an information notification device of a second embodiment of the third embodiment.

FIG. 42 is a block diagram illustrating a functional configuration of the information notification device of the second modification of the third embodiment. Components which are the same as those in FIGS. 38 and 40 are denoted with the same reference numerals, and detailed description will be omitted.

The information notification device 15B illustrated in FIG. 42 differs from the information notification device 15A in FIG. 40 with regard to the points that the function of a generation unit 152B differs from that of the generation unit 152A, and that the configuration of a control unit 134 has been added. Other configurations are the same as those of the information notification device 15A illustrated in FIG. 40, so description will be made below primarily regarding the different points.

In a case where the determination unit 133A determines that transmitting notification information to the user is appropriate, the control unit 134 effects control of the device 20, such as stopping the device 20. In a case where the device 20 is an IH device for example, control is effected such as turning off or turning down the heat of the IH device, and in a case where the device 20 is lighting, control is effected such as turning off or turning down the lights, for example. In a case where the device 20 is an air conditioner, control is effected such as turning off the air conditioner, changing the temperature settings to conserve energy, and so forth.

In a case where determination is made by the determination unit 133A that transmission of notification information to the user is appropriate, the generation unit 152B generates notification information of a content in accordance with the current location of the user that has been identified by the location information identification unit 173. In the present modification, in a case where determination is made by the determination unit 133A that transmission of notification information to the user is appropriate, the generation unit 152B generates notification information to the effect that the device 20 was on, so control has been effected including turning off the device 20. As described above, the notification information may be generated in a format of an email, or may be generated in a format of a display on a display unit of the presentation device 32 like a push notification, or may be generated in a format where an application installed in the presentation device 32 is automatically activated so as to display the notification information using the application. The notification information may include audio data of the content to be notified to the user, or may include a command to control light so as to alert the user by lighting blinking or the like.

Control Method of Information Notification Device

Next, a specific example of a control method of the information notification device 15B configured as described above will be described. Description will be made in the following assuming that the device 20 is an IH device, and that the information included in the management information is history information including the current running state of the device 20.

Figure 43:
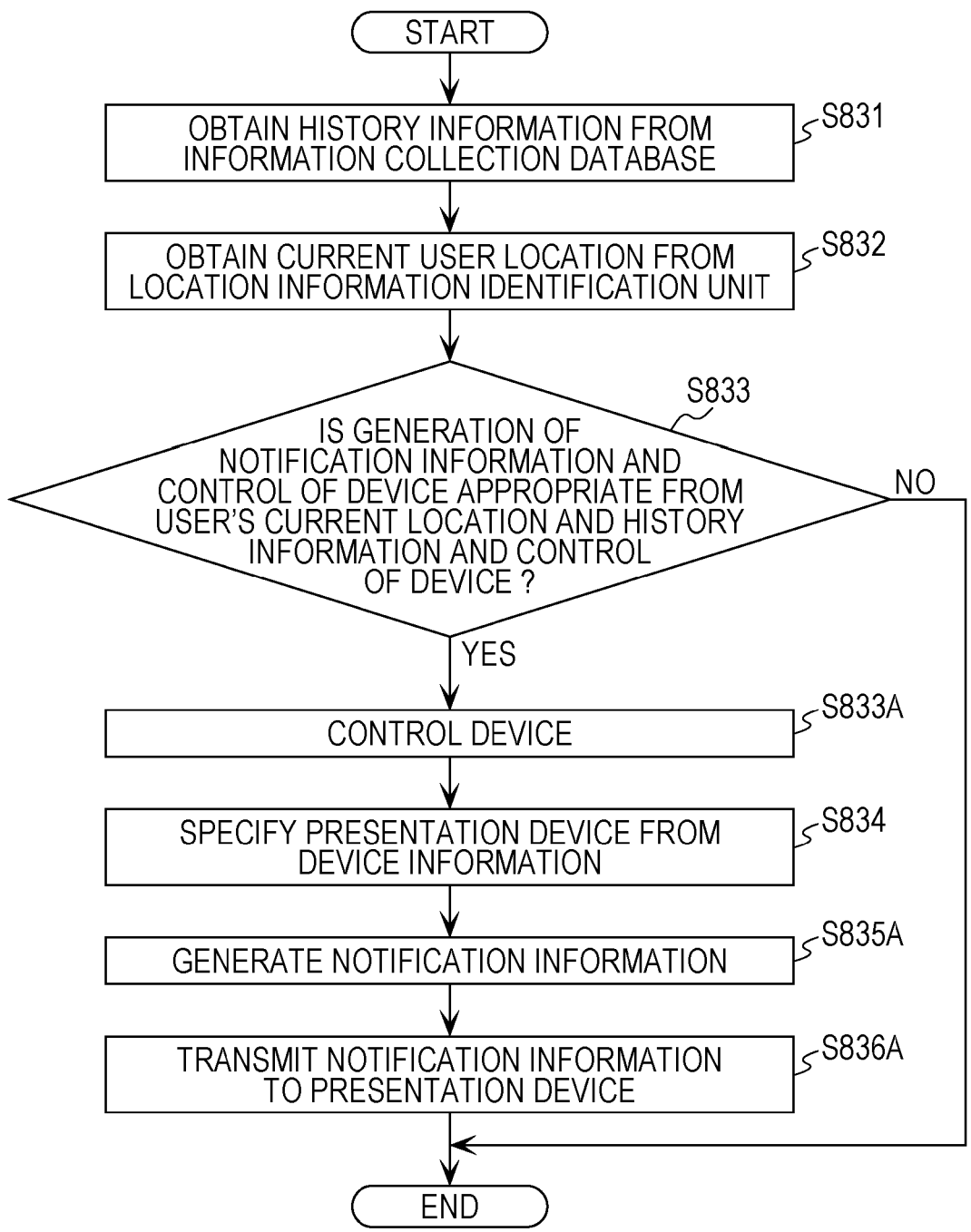
FIG. 43 is a flowchart illustrating the flow of control in the information notification device of the second modification of the third embodiment.

FIG. 43 is a flowchart illustrating the flow of control at the information notification device according to the second modification of the third embodiment. Components the same as those in FIG. 41 are denoted with the same reference numerals, and detailed description will be omitted.

In a case where the determination unit 133A determines in S833 that generating notification information is appropriate (YES in S833), the control unit 134 controls the IH device (device 20) (S833A), and the presentation device specification unit 142 specifies a presentation device out of one or more presentation devices to display the notification information (S834).

Next, the generation unit 152B generates the notification information to be transmitted to the specified presentation device (S835A). The generation unit 152B generates notification information to the effect that the device 20 was on, so control has been effected including turning off the device 20. The notification information here may be generated in a format displayed on a display, or may be generated in a format audibly transmitted (audio data), or may be generated as a command to cause lighting visible from the current location of the user to blink or the like.

The communication unit 112 then transmits the notification information generated by the generation unit 152B to the presentation device specified by the presentation device specification unit 142 (S836A).

The device 20 is not restricted to an IH device, and may be an air conditioner or lighting. The control method is the same in each case described above, so description will be omitted.

Advantages

According to the present embodiment, an information notification device 15B which can perform notification of information at a suitable display location (presentation location) and at a suitable timing, can be realized. More specifically, in a case where a device 20 such as an IH device, air conditioner, or lighting, is running, and the current location of the user is different from the room where the device 20 is installed, notification information is provided to the effect that the device 20 was on, so control has been effected including turning off the device 20. That is to say, the location information identification unit 173 of the information notification device 15B identifies the location of the user based on the particular information (current running state) included in the management information (history information), and thus can display notification information in accordance with the current location of the user. This is advantageous in that the user does not have to act in response to the notification information, and only has to confirm the notification information.

While description has been made that in a case where a device 20 such as an IH device, air conditioner, or lighting, is running, and the current location of the user is different from the room where the device 20 is installed, notification information is provided to the effect that the device 20 was on, so control has been effected including turning off the device 20, but this is not restrictive. An arrangement may be made where, in a case where the device 20 is running, the current location of the user is different from the room where the device 20 is installed, and moreover detection has been made by the sensor 21A in the room where the device 20 is installed that there is a child alone in the room, the device 20 may be stopped, and notification information provided to that effect later. In this case, the notification information may include information that the device 20 was running and a child was left unattended in the room, so control was effected to stop the device 20.

Fourth Embodiment

Description has been made in the third embodiment with an example of the device 20 being a power-assisted bicycle, regarding a method of generating and transmitting notification information to the user relating to the device 20, in accordance with the location where the user is, based on particular information included in the management information (history information). In a fourth embodiment, description will be made regarding an example of a method of generating and transmitting notification information to the user, using management information in which behavioral practices of the user and first date-and-time information at which the behavior is to be carried out are held in a correlated manner. The system configuration in the present embodiment is also the same as the system configuration illustrated in FIG. 37, except that the configuration of the information notification device 16 is different, so description will be omitted.

Configuration of Information Notification Device

Figure 44:
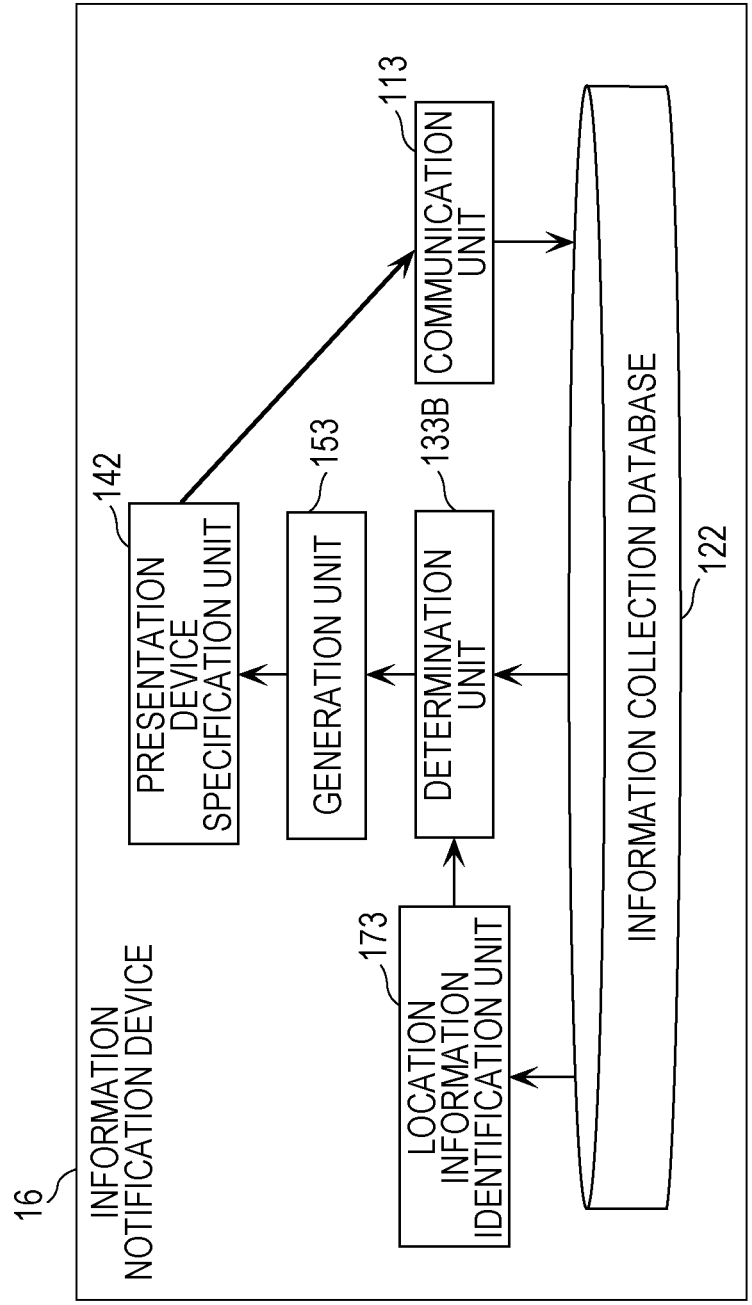
FIG. 44 is a block diagram illustrating a functional configuration of an information notification device according to a fourth embodiment.

FIG. 44 is a block diagram illustrating a functional configuration of the information notification device of the fourth embodiment. Components which are the same as those in FIG. 38 are denoted with the same reference numerals, and detailed description will be omitted.

The information notification device 16 illustrated in FIG. 44 differs from the information notification device 15 in FIG. 38 with regard to the points that the functions of a determination unit 133B, generation unit 153, and communication unit 113 differ from those of the determination unit 133, generation unit 152, and communication unit 112 respectively, and that the contents of the management information held in the information collection database 122 are different. Other configurations are the same as those of the information notification device 15 illustrated in FIG. 38, so description will be made below primarily regarding the different points.

The information collection database 122 holds the management information. The information collection database 122 according to the present embodiment holds management information in which behavioral practices of the user and first date-and-time information at which the behavior is to be carried out are correlated. Now, in a case where this behavior is taking out the garbage, the first date-and-time information includes information regarding date-and-time of garbage pick-up, such as the garbage truck coming during the morning of certain days of the week, for example. Information of days of the week for garbage pick-up may be collected from the Internet, or may be set from the beginning, or may be set by the user. The time to take out the garbage, such as during the morning, may be a time when the garbage truck has not yet come, or may be a time specified by the user, or may be a time predetermined to start with.

The information collection database 122 may further hold the first device information and first history information received by the communication unit 113 as management information. In this case, the communication unit 113 receives the device information and history information from the device 20 out of the multiple devices, and registers this in the information collection database 122.

The communication unit 113 transmits the notification information generated by the generation unit 153 to a presentation device specified by the presentation device specification unit 142. The communication unit 113 also receives current date-and-time information from the network 40.

In a case where the information included in the management information held in the information collection database 122 satisfies a predetermined condition, and the current location of the user identified by the location information identification unit 173 is a predetermined location, the determination unit 133B determines that transmission of notification information to the user is appropriate. The determination unit 133B according to the present embodiment determines that transmission of notification information is appropriate in a case where the predetermined condition is satisfied that the current date-and-time information which the communication unit 113 has received includes the first date-and-time information held in the management information, and also the current location of the user is the predetermined location.

The first date-and-time information here is the date and time when the garbage truck comes for garbage pick-up, for example, and the predetermined position is within the house of the user or the entryway of the house, for example. More specifically, in a case where the first date-and-time information is the date for garbage pick-up and is in the morning, and the user is at a particular location within the house, the determination unit 133B determines that transmission of notification information is appropriate. This particular location in the house may be, for example, outside the entryway near the kitchen within the house, or any location which the user has specified. In other words, it is sufficient that this location be a location which is optimal for the user to carry out this behavior, such as a location where the user can easily carry out this behavior.

Note that behavioral practices of the user are not restricted to taking out the garbage, and may be cooking rice, programming a video recorder to record a drama, or the like. In this case, the first date-and-time information may be the time at which the user usually cooks rice, the time at which the user usually programs the video recorder to record a drama, or the like. That is to say, it is sufficient for the first date-and-time information to be a date and time according to daily habits of the user or a date and time prompting the user regarding such daily habits.

In a case where the determination unit 133B has determined that transmission of notification information to the user is appropriate, the generation unit 153 generates notification information in accordance with the current location of the user identified by the location information identification unit 173. More specifically, in a case where the determination unit 133B has determined that transmission of notification information to the user is appropriate, the generation unit 153 generates notification information prompting the user to carry out behavioral practices of the user. In the present embodiment, the generation unit 153 generates notification information to remind the user to take out the garbage, for example.

Control Method of Information Notification Device

Figure 45:
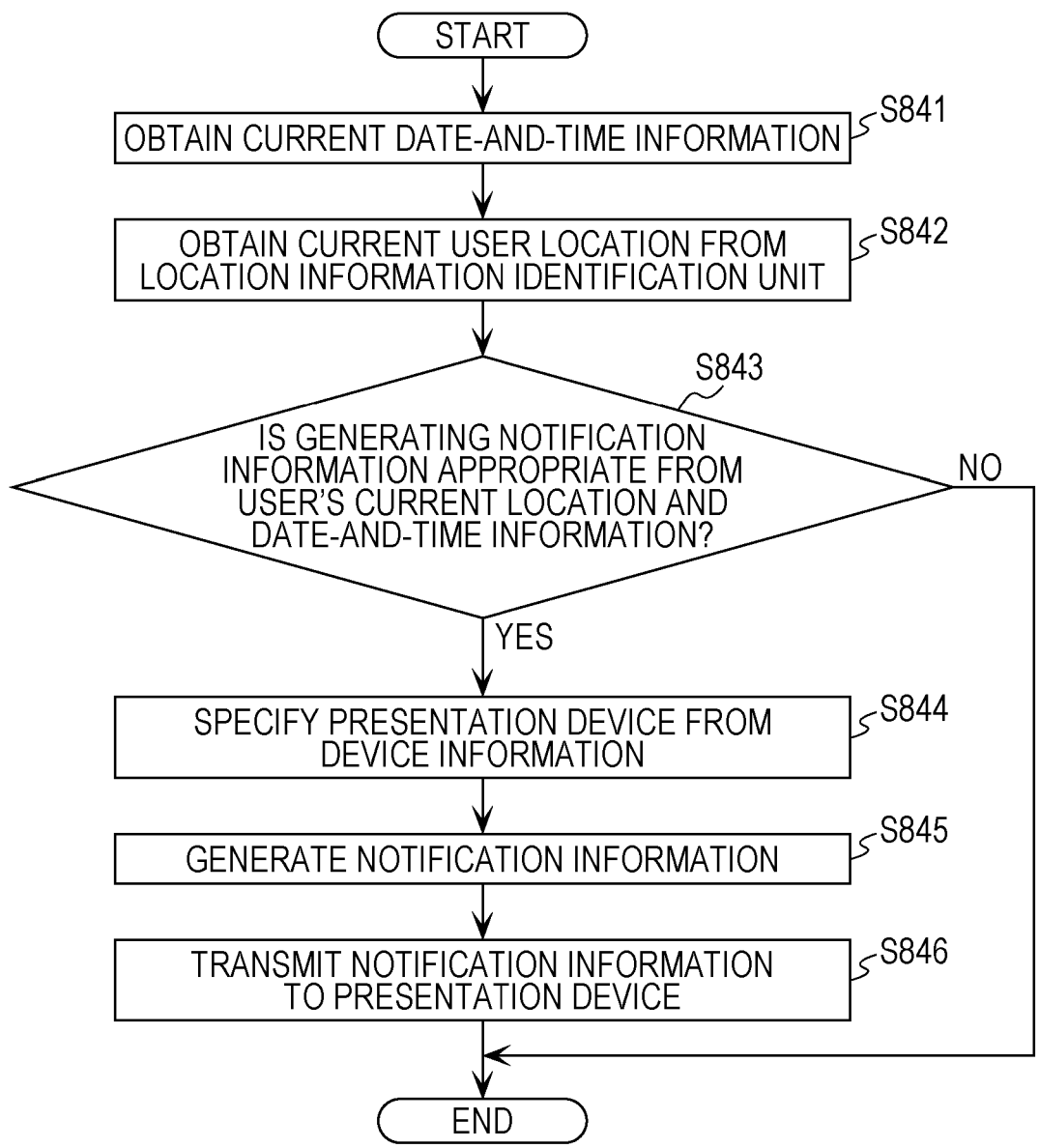
FIG. 45 is a flowchart illustrating the flow of control in the information notification device according to the fourth embodiment.

Next, a specific example of a control method of the information notification device 16 configured as described above will be described. Description will be made in the following assuming that the behavioral practice of the user is the behavior of taking out the garbage at a predetermined date and time. FIG. 45 is a flowchart illustrating the flow of control at the information notification device according to the fourth embodiment.

First, the communication unit 113 obtains current date-and-time information indicating the current date and time from the network 40 or the like (S841).

Next, the determination unit 133B obtains the current location of the user from the location information identification unit 173 (S842). In the present embodiment, the determination unit 133B obtains location information indicating the current location of the user from the sensor 21 and history information.

Next, the determination unit 133B determines whether or not generating notification information is appropriate, based on the current date-and-time information and the location information indicating the current location of the user (S843). In a case where the first date-and-time information is in the morning of the date of the week for garbage pick-up, and the user is at a particular location in the house, the determination unit 133B determines that generating notification information is appropriate.

In a case where the determination unit 133B determines that generating notification information is not appropriate (NO in S843), the flow ends. On the other hand, in a case where the determination unit 133B determines that generating notification information is appropriate (YES in S843), the presentation device specification unit 142 specifies a presentation device from one or more presentation devices to display the notification information.

Next, the generation unit 153 generates notification information to be transmitted to the specified presentation device (S845). In the present embodiment, the generation unit 153 generates notification information prompting the user to carryout behavioral practices, such as notification information reminding the user not to forget to take out the garbage. The notification information here may be generated in a format displayed on a display, or may be generated in a format audibly transmitted (audio data), or may be generated as a command to cause lighting visible from the current location of the user to blink or the like.

The communication unit 113 then transmits the notification information generated at the generation unit 153 to the presentation device specified by the presentation device specification unit 142 (S846). Note that behavioral practices of the user are not restricted to a behavior of taking out the garbage at a certain date and time, and may be behavior such as cooking rice, programming a video recorder to record a drama, or the like, as described above.

Advantages

According to the present embodiment, an information notification device 16 which can perform notification of information at a suitable display location (presentation location) and at a suitable timing, can be realized. More specifically, in a case where the current date and time is in the morning of the date of the week for garbage pick-up, and the user is at a particular location in the house, the user is provided with notification information reminding not to forget to take out the garbage, for example. That is to say, location information identification unit 173 of the information notification device 16 identifies the location of the user based on particular information (the behavioral practices of the user and the date and time thereof) included in the management information, so notification information can be displayed in accordance with the current location of the user. Accordingly, the user can act more readily in response to the notification information, and the chances (or the cases) of forgetting the notification information can be reduced.

Fifth Embodiment

Description has been made in the third embodiment with an example of a method of generating and transmitting notification information to the user, in accordance with the location where the user is, based on the management information (history information). In a fifth embodiment, description will be made regarding an example of a method of generating and transmitting notification information to the user, using information indicating the current state of a device (sensor information) in addition to the management information (history information), in accordance with the location of the user. The system configuration in the present embodiment is also the same as the system configuration illustrated in FIG. 37, except that the configuration of the information notification device 17 is different, so description will be omitted.

Configuration of Information Notification Device

Figure 46:
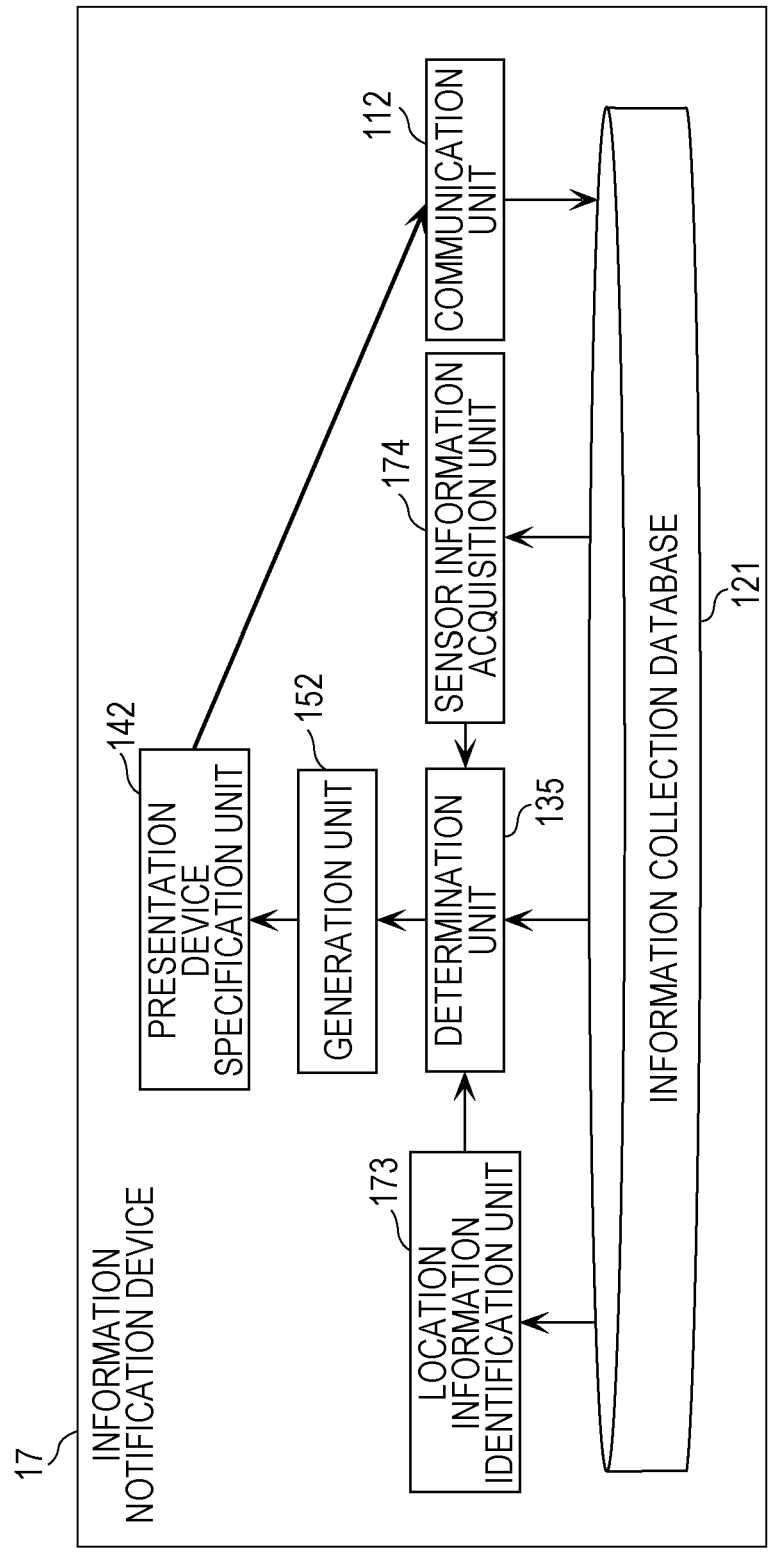
FIG. 46 is a block diagram illustrating a functional configuration of an information notification device according to a fifth embodiment.

FIG. 46 is a block diagram illustrating a functional configuration of the information notification device of the fifth embodiment. Components which are the same as those in FIG. 38 are denoted with the same reference numerals, and detailed description will be omitted.

The information notification device 17 illustrated in FIG. 46 differs from the information notification device 15 in FIG. 38 with regard to the points that the function of a determination unit 135 differs from that of the determination unit 133, and that a sensor information acquisition unit 174 has been added. Other configurations are the same as those of the information notification device 15 illustrated in FIG. 38, so description will be made below primarily regarding the different points.

The sensor information acquisition unit 174 acquires sensor information indicating the current state of the device 20. The current state of the device 20 (sensor information) is detected by a sensor provided to the device 20, a sensor provided to facilities where the device 20 is installed, or the like. The sensor information acquisition unit 174 acquires the sensor information detected by the sensor.

Specifically, in a case where the device 20 is a washing machine, the sensor information is information indicating a state of whether the drum of the washing machine currently is empty or not, detected using a weight sensor, for example. In a case where the device 20 is a hot tub, the sensor information is information indicating which state of opened and closed the drain plug of the hot tub currently is in, detected using a weight sensor, for example. In a case where the device 20 is a rice cooker, the sensor information is information indicating the current state of whether or not rice has been placed in the pot of the rice cooker, detected using a weight sensor, for example.

The determination unit 135 determines that transmission of notification information to the user is appropriate in a case where the information included in the history information held in the management information which the information collection database 121 holds, and the sensor information acquired by the sensor information acquisition unit 174, satisfy a predetermined condition, and also the current location of the user identified by the location information identification unit 173 is a predetermined location.

In a case where the device 20 is a washing machine, the history information of the device 20 regarding the washing machine includes information indicating whether or not the washing machine is operating, for example. The sensor information includes information indicating a state of whether the drum of the washing machine currently is empty or not, for example. The determination unit 135 makes determination based on whether or not the washing machine is operating which is information included in history information, and on the state of whether or not the drum of the washing machine currently is empty as indicated by sensor information, in accordance with the current location of the user. The determination unit 135 determines that transmission of notification information to the user is appropriate when the predetermined conditions are satisfied that operations of the washing machine have ended, the drum of the washing machine is not empty, and the user is at a location other than the room where the washing machine is situated, for example.

In a case where the device 20 is a hot tub, the history information of the device 20 regarding the hot tub includes information indicating whether or not control has been effected to heat up the hot tub, for example. The sensor information includes information indicating a state of whether the drain plug of the hot tub currently is opened or closed, for example. The determination unit 135 makes determination based on whether or not control has been effected to heat up the hot tub which is information included in history information, and on the state of whether or not the drain plug of the hot tub currently is opened or closed as indicated by sensor information. And the determination unit 135 further makes determination in accordance with the current location of the user. The determination unit 135 determines that transmission of notification information to the user is appropriate when the predetermined conditions are satisfied that control has been effected to heat up the hot tub but the drain plug of the hot tub is opened, and the user is in the house where the hot tub is situated, for example.

In a case where the device 20 is a rice cooker, the history information of the device 20 regarding the rice cooker includes information indicating whether or not the rice cooker currently is cooking rice or the timer has been set to cook rice, for example. The sensor information includes information indicating a state of whether rice has been placed in the pot of the rice cooker, for example. The determination unit 135 makes determination based on whether or not the rice cooker currently is cooking rice or the timer has been set to cook rice which is information included in history information, and on the state of whether or not rice has been placed in the pot of the rice cooker as indicated by sensor information. And the determination unit 135 further makes determination in accordance with the current location of the user. The determination unit 135 determines that transmission of notification information to the user is appropriate when the predetermined conditions are satisfied that the timer of the rice cooker has been set to cook rice but no rice has been placed in the pot of the rice cooker, and the user is in the house where the rice cooker is placed, for example.

Note that even if the determination unit 135 determines that transmission of notification information to the user is appropriate, transmission of notification information may be decided to not be appropriate if the time of day is a time at which the user is conceivably asleep.

Control Method of Information Notification Device

Figure 47:
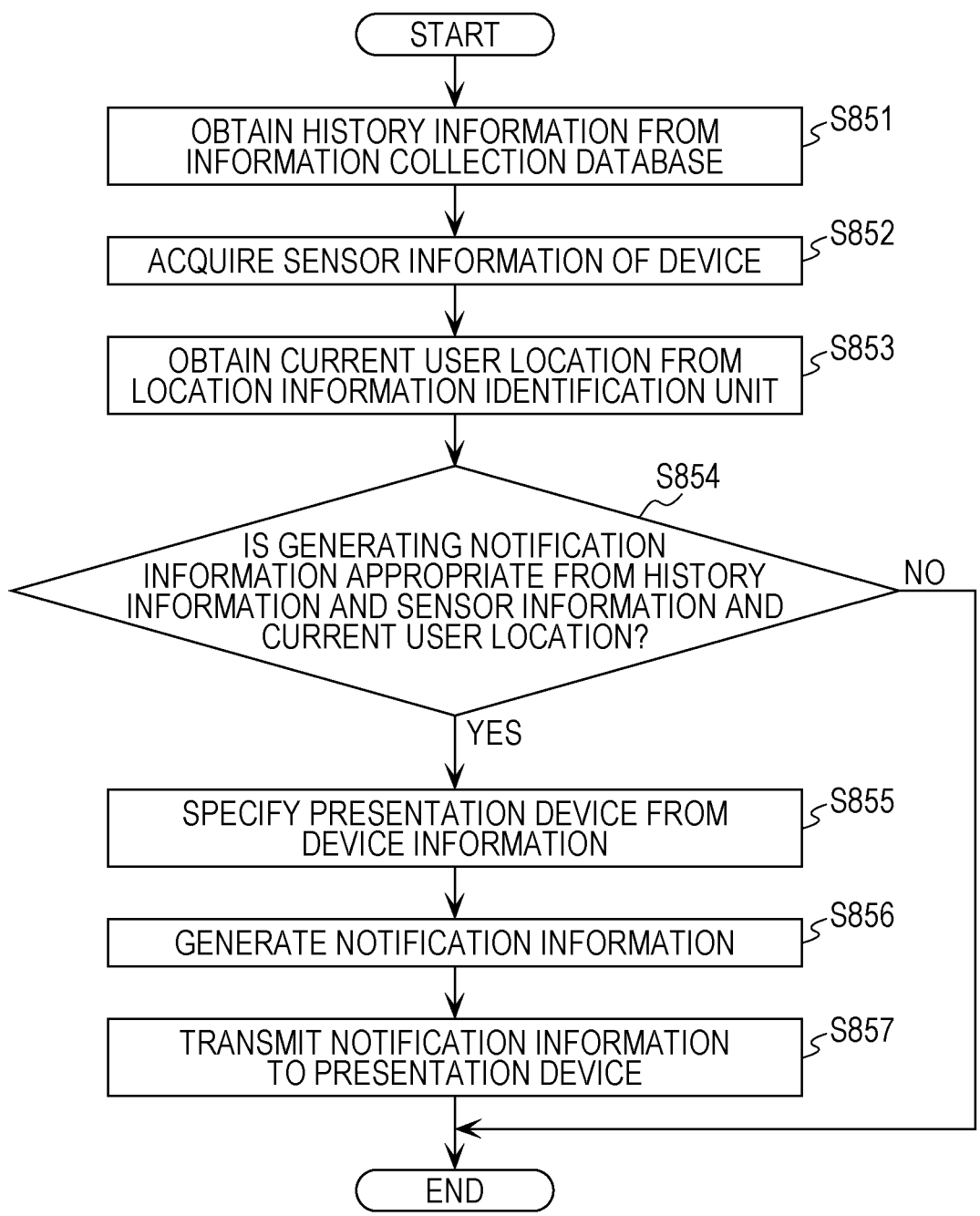
FIG. 47 is a flowchart illustrating the flow of control in the information notification device according to the fifth embodiment.

Next, a specific example of a control method of the information notification device 17 configured as described above will be described. FIG. 47 is a flowchart illustrating the flow of control at the information notification device according to the fifth embodiment.

First, the determination unit 135 obtains history information from the information collection database 121 (S851). The determination unit 135 according to the present embodiment obtains history information including the current running state of the device 20 in the present embodiment. For example, in a case where the device 20 is a washing machine, the determination unit 135 obtains history information including information relating to the running state indicating whether or not the washing machine is operating. In a case where the device 20 is a hot tub, the determination unit 135 obtains history information including information relating to the running state indicating whether or not control is being effected to heat up the hot tub. In a case where the device 20 is a rice cooker, the determination unit 135 obtains history information including information relating to the running state indicating whether or not the rice cooker is cooking rice or the timer of the rice cooker has been set to cook rice.

Next, the sensor information acquisition unit 174 acquires sensor information indicating the current state of the device 20 (S852). Specific examples of sensor information have been described above, so description will be omitted here.

The determination unit 135 then obtains the current location of the user from the location information identification unit 173 (S853). In the present embodiment, the determination unit 135 obtains location information indicating the current location of the user from the sensor 21A installed in a room and history information.

Next, the determination unit 135 determines whether or not generating notification information is appropriate, based on the history information, location information indicating the current location of the user, and the sensor information (S854). The determination unit 135 in the present embodiment determines that transmission of notification information to the user is appropriate in a case where the information included in the history information held in the management information which the information collection database 121 holds, and the sensor information acquired by the sensor information acquisition unit 174, satisfy a predetermined condition, and also the current location of the user identified by the location information identification unit 173 is a predetermined location.

Determination that transmission of notification information to the user is appropriate may be made besides the above-described examples. For example, in a case where the device 20 is a hot tub, determination that transmission of notification information to the user is appropriate may be made by the determination unit 135 if the user is in the house and has effected control to heat up the hot tub but the drain plug is opened so water is not running up in the hot tub. In a case where the device 20 is a washing machine, determination that transmission of notification information to the user is appropriate may be made by the determination unit 135 if the washing machine has completed all cycles but there is laundry remaining in the drum, or there is laundry in the drum that has not been laundered yet. In a case where the device 20 is a rice cooker, determination that transmission of notification information to the user is appropriate may be made by the determination unit 135 if rice has been set in the pot but neither cooking of the rice nor setting of the timer to cook the rice have been performed.

In a case where the determination unit 135 determines that transmission of notification information to the user is not appropriate (NO in S854), the flow ends. In a case where the determination unit 135 determines that transmission of notification information to the user is appropriate (YES in S854), the presentation device specification unit 142 specifies a presentation device out of one or more presentation devices to display the notification information (S855).

The generation unit 152 next generates the notification information to be transmitted to the specified presentation device (S856). In a case where the device 20 is a hot tub, notification information is generated by the generation unit 152 to the effect that the user is in the house and has effected control to heat up the hot tub but the drain plug is opened so water is not running up in the hot tub, for example. In a case where the device 20 is a washing machine, notification information is generated by the generation unit 152 to the effect that the washing machine has completed all cycles but there is laundry remaining in the drum, or there is laundry in the drum that has not been laundered yet., for example In a case where the device 20 is a rice cooker, notification information is generated by the generation unit 152 to the effect that rice has been set in the pot but neither cooking of the rice nor setting of the timer to cook the rice have been performed, for example.

The communication unit 113 then transmits the notification information generated at the generation unit 152 to the presentation device specified by the presentation device specification unit 142 (S857).

Advantages

According to the present embodiment, an information notification device 17 which can perform notification of information at a suitable display location (presentation location) and at a suitable timing, can be realized. More specifically, the information notification device 17 can display notification information according to the current location of the user identified by the location information identification unit 173, based on information indicating the current state of the device (sensor information) in addition to management information. Accordingly, the user can act more readily in response to the notification information, and the chances (or the cases) of forgetting the notification information can be reduced. Thus, according to the present embodiment, an information notification method and an information notification device which can perform notification of information at a suitable display location and at a suitable timing can be realized.

In the above-described embodiments, the components may be configured as dedicated hardware, or may be realized by executing a software program suitable for each component. Each component may be realized by a program execution unit such as a processor reading out a software program stored in a recording medium such as a hard disk, semiconductor memory, or the like, and executing the software program. Software which realizes the information notification device and so forth of the above-described embodiments is a program such as described next.

That is to say, the program includes: holding management information in an information collection database; identifying a location of a user; determining that transmission of notification information to the user is appropriate in a case where information included in management information held in the information collection database satisfies a predetermined condition, and a current location of the user identified in the identifying is a predetermined location; specifying, out of one or more presentation devices, a presentation device at which to display the notification information; generating the notification information of a content according to the identified location of the user, in a case where determination has been made in the determining that transmission of the notification information is appropriate; and communicating the notification information that has been generated by transmission to the presentation device that has been specified in the specifying.

At least one of the holding, the identifying, the determining, the specifying, the generating, and the communicating, may be executed by a program execution unit such as a processor, and those not executed by a program execution unit such as a processor may be executed by dedicated hardware.

It is needless to say that all of the holding, the identifying, the determining, the specifying, the generating, and the communicating, may be executed by a program execution unit such as a processor. Conversely, all of the holding, the identifying, the determining, the specifying, the generating, and the communicating, may be executed by dedicated hardware.

While description has been made in the above embodiments regarding cases where the devices are home appliances or the like, used in common homes, the devices may be industrial devices, such as manufacturing machines or the like used in factories or the like, for example.

While description has been made in the above embodiments regarding cases where the information notification device is a Web server owned by a manufacturer or the like, the information notification device may be an in-home server installed in the home, for example.

While description has been made in the above embodiments regarding a configuration where the information collection database 121 (122) is included in the information notification device, the information collection database 121 (122) may be a database situated outside of the information notification device.

While an information notification device and control method thereof according to one or multiple aspects have been described by way of embodiments, the present disclosure is not restricted to these embodiments. Various modifications to the embodiments and combinations of components of different embodiments which are conceivable by one skilled in the art may be encompassed by one or multiple aspects without departing from the essence of the present disclosure.

The technology described above may be realized by the following type of cloud service. However, the type by which the above technology can be realized is not restricted to this.

Service Type 1: In-House Data Center Type

Figure 48:
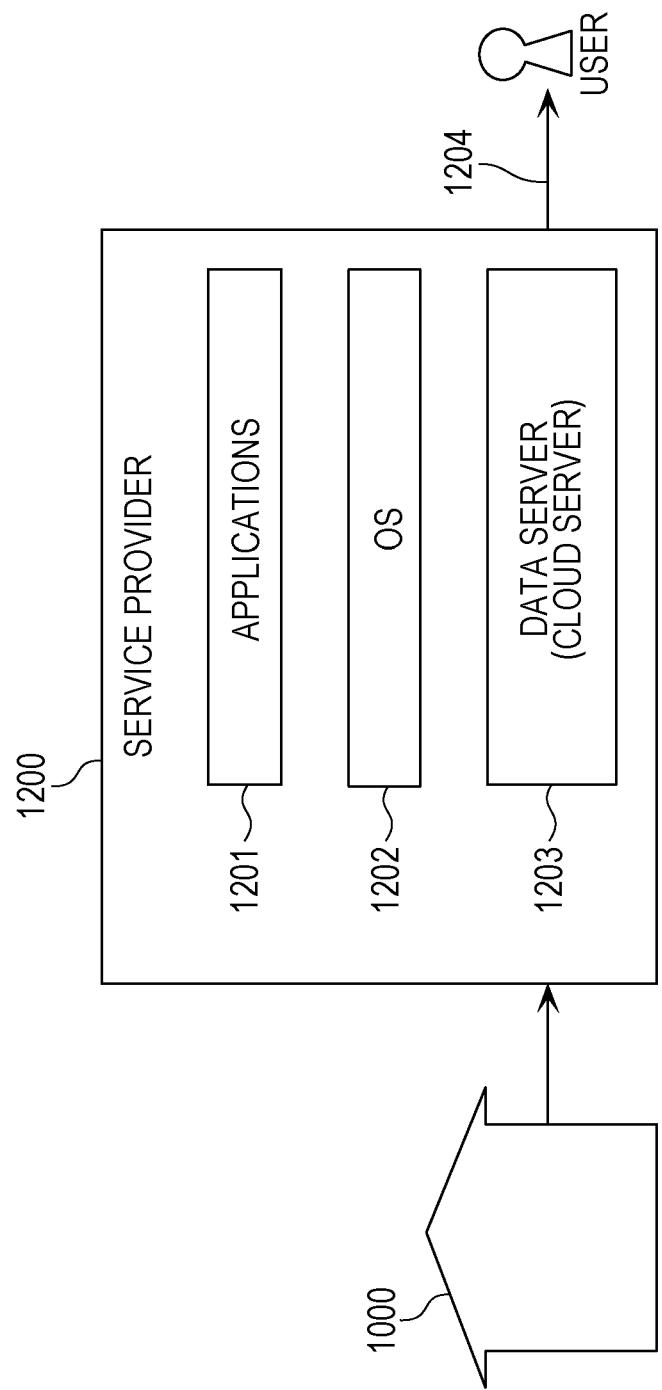
FIG. 48 is a diagram illustrating a type 1 service (in-house data center type)

FIG. 48 is a diagram illustrating a service type 1 (in-house data center type). This type is a type where a service provider 1200 obtains information from a group 1000, and provides a user with service. In this type, the service provider 1200 functions as a data center operator. That is to say, the service provider 1200 has a cloud server 1203 to manage big data. Accordingly, the data center operator does not exist.

In this type, the service provider 1200 operates and manages the data center (1203). The service provider 1200 also manages operating software (OS) (1202) and applications (1201). The service provider 1200 provides services (1204) using the OS (1202) and applications (1201) managed by the service provider 1200.

Service Type 2: IaaS Usage Type

Figure 49:
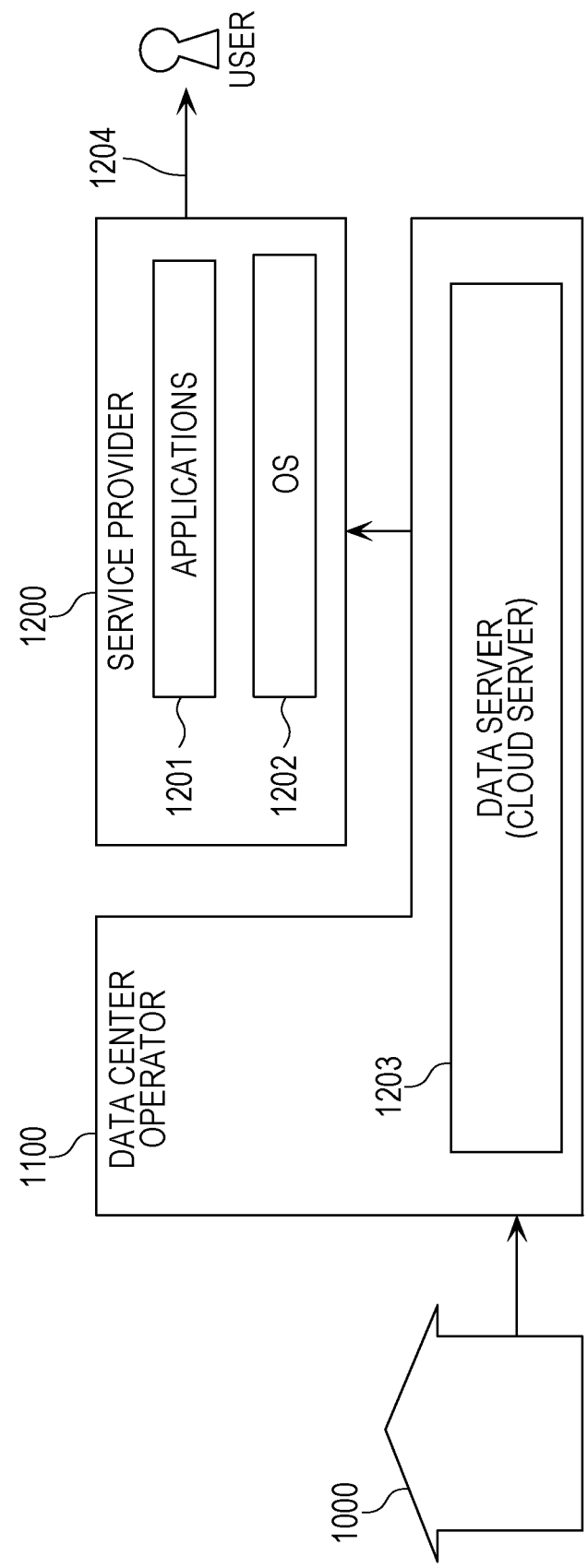
FIG. 49 is a diagram illustrating a type 2 service (IaaS type)

FIG. 49 is a diagram illustrating a service type 2 (IaaS usage type). IaaS stands for "Infrastructure as a Service", and is a cloud service providing model where the base for computer system architecture and operation itself is provided as an Internet-based service.

In this type, the data center operator 1100 operates and manages the data center (1203). The service provider 1200 manages the OS (1202) and applications (1201). The service provider 1200 provides services (1204) using the OS (1202) and applications (1201) managed by the service provider 1200.

Service Type 3: PaaS Usage Type

Figure 50:
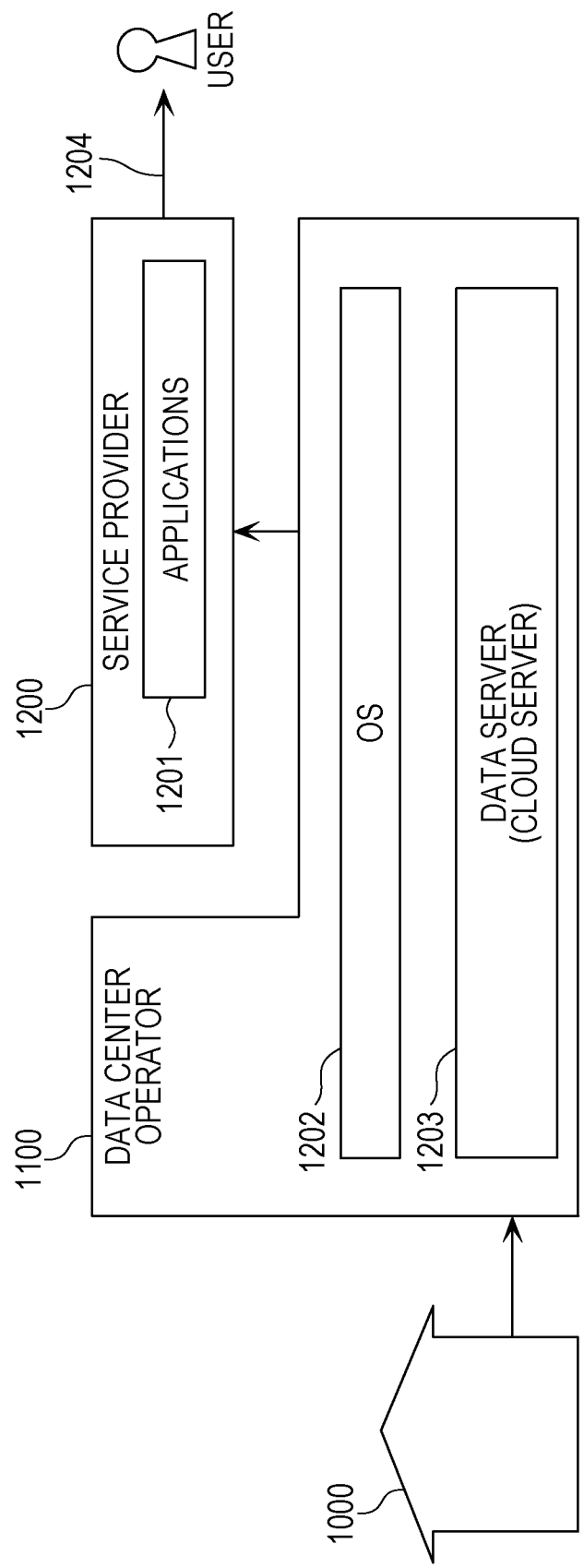
FIG. 50 is a diagram illustrating a type 3 service (PaaS type)

FIG. 50 is a diagram illustrating a service type 3 (PaaS usage type). PaaS stands for "Platform as a Service", and is a cloud service providing model where the foundation for software architecture and operation is provided as an Internet-based service.

In this type, the data center operator 1100 manages the OS (1202) and operates and manages the data center (1203). The service provider 1200 manages the applications (1201). The service provider 1200 provides services (1204) using the OS (1202) managed by the data center operator 1100 and applications (1201) managed by the service provider 1200.

Service Type 4: SaaS Usage Type

Figure 51:
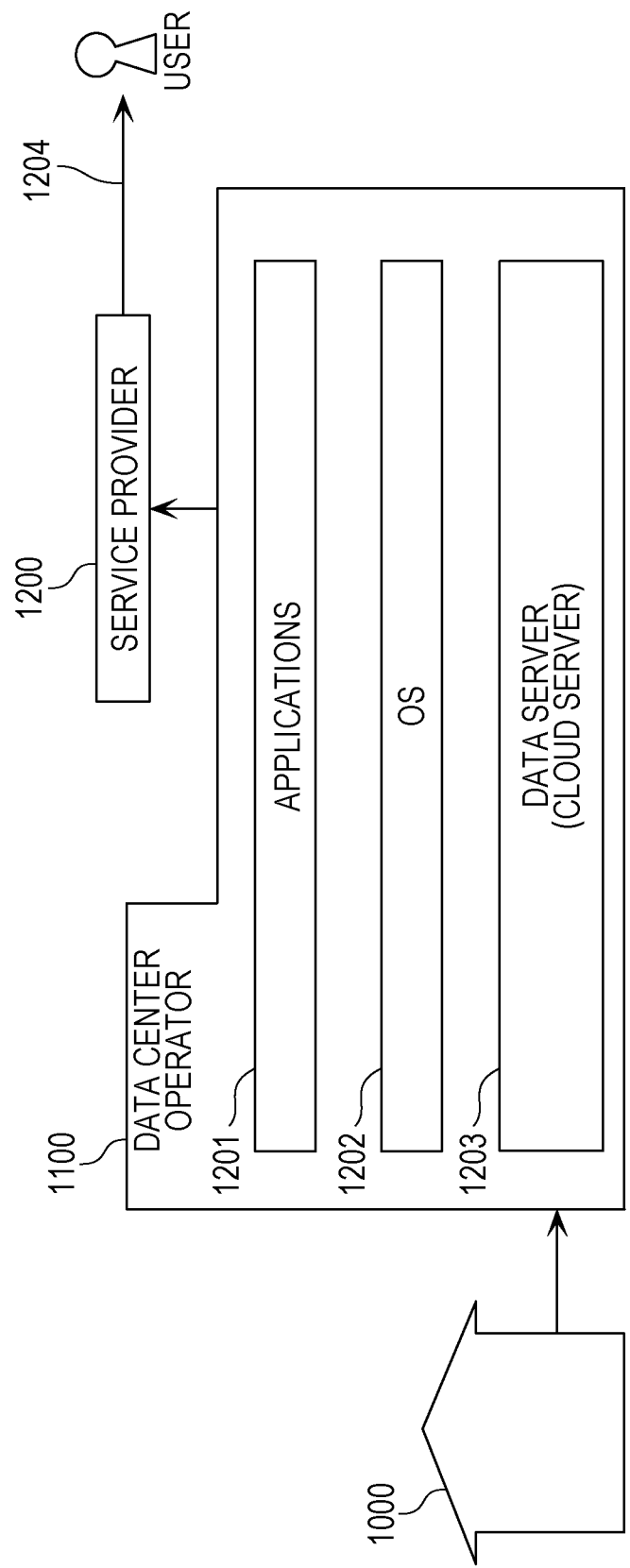
FIG. 51 is a diagram illustrating a type 4 service (SaaS type).

FIG. 51 is a diagram illustrating a service type 4 (SaaS usage type). SaaS stands for "Software as a Service". This is a cloud service providing model having functions where corporations or individuals (users) who do not have a data center (cloud server) can use applications provided by a platform provider having a data center (cloud server) for example, over a network such as the Internet.

In this type, the data center operator 1100 manages the applications (1201), manages the OS (1202), and operates and manages the data center (1203). The service provider 1200 provides services (1204) using the OS (1202) and applications (1201) managed by the data center operator 1100.

In each of these types, the service provider 1200 performs the act of providing services. The service provider or data center operator may develop the OS, applications, database for big data, and so forth, in-house, or may commission this to a third party.

The technology according to the present disclosure is applicable to an information communication device and information communication method for transmitting notification information of networked devices.

What is claimed is:

1. An information notification method of an information notification device, the information notification method comprising:

receiving, from a first device out of a plurality of devices which operate by accepting input from a user, first device information uniquely identifying the first device, and first history information of the first device, the first device being a power-assisted bicycle, the first history information of the first device including state information indicating a value of a remaining battery level of the first device;

correlating the first device information and the first history information as management information in an information collection database;

identifying a location of the user;

determining that transmission of notification information to the user is appropriate in a case where the value of the remaining battery level of the first device is equal to or lower than a value predetermined to warrant charging of the first device, the value of the remaining battery level of the first device being indicated by the state information included in the first history information of the first device, and in a case where the location of the user identified in the identifying is within a home of the user where the first device is located, or nearby the home;

specifying, out of one or more presentation devices, a presentation device at which the notification information is to be displayed;

generating the notification information of a content according to the location of the user, in the case where a determination has been made in the determining that transmission of the notification information is appropriate; and transmitting the notification information that has been generated in the generating to the presentation device that has been specified in the specifying, wherein the correlating, the identifying, the determining, the specifying, and the generating are executed by a processor of the information notification device, and wherein the receiving and the transmitting are executed by a communicator of the information notification device.

2. The information notification method according to claim 1, wherein the location of the user being nearby the home is an entryway of the home.

3. The information notification method according to claim 2, wherein, in the identifying, the user is identified as being at the location of the entryway of the home, using an operation history of a lock of the entryway of the home of the user, or an operation history of lighting of the entryway.

4. The information notification method according to claim 1, wherein the location of the user is identified in the identifying using a sensor installed in the home of the user, the sensor including at least one of a motion detector and a heat sensor.

5. The information notification method according to claim 1, wherein the one or more presentation devices include any one of an in-home smart grid display, a mobile terminal, and lighting that changes colors or blinks.

6. The information notification method according to claim 1, wherein, in the case where the determination is made in the determining that transmission of the notification information is appropriate, and also the presentation device specified in the specifying includes an audio output, the notification information is generated including audio data of the content to be notified to the user.

7. An information notification device comprising:

a processor; and a communicator, wherein the communicator executes receiving, from a first device out of a plurality of devices which operate by accepting input from a user, first device information uniquely identifying the first device, and first history information of the first device, the first device being a power-assisted bicycle, the first history information of the first device including state information indicating a value of a remaining battery level of the first device, wherein the processor executes:

correlating the first device information and the first history information as management information in an information collection database;

identifying a location of the user;

determining that transmission of notification information to the user is appropriate in a case where the value of the remaining battery level of the first device is equal to or lower than a value predetermined to warrant charging of the first device, the value of the remaining battery level of the first device being indicated by the state information included in the first history information of the first device, and in a case where the location of the user identified in the identifying is within a home of the user where the first device is located, or nearby the home;

specifying, out of one or more presentation devices, a presentation device at which the notification information is to be displayed; and generating the notification information of a content according to the location of the user, in the case where a determination has been made in the determining that transmission of the notification information is appropriate, and wherein the communicator further executes transmitting the notification information that has been generated in the generating to the presentation device that has been specified in the specifying.

* * * * *